United States Patent
Maeda et al.

(10) Patent No.: US 9,825,731 B2
(45) Date of Patent: Nov. 21, 2017

(54) OPTICAL TRANSMISSION SYSTEM, OPTICAL TRANSMISSION APPARATUS, AND OPTICAL TRANSMISSION METHOD

(71) Applicant: FUJITSU LIMITED, Kawasaki-shi, Kanagawa (JP)

(72) Inventors: Taizo Maeda, Kawasaki (JP); Yohei Koganei, Kawasaki (JP); Ichiro Nakajima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 16 days.

(21) Appl. No.: 15/057,424

(22) Filed: Mar. 1, 2016

(65) Prior Publication Data
US 2016/0261368 A1   Sep. 8, 2016

(30) Foreign Application Priority Data

Mar. 3, 2015 (JP) ................. 2015-040897

(51) Int. Cl.

| | |
|---|---|
| *H03M 13/00* | (2006.01) |
| *H04L 1/00* | (2006.01) |
| *H04B 10/079* | (2013.01) |
| *H04J 14/02* | (2006.01) |
| *H04B 10/077* | (2013.01) |
| *H04L 27/26* | (2006.01) |

(52) U.S. Cl.
CPC ........ *H04L 1/0041* (2013.01); *H04B 10/0775* (2013.01); *H04B 10/07957* (2013.01); *H04J 14/0201* (2013.01); *H04J 14/0298* (2013.01); *H04L 27/2601* (2013.01)

(58) Field of Classification Search
None
See application file for complete search history.

(56) References Cited

U.S. PATENT DOCUMENTS

| | | | |
|---|---|---|---|
| 6,289,485 B1 | 9/2001 | Shiomoto | |
| 8,107,826 B2* | 1/2012 | Armstrong | H04B 10/25133 398/158 |
| 9,584,256 B2* | 2/2017 | Kojima | H04L 1/0041 |
| 2003/0223751 A1* | 12/2003 | Shimizu | H04J 14/0221 398/79 |
| 2010/0295702 A1* | 11/2010 | Zhao | G01V 11/002 340/855.4 |
| 2014/0376925 A1* | 12/2014 | Koike-Akino | H03M 13/251 398/188 |
| 2016/0204899 A1* | 7/2016 | Kojima | H04J 14/0257 714/776 |

FOREIGN PATENT DOCUMENTS

| | | |
|---|---|---|
| JP | 11-127138 | 5/1999 |
| JP | 2013-192054 | 9/2013 |

* cited by examiner

*Primary Examiner* — Daniel McMahon
(74) *Attorney, Agent, or Firm* — Staas & Halsey LLP

(57) ABSTRACT

An optical transmission system includes a first optical transmission apparatus that adds a plurality of error correction codes to a main signal, retrieves, from a first error correction code that is added to the main signal and that corresponds to a first sub-carrier among the plurality of sub-carriers, a first code portion in excess of a predetermined redundancy level, distributes the first code portion to a second sub-carrier among the plurality of sub-carriers, concatenates a second code portion into the first error correction code, and transmits an optical signal including the main signal multiplexed with the first error correction code that has been concatenated with the second code portion.

15 Claims, 29 Drawing Sheets

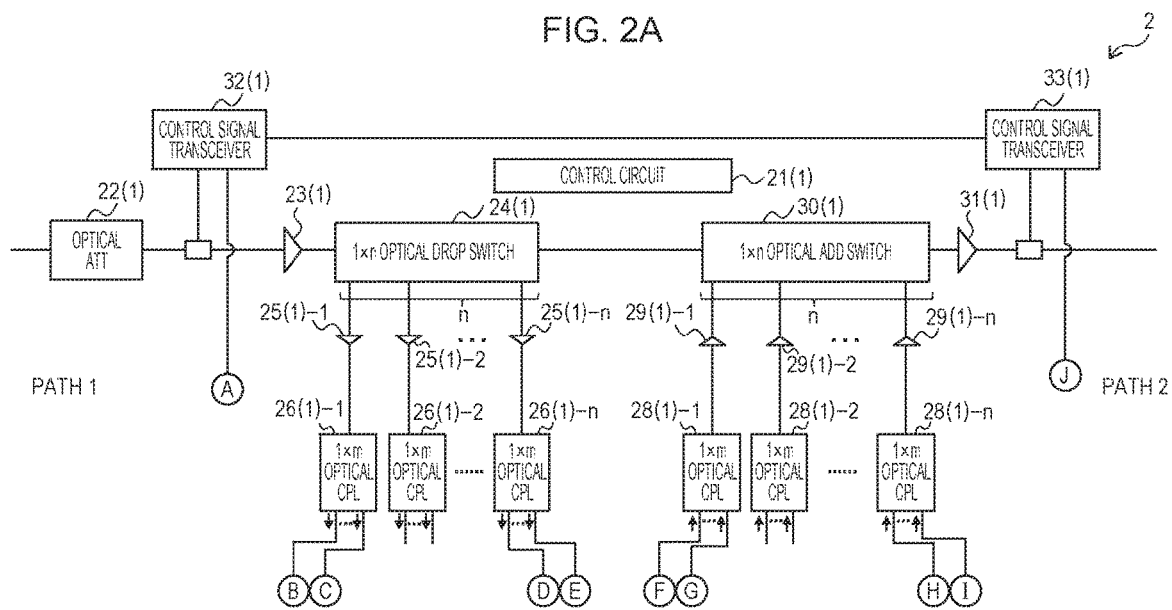

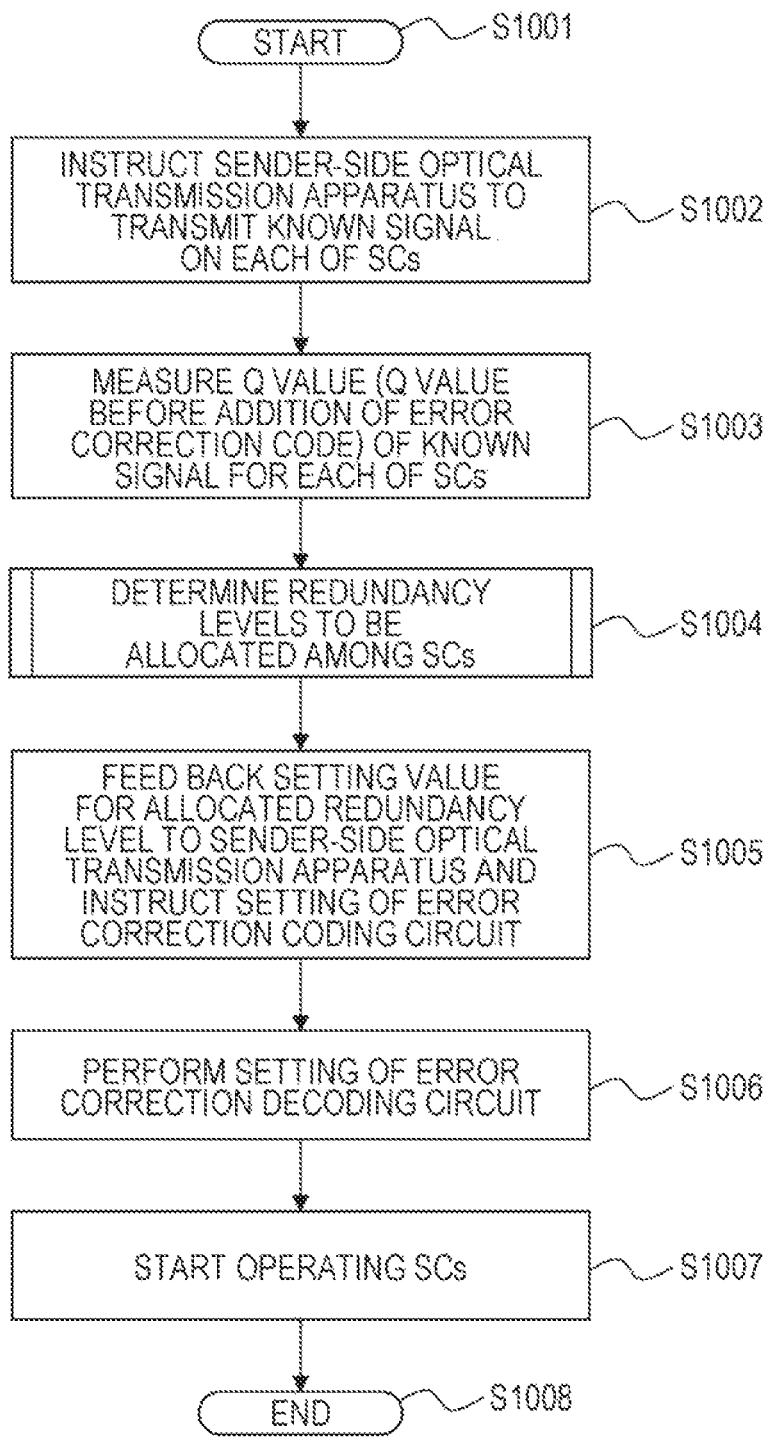

FIG. 25

| REDUNDANCY LEVEL (%) | Q-VALUE THRESHOLD VALUE (dB) |
|---|---|
| 7 | 9.5 |
| 20.5 | 5.6 |
| 25.5 | 5.0 |

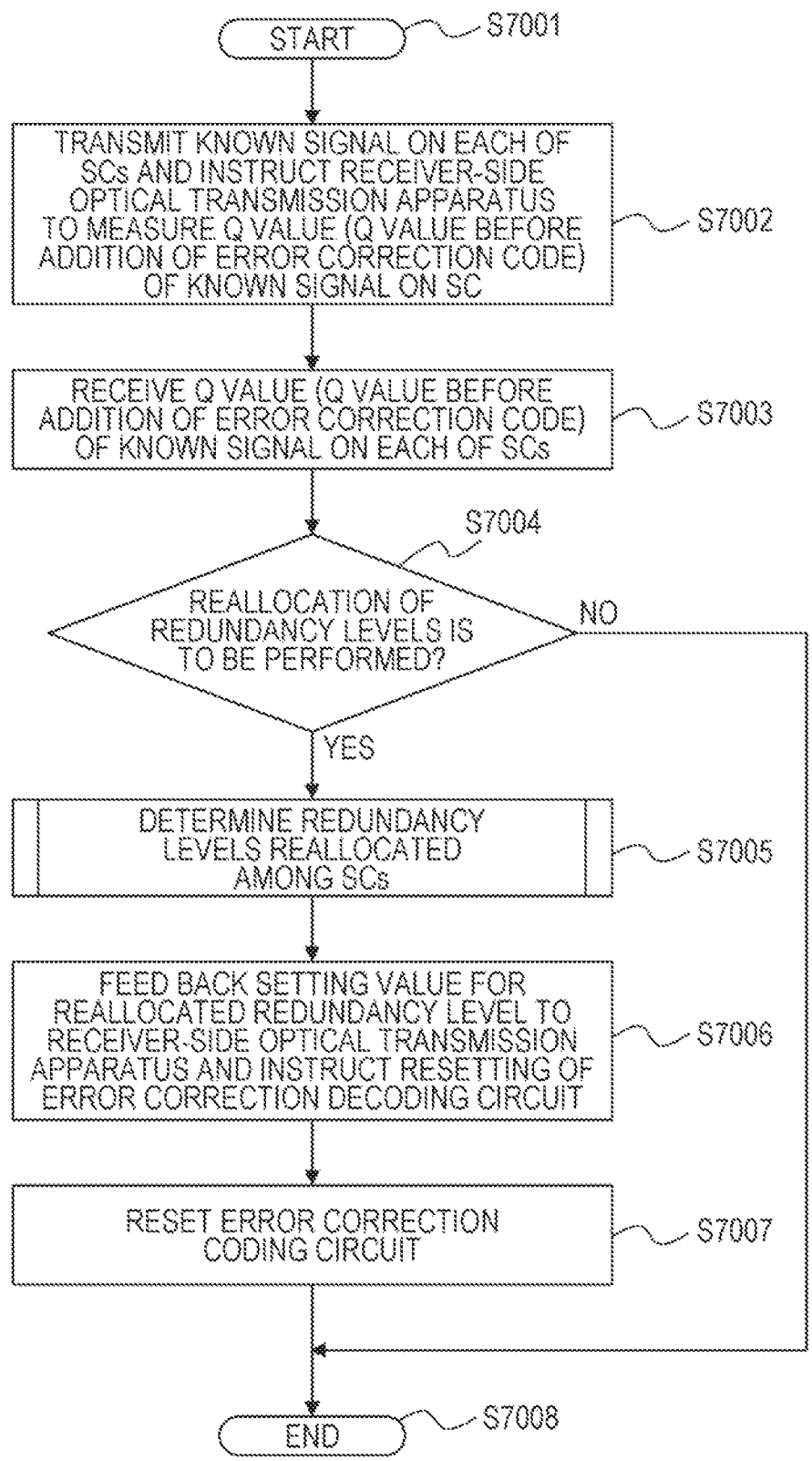

OPTICAL TRANSMISSION SYSTEM, OPTICAL TRANSMISSION APPARATUS, AND OPTICAL TRANSMISSION METHOD

CROSS-REFERENCE TO RELATED APPLICATION

This application is based upon and claims the benefit of priority of the prior Japanese Patent Application No. 2015-040897, filed on Mar. 3, 2015, the entire contents of which are incorporated herein by reference.

FIELD

The embodiment discussed herein is related to an optical transmission system, an optical transmission apparatus, and an optical transmission method.

BACKGROUND

An example of a technology for improving the transmission capacity of wavelength division multiplexing transmission systems is super channel transmission. In super channel transmission, a super channel is generated by virtually combining a plurality of sub-carriers (SCs). By performing, for example, Nyquist waveform shaping on each of the sub-carriers making up a super channel, the wavelength spacing between adjacent sub-carriers is decreased to a value close to the baud rate of a signal. Accordingly, by using super-channel transmission, the transmission capacity per bandwidth is increased. For example, if multilevel modulation, such as 16 quadrature amplitude modulation (QAM) is employed in transmission without a super channel, transmission of about 200 Gbps per bandwidth of 50 GHz is available. In contrast, in super-channel transmission, when two sub-carriers are within a bandwidth of 75 GHz, transmission of 400 Gbps per bandwidth of 75 GHz is available. That is, in the above-described example, the transmission capacity per bandwidth in the case of the super-channel transmission is increased to 1.3 times the transmission capacity in the case of non-super channel transmission. In super-channel transmission, the operations performed in an optical add/drop multiplexer (OADM) node, such as wavelength adding and dropping, are performed on a super-channel basis. At least two sub-carriers make up a super channel. Due to the restriction of the bandwidth of filters used in multiplexing and demultiplexing in OADM, the maximum number of combined sub-carriers is about 4.

The following optical transmission apparatuses are widely used. That is, optical transmission devices based on optical orthogonal frequency-division multiplexing (OFDM) divide an input payload into n pieces (n is an integer equal to 2 or greater), add forward error correction (FEC) codes having different error correction capabilities to the n divided pieces of the payload, and combine the n pieces of the payload having forward error correction codes added thereto. A payload combining unit places a payload having a higher error correction capability on a sub-carrier having a lower ratio of the sub-carrier power to the noise power (SNR) (refer to, for example, Japanese Laid-open Patent Publication No. 2013-192054).

The following error correction coding technique is also widely used. That is, input data is divided into predetermined length blocks, and error correction codes having different code lengths are provided to the blocks in accordance with the importance of the input data. Thus, error coding having error correction capability in accordance with the code length of error correction code is performed. In this manner, coded data having different packet lengths are generated in accordance with the code length of the error correction code (refer to, for example, Japanese Laid-open Patent Publication No. 11-127138).

SUMMARY

According to an aspect of the invention, an optical transmission system for transmitting and receiving an optical signal in a super channel, the optical system includes: a first optical transmission apparatus configured to add an error correction code having a code length in accordance with transmission quality of each of sub-carriers forming a super channel to a main signal, retrieve, from the error correction code added to the main signal on a sub-carrier to be processed, a code portion in excess of a predetermined redundancy level, distribute the code portion to another sub-carrier, concatenate the code portion of the error correction code to be added to a main signal on the another sub-carrier into the error correction code added to a main signal on the sub-carrier to be processed, and transmit, through the super channel made up by the sub-carriers, the optical signal to which the main signal having the error correction code of the predetermined redundancy level is multiplexed; and a second optical transmission apparatus configured to receive the optical signal transmitted from the first optical transmission apparatus, extract, from the optical signal on a sub-carrier to be processed, an error correction code distributed from another sub-carrier, concatenate the cord portion of the error correction code distributed from another sub-carrier into the error correction code included in the optical signal, and decode a main signal in the optical signal on a corresponding sub-carrier by using the concatenated error correction code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is an exemplary configuration diagram of an optical transmission apparatus according to the exemplary embodiment;

FIG. 23 is a flowchart of a first example of a redundancy level setting process performed before start of the operation;

FIG. 25 illustrates an example of a redundancy level-transmission quality table according to the exemplary embodiment;

FIG. 30 is a flowchart of a second example of the redundancy level setting process performed under operation.

DESCRIPTION OF EMBODIMENT

An exemplary embodiment of a technology capable of improving the super channel transmission performance regardless of a variation of the transmission quality among sub-carriers making up a super channel is described below with reference to the accompanying drawings.

Example of Configuration of Optical Transmission System of Embodiment

Figure 1:
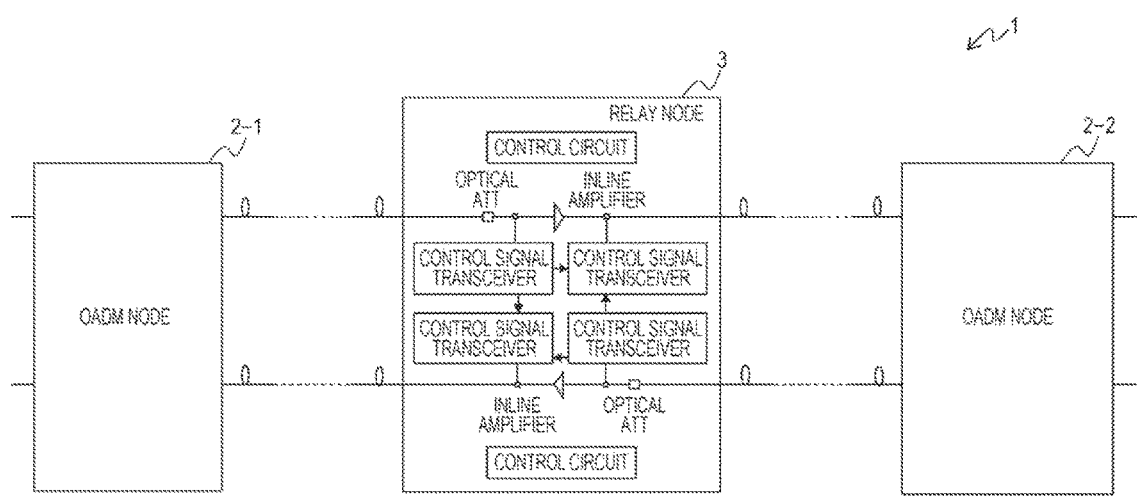
FIG. 1 is an exemplary configuration diagram of an optical transmission system according to an exemplary embodiment.

FIG. 1 is an exemplary configuration diagram of an optical transmission system according to an exemplary embodiment. In an example illustrated in FIG. 1, an optical transmission system 1 includes OADM nodes 2-1 and 2-2 and at least one relay node 3. The OADMs nodes 2-1 and 2-2 are bi-directionally connected to each other via at least one relay node 3.

Each of the OADM nodes 2-1 and 2-2 is an example of the optical transmission apparatus according to the exemplary embodiment. As described below with reference to FIGS. 2A and 2B, the optical transmission apparatus includes a transponder serving as a transceiver unit of an optical signal. The optical transmission apparatus inserts (adds) a predetermined optical signal to an optical signal transmitted from the transponder to a transmission line (an optical cable) and splits (drops) the predetermined optical signal from the optical signal transmitted from the transmission line to the transponder. The relay node 3 includes an optical amplifier called in-line amplifier (ILA) and, thus, amplifies the power of an optical signal in a transmission line.

Note that FIG. 1 illustrates only an example of the configuration of the optical transmission system according to an exemplary embodiment. For example, the optical transmission system 1 may include three or more OADM nodes. Three or more OADM nodes may be connected to one another via the relay node 3.

Example of Configuration of Optical Transmission System of Embodiment

Figure 2B:
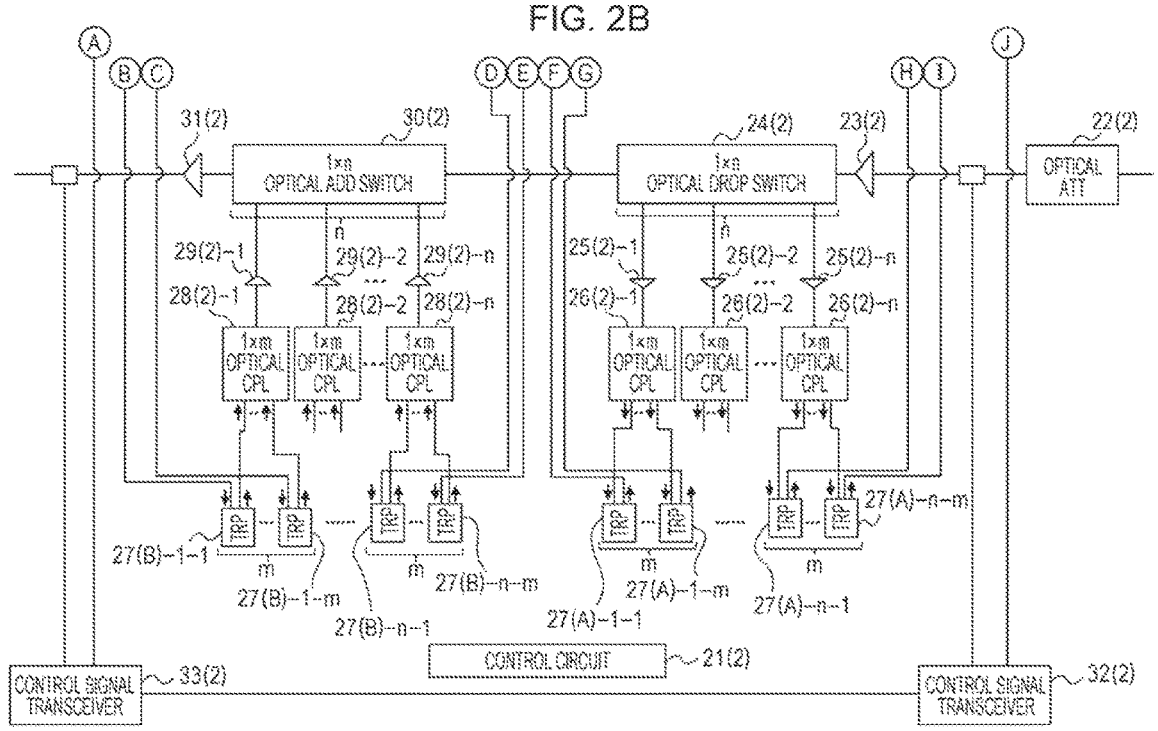
FIG. 2B is an exemplary configuration diagram of the optical transmission apparatus according to the exemplary embodiment.

FIGS. 2A and 2B are exemplary configuration diagrams of an optical transmission apparatus according to an exemplary embodiment. An optical transmission apparatus 2 corresponds to the OADM nodes 2-1 and 2-2 illustrated in FIG. 1.

In the example illustrated in FIGS. 2A and 2B, the optical transmission apparatus 2 includes control circuits 21 (1) and 21 (2), optical attenuators (ATTs) 22 (1) and 22 (2), and pre-amplifiers (pre-AMPs) 23 (1) and 23 (2). The optical transmission apparatus 2 further includes optical drop switches 24 (1) and 24 (2), optical add switches 30 (1) and 30 (2), and post amplifiers 31 (1) and 31 (2). The optical transmission apparatus 2 further includes optical amplifiers (AMPs) 25 (1)-1 to 25 (1)-n, optical amplifiers 25 (2)-1 to 25 (2)-n, and optical couplers (CPLs) 26 (1)-1 to 26 (1)-n, and optical couplers 26 (2)-1 to 26 (2)-n. The optical transmission apparatus 2 further includes transponders (TRPs) 27 (A)-1-1 to 27 (A)-n-m and transponders 27 (B)-1-1 to 27 (B)-n-m serving as transceiver devices. The optical transmission apparatus 2 further includes optical couplers (CPLs) 28 (1)-1 to 28 (1)-n, optical couplers 28 (2)-1 to 28 (2)-n, optical amplifiers (AMPs) 29 (1)-1 to 29 (1)-n, and optical amplifiers 29 (2)-1 to 29 (2)-n. The above-described constituent elements of the optical transmission apparatus 2 correspond to OADM for two paths. Note that the optical transmission apparatus 2 illustrated in FIGS. 2A and 2B is only an example of the configuration of the optical transmission apparatus according to an exemplary embodiment. The optical transmission apparatus according to the exemplary embodiment may include a multi-degree OADM that supports three or more paths.

In addition, in the example of configuration illustrated in FIGS. 2A and 2B, the optical transmission apparatus 2 further includes first control signal transceivers 32 (1) and 32 (2) and second signal transceivers 33 (1) and 33 (2). The first control signal transceivers 32 (1) and 32 (2) and the second signal transceivers 33 (1) and 33 (2) are devices that receive and transmit a control signal named optical supervisory channel (OSC) from and to another optical transmission apparatus 2.

The number in parentheses "(1)" in a reference symbol attached to each of the constituent elements of the optical transmission apparatus 2 represents a first transmission direction in which an optical signal is transmitted from a path 1 (the left path in the drawing) to a path 2 (the right path in the drawing). In addition, the number in parentheses "(2)" in a reference symbol attached to each of the constituent elements of the optical transmission apparatus 2 represents a second transmission direction in which an optical signal is transmitted from the path 2 to the path 1. The constituent elements with reference symbols that are the same except for the number placed in ( )("(1)" or "(2)") have the same function. For example, the optical drop switches 24 (1) and 24 (2) have the same function.

Note that the symbols "(A)" and "(B)" in the reference symbols attached to the transponders of the optical transmission apparatus 2 indicate two sets of transponders. More specifically, the transponders (TRPs) 27(A)-1-1 to 27(A)-n-m form a set of transponders that transmit optical signals of particular wavelengths, which are to be wavelength-division multiplexed into an optical signal transmitted in the first transmission direction, and receive optical signals of particular wavelengths, which are wavelength-demultiplexed from an optical signal received in the second transmission direction. In addition, the transponders (TRPs) 27(B)-1-1 to 27(B)-n-m form a set of transponders that transmit optical signals of particular wavelengths that are wavelength-multiplexed into an optical signal transmitted in the second transmission direction and receive optical signals of particular wavelengths obtained by wavelength-division demultiplexing an optical signal transmitted in the first transmission direction. Note that in the example of configuration illustrated in FIGS. 2A and 2B, each of the transponders is configured as a transceiver unit. However, each of the transponder may be configured as a set of a transmitter and a receiver separately disposed.

In addition, the symbol "n" in the reference symbols attached to the transponders of the optical transmission apparatus 2 indicates an integer greater than or equal to 2, which indicates the number of drops of a wavelength division multiplexing (WDM) signal dropped from the optical drop switch 24 (1) or 24 (2) or the number of adds of the wavelength division multiplexing signal added to the optical add switch 30 (1) or 30 (2). The symbol "m" in the reference symbols attached to the transponders of the optical transmission apparatus 2 indicates an integer greater than or equal to 2, which indicates the number of wavelengths of a wavelength division multiplexing (WDM) signal dropped by each of the optical couplers 26 (1)-1 to 26 (1)-n and 26 (2)-1 to 26 (2)-n or the number of wavelengths of a wavelength division multiplexing (WDM) signal multiplexed by each of the optical couplers 28 (1)-1 to 28 (1)-n and 28 (2)-1 to 28 (2)-n.

In the optical transmission apparatus 2, the processing operation performed on an optical signal travelling in the second transmission direction is similar to that in the first transmission direction. Accordingly, only the processing operations performed on an optical signal in the first transmission direction by the optical transmission apparatus 2 are described below.

In the path 1, an optical signal transmitted from a device adjacent to the optical transmission apparatus 2 (for example, the relay node 3) is input to the optical attenuator 22 (1). The optical attenuator 22 (1) attenuates the input optical signal to a predetermined level. The optical signal output from the optical attenuator 22 (1) is input to the pre-amplifier 23 (1). The pre-amplifier 23 (1) amplifies the power of the input optical signal and outputs the optical signal to the optical drop switch 24 (1).

An example of the optical drop switch 24 (1) is a wavelength selectable switch (WSS) or an arrayed waveguide grating (AWG). The optical drop switch 24 (1) selects, from the optical signal output from the pre-amplifier 23 (1), n optical signals having wavelengths to be dropped. The optical signals selected by the optical drop switch 24 (1) are amplified by the corresponding optical amplifiers 25 (1)-1 to 25 (1)-n and are input to the optical couplers 26 (1)-1 to 26 (1)-n, respectively.

The optical signals input to the optical couplers 26 (1)-1 to 26 (1)-n are super-channel based optical signals. For example, an optical signal on the super-channel may be an optical signal obtained by combining optical signals of 2 to 4 waves (n=2 to 4) each on a 37.5-GHz sub-carrier. Each of the optical couplers 26 (1)-1 to 26 (1)-n drops the input optical signal into m sub-carrier optical signals. The sub-carrier optical signals output from the optical couplers 26 (1)-1 to 26 (1)-n (each outputting m sub-carrier optical signals) are input to the corresponding transponders 27(B)-1-1 to 27(B)-n-m.

The transponders 27(B)-1-1 to 27(B)-n-m perform a reception process on the input optical signals and output client signals. A particular example of the reception process performed by the transponders 27(B)-1-1 to 27(B)-n-m is described below with reference to, for example, FIG. 3.

Each of the transponders 27(A)-1-1 to 27(A)-n-m performs a transmission process on the input client signal and output an optical signal. A particular example of the transmission process performed by the transponders 27(A)-1-1 to 27(A)-n-m is described below with reference to, for example, FIG. 3. The optical signals output from the transponders 27(A)-1-1 to 27(A)-n-m correspond to the sub-carrier signals multiplexed into a corresponding one of the n super channels and are input to the corresponding optical couplers 28 (1)-1 to 28 (1)-n.

Each of the optical couplers 28 (1)-1 to 28 (1)-n multiplexes the input m optical signals and generates a super-channel based optical signal. The optical signals output from the optical couplers 28 (1)-1 to 28 (1)-n are amplified by the optical amplifiers 29 (1)-1 to 29 (1)-n, respectively, and are input to the optical add switch 30 (1).

An example of the optical add switch 30 (1) is a WSS or an AWG. The optical add switch 30 (1) multiplexes the input n optical signals. The optical signal output from the optical add switch 30 (1) is amplified by the post amplifier 31 (1) and is transmitted to a device adjacent to the optical transmission apparatus 2 (for example, another relay node 3) in the path 2.

In addition, a control signal transmitted from the optical transmission apparatus 2 disposed in the path 1 is received by the first control signal transceiver 32 (1) via the optical attenuator 22 (1). If the destination of the received control signal is the control circuit 21 (1) that controls the processing operation performed on the optical signal in the first transmission direction, the first control signal transceiver 32 (1) transmits the received control signal to the control circuit 21 (1). However, if the destination of the received control signal is the control circuit 21 (2) that controls the processing operation performed on the optical signal in the second transmission direction, the first control signal transceiver 32 (1) transmits the received control signal to the control circuit 21 (2) via the second control signal transceiver 33 (2). However, if the destination of the received control signal is another optical transmission apparatus 2 disposed in the path 2, the first control signal transceiver 32 (1) transmits the received control signal to the second control signal transceiver 33 (1). The second control signal transceiver 33 (1) transmits the received control signal to a different optical transmission apparatus 2 disposed in the path 2.

The control circuit 21 (1) controls the processing operation performed by each of the constituent elements that performs the above-described processing on a signal in the first transmission direction. Although not illustrated for simplicity of the drawing, the control circuit 21 (1) is connected to each of the constituent elements that perform the above-described processing on a signal in the first transmission direction.

The processing operation performed on an optical signal in the second transmission direction is similar to that performed on an optical signal in the first transmission direction. Note that in the processing operation performed on the optical signal in the second transmission direction, the transponders 27(A)-1-1 to 27(A)-n-m perform a reception process on the input optical signals. In contrast, the transponders 27(B)-1-1 to 27(B)-n-m perform a transmission process on the input client signals.

An example of the configuration and the processing operation of the transponders 27(A)-1-1 to 27(A)-n-m and 27(B)-1-1 to 27(B)-n-m is described below with reference to FIG. 3.

Example of Configuration of Transponder of Embodiment

Figure 3:
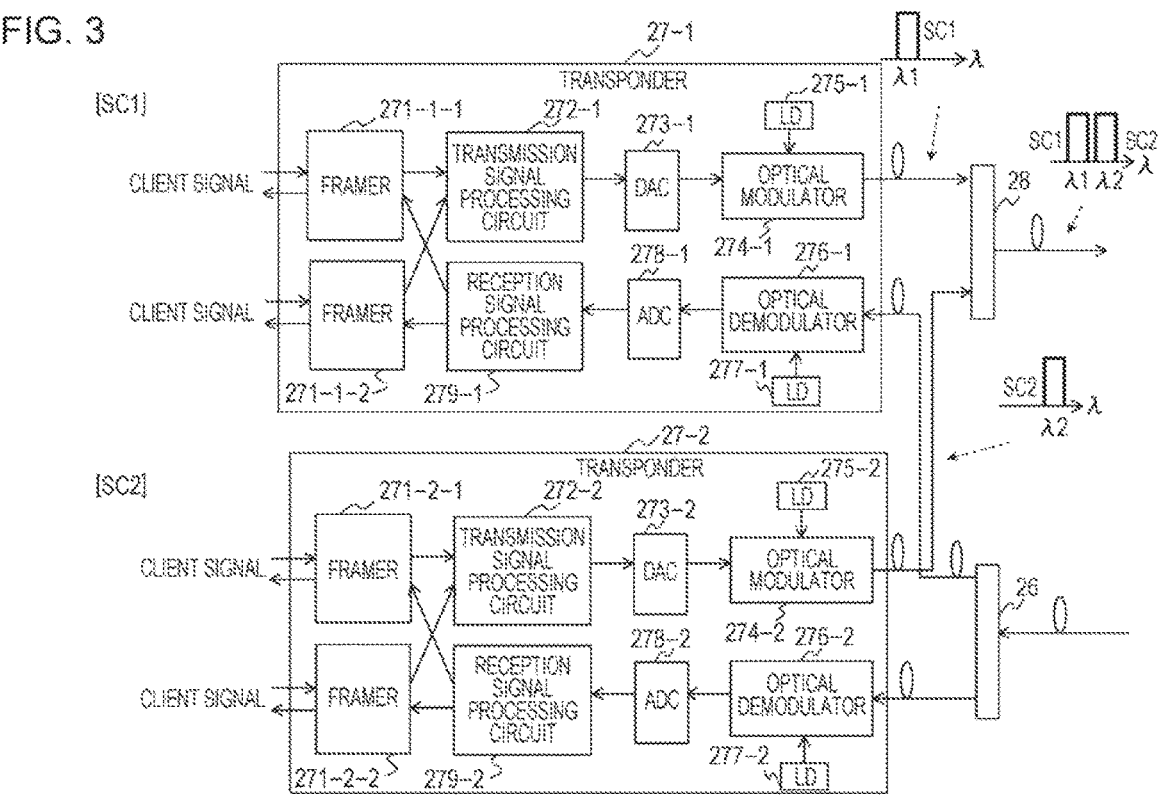
FIG. 3 is an exemplary configuration diagram of a transponder according to the exemplary embodiment.

FIG. 3 is an exemplary configuration diagram of the transponder according to an exemplary embodiment. In FIG. 3, an optical coupler 26 is an example of the optical couplers 26 (1)-1 to 26 (1)-n and the optical couplers 26 (2)-1 to 26 (2)-n. An optical coupler 28 is an example of the optical couplers 28 (1)-1 to 28 (1)-n and 28 (2)-1 to 28 (2)-n. For example, when the optical coupler 26 corresponds to the optical couplers 26 (2)-1 to 26 (2)-n, the optical coupler 28 corresponds to the optical couplers 28 (1)-1 to 28 (1)-n.

In addition, in FIG. 3, transponders 27-1 and 27-2 are examples of the transponders 27(A)-1-1 to 27(A)-n-m and the transponders 27(B)-1-1 to 27(B)-n-m when each of the number of drops (adds) n and the number of drops (multiplexed waves) m is set to 2 (n=m=2). For example, when the optical coupler 26 corresponds to the optical couplers 26 (2)-1 to 26 (2)-n, the transponders 27-1 and 27-2 correspond to the transponders 27(A)-1-1 to 27(A)-n-m.

In an example illustrated in FIG. 3, an optical signal on a sub-carrier (SC) 1 is received and transmitted by the transponder 27-1. An optical signal on a sub-carrier (SC) 2 is received and transmitted by the transponder 27-2. The optical signal on the sub-carrier (SC) 1 transmitted by the transponder 27-1 and the optical signal on the sub-carrier (SC) 2 transmitted by the transponder 27-2 are multiplexed by the optical coupler 28, and an optical signal on a super channel generated by combining two sub-carriers is generated. In addition, the optical signal on the super channel is split into an optical signal on the sub-carrier (SC) 1 and an optical signal on the sub-carrier (SC) 2 by the optical coupler 26. Thereafter, the optical signal on the sub-carrier (SC) 1 is received by the transponder 27-1, and the optical signal on the sub-carrier (SC) 2 is received by the transponder 27-2.

The transponder 27-1 includes framers 271-1-1 and 271-1-2, a transmission signal processing circuit 272-1, and a digital analog converter (DAC) 273-1. The transponder 27-1 further includes an optical modulator 274-1, a laser diode (LD) 275-1, an optical demodulator 276-1, and a laser diode (LD) 277-1. The transponder 27-1 further includes an analog digital converter (ADC) 278-1 and a reception signal processing circuit 279-1.

The transponder 27-2 includes constituent elements that are similar to those of the transponder 27-1. That is, the transponder 27-2 includes framers 271-2-1 and 271-2-2, a transmission signal processing circuit 272-2, and a digital analog converter (DAC) 273-2. The transponder 27-2 further includes the optical modulator 274-2, the laser diode (LD) 275-2, an optical demodulator 276-2, and a laser diode (LD) 277-2. The transponder 27-2 further includes an analog digital converter (ADC) 278-2 and a reception signal processing circuit 279-2.

The processing operation performed by the transponder 27-2 is similar to that performed by the transponder 27-1. Accordingly, only the processing operation performed by the transponder 27-1 is described below.

In the transponder 27-1, the client signals to be transmitted are input to the framers 271-1-1 and 271-1-2. The transmission rate of each of the client signals is, for example, 100 Gbps. Each of the framers 271-1-1 and 271-1-2 converts the input client signal into a frame of a predetermined format and transmits the frame to the transmission signal processing circuit 272-1. An example of the predetermined format is an optical transport network (OTN) frame.

The transmission signal processing circuit 272-1 extracts a payload included in each of the frames received from the framers 271-1-1 and 271-1-2. The extracted payload is, for example, the optical data unit (ODU) included in an OTU frame. The transmission signal processing circuit 272-1 multiplexes the extracted payloads and generates a main signal of a higher degree frame. An example of the higher degree frame is a higher degree OTU frame having OTU frames multiplexed thereinto. The generated main signal is, for example, an optical data unit (ODU) included in the higher degree OTU frame and includes information bits having a predetermined bit length. The transmission signal processing circuit 272-1 adds an error correction code, such as Forward Error Correction (FEC), to the main signal together with an overhead. In this manner, the transmission signal processing circuit 272-1 generates a transmission signal and outputs the generated transmission signal to the digital analog converter 273-1.

The digital analog converter 273-1 converts the transmission signal output from the transmission signal processing circuit 272-1 from an analog to a digital form. The optical modulator 274-1 modulates the light output from the laser diode 275-1 using the transmission signal converted into an analog form by the digital analog converter 273-1 and generates an optical signal. The laser diode 275-1 is an example of a semiconductor laser diode. The transmission rate of the generated optical signal is, for example, 200 Gbps. The optical signal generated by the optical modulator 274-1 is input to the optical coupler 28 via an optical cable.

In addition, the optical signal output from the optical coupler 26 is input to the optical demodulator 276-1 via an optical cable. The optical demodulator 276-1 demodulates the optical signal using the light output from the laser diode 277-1 and outputs an electrical signal. The laser diode 277-1 is an example of a semiconductor laser diode. The analog digital converter 278-1 converts the electrical signal output from the optical demodulator 276-1 from an analog to a digital form.

The reception signal processing circuit 279-1 decodes the digitally converted electrical signal into a main signal of the high degree frame using an error correction code. Thereafter, the reception signal processing circuit 279-1 extracts low degree frames from the decoded main signal and sends the extracted low degree frames to the corresponding framers 271-1-1 and 271-1-2. The framers 271-1-1 and 271-1-2 extract the input client signals from the extracted low degree frames and output the extracted client signals.

Note that FIG. 3 illustrates an only exemplary configuration of the transponder according to an exemplary embodiment. For example, each of the number of adds n and the number of drops (the number of multiplexed waves) m is not limited to 2. The number may be 3 or more. In addition, any number of the client signals to be received and transmitted by each of the transponders may be used.

Examples of Configurations of Transmission Signal Processing Circuit and Reception Signal Processing Circuit of Embodiment Examples of the configurations and the processing operations of the transmission signal processing circuit and the reception signal processing circuit are described below.

Figure 4:
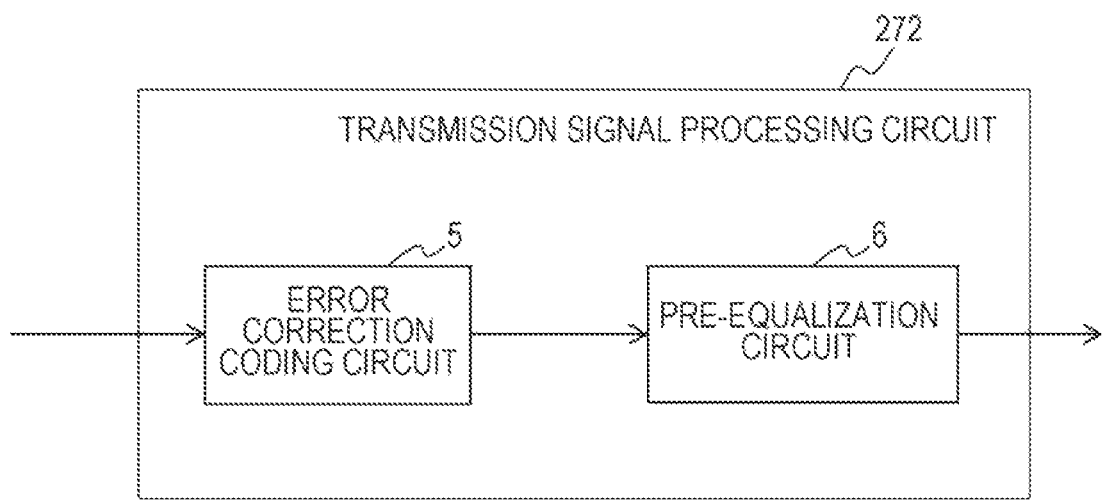
FIG. 4 is an exemplary configuration diagram of a transmission signal processing circuit according to the exemplary embodiment.

FIG. 4 is an exemplary configuration diagram of the transmission signal processing circuit according to the exemplary embodiment. A transmission signal processing circuit 272 illustrated in FIG. 4 corresponds to the transmission signal processing circuits 272-1 and 272-2. The transmission signal processing circuit 272 includes an error correction coding circuit 5 and a pre-equalization circuit 6.

The error correction coding circuit 5 adds an error correction code, such as FEC, to the main signal included in a frame of a predetermined format. As described above, the main signal is, for example, an optical data unit (ODU) included in an OTU frame and includes the information bits having a predetermined bit length. The pre-equalization circuit 6 compensates for, for example, the wavelength dispersion, a frequency offset, and the input/output characteristics of a digital analog converter and an optical modulator for the transmission signal having the error correction code added thereto.

Figure 5:
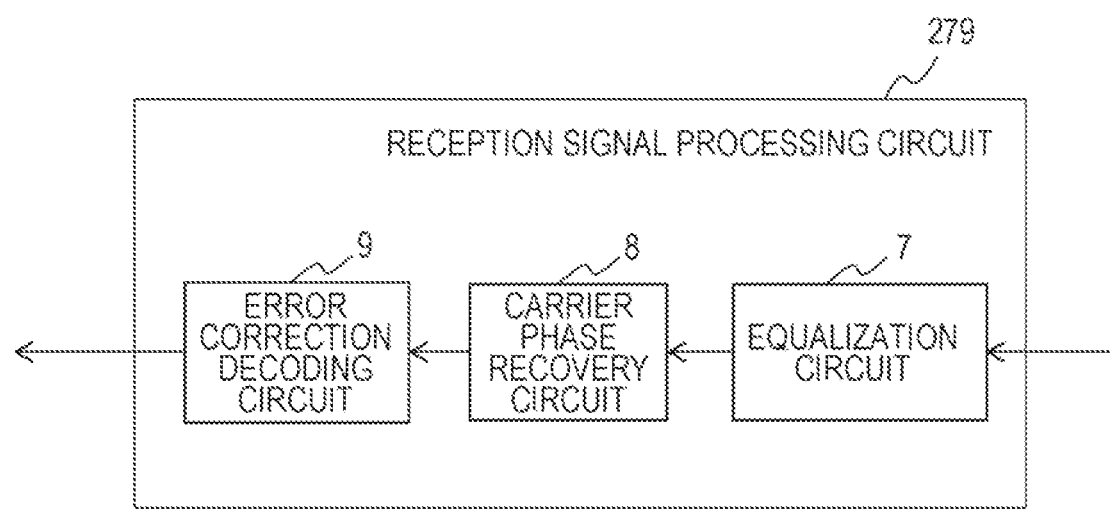
FIG. 5 is an exemplary configuration diagram of a reception signal processing circuit according to the exemplary embodiment.

FIG. 5 is an exemplary configuration diagram of the reception signal processing circuit according to the exemplary embodiment. The reception signal processing circuit 279 illustrated in FIG. 5 corresponds to the reception signal processing circuits 279-1 and 279-2. The reception signal processing circuit 279 includes an equalization circuit 7, a carrier phase recovery circuit 8, and an error correction decoding circuit 9.

The equalization circuit 7 compensates for, for example, the wavelength dispersion, a frequency offset, the polarization mode dispersion, and the waveform distortion caused by the non-linear optical effect for the input digital reception signal. The carrier phase recovery circuit 8 recovers, from the signal output from the equalization circuit 7, a signal (a symbol) represented by an In-phase (I) axis and a Quadrature-phase (Q) axis. The error correction decoding circuit 9 decodes the signal recovered by the carrier phase recovery circuit 8 using the error correction code to obtain the main signal.

Examples of the configurations and the processing operations of the error correction coding circuit and the error correction decoding circuit are described below.

Example of Configuration of Error Correction Coding Circuit of Embodiment

An example of the configuration and the processing operation of the error correction coding circuit is described first with reference to FIGS. 6 to 12.

Figure 6:
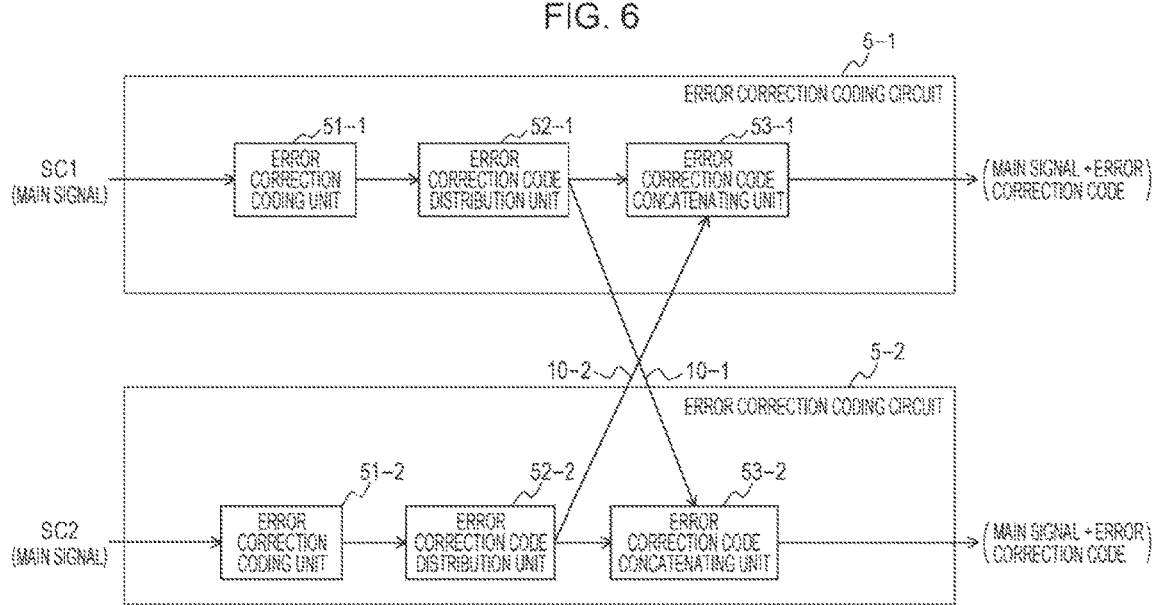
FIG. 6 is an exemplary configuration diagram of an error correction coding circuit according to the exemplary embodiment.

FIG. 6 is an exemplary configuration diagram of the error correction coding circuit according to the exemplary embodiment. Error correction coding circuits 5-1 and 5-2 illustrated in FIG. 6 are examples of the error correction coding circuit 5 (refer to FIG. 4) included in the transmission signal processing circuit 272. In addition, the error correction coding circuit 5-1 corresponds to the error correction coding circuit included in the transmission signal processing circuit 272-1 (refer to FIG. 3) that processes a transmission signal on the sub-carrier (SC) 1. The error correction coding circuit 5-2 corresponds to the error correction coding circuit included in the transmission signal processing circuit 272-2 (refer to FIG. 3) that processes a transmission signal on the sub-carrier (SC) 2.

In the example illustrated in FIG. 6, the error correction coding circuit 5-1 includes an error correction coding unit 51-1, an error correction code distribution unit 52-1, and an error correction code concatenating unit 53-1. Similarly, the error correction coding circuit 5-2 includes an error correction coding unit 51-2, an error correction code distribution unit 52-2, and an error correction code concatenating unit 53-2.

The error correction coding units 51-1 and 51-2 add, to the main signal, an error correction code having a code length in accordance with the transmission quality of each of the sub-carriers making up the super channel. That is, the error correction coding unit 51-1 adds an error correction code having a code length corresponding to the transmission quality of the sub-carrier 1 to the main signal, and the error correction coding unit 51-2 adds an error correction code having a code length corresponding to the transmission quality of the sub-carrier 2 to the main signal. The reason why the error correction coding unit according to an exemplary embodiment adds, to the main signal, an error correction code having a code length in accordance with the transmission quality of each of the sub-carriers making up the super channel is described below.

In super-channel transmission, a super channel formed by combining a plurality of sub-carriers forms an optical path. Accordingly, the transmission performance of the super channel is determined by, among sub-channels making up the super channel, a sub-channel having the lowest transmission quality. For example, if, as in a 400-Gbps super channel (a sub-channel of 100 Gbps×4), four sub-channels are combined, a variation of the reception Q value occurs among the sub-channels in accordance with the transmission conditions, as illustrated in FIG. 7.

Figure 7:
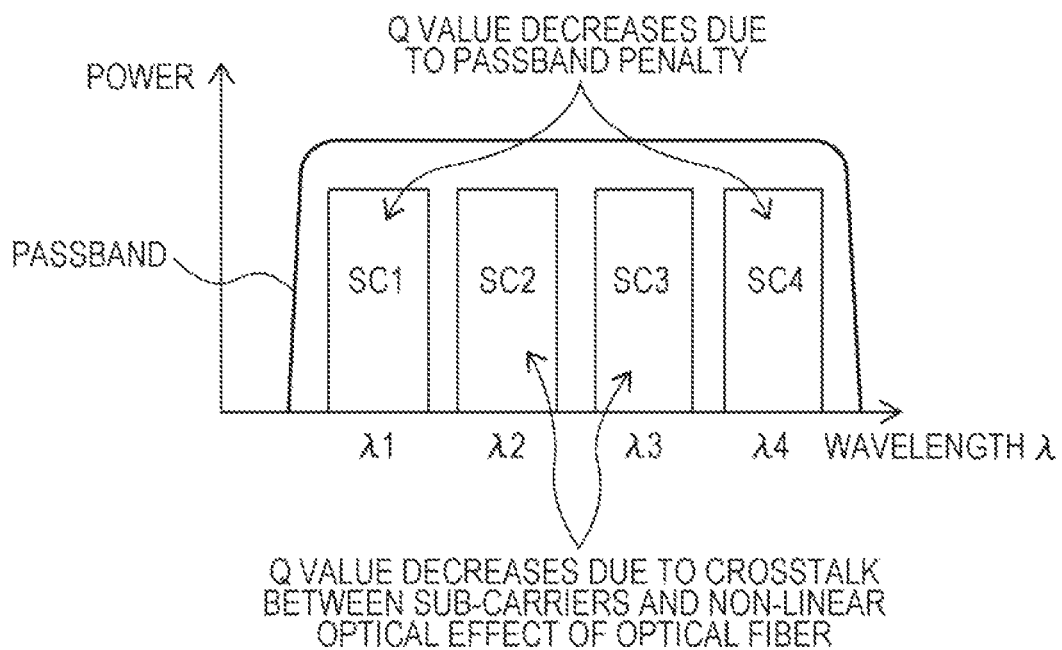
FIG. 7 illustrates examples of the factors that cause a decrease in the reception Q value.

FIG. 7 illustrates examples of the factors that cause a decrease in the reception Q value. In FIG. 7, the ordinate represents the power, and the abscissa represents a wavelength. The reception Q value is an example of an index of the transmission quality of a received optical signal. If distributions of the levels of mark "1" and space "0" are Gaussian distributions having standard deviations of $\sigma 1$ and $\sigma 0$, respectively, the Q value is expressed by the following equation (1).

$$Q = \frac{|\mu_1 - \mu_0|}{\sigma_1 + \sigma_0} \quad (1)$$

In equation (1), $\mu_1$ represents the mean value of the levels of mark "1", and $\mu_0$ represents the mean value of the levels of space "0". Note that the bit error rate (BER) is expressed by the following equation (2).

$$BER = \frac{1}{2}\text{erfc}\left(\frac{Q}{\sqrt{2}}\right) \quad (2)$$

In equation (2), erfc represents the complementary error function.

Among the sub-carriers making up a super channel, the sub-carriers located at both ends of the super channel (for example, SC1 and SC4 in FIG. 7) are influenced by the passband characteristics of the optical drop and add switches included in an OADM of the optical transmission apparatus (for example, WSS or AWG). Accordingly, the deterioration of the Q value caused by the influence of the passband characteristic is greater for the sub-carriers located at both ends than for the sub-carriers located in the middle section of the super channel (for example, SC2 and SC3 in FIG. 7).

In contrast, among the sub-carriers making up the super channel, the sub-carriers located in the middle section of the super channel (for example, SC2 and SC3 in FIG. 7) are influenced by the linear crosstalk between adjacent sub-carriers and the non-linear optical effect (the cross phase modulation) of an optical fiber. Accordingly, the deterioration of the Q value due to the influence of linear crosstalk and the non-linear optical effect is greater for the sub-carriers located in the middle section of the super channel than for the sub-carriers located at both ends of the super-channel.

The type of configuration of the optical transmission system including the optical transmission apparatus determines which one of the deterioration of the Q value caused by the influence of the passband characteristic and the deterioration of the Q value caused by the influence of linear crosstalk and the non-linear optical effect is greater. For example, in optical transmission systems such as point-to-point optical transmission systems that has a small number of OADM stages in the optical transmission apparatus and that uses, as a transmission line, an optical fiber having a large waveform deformation characteristics caused by the non-linear optical effect (for example, Non-zero Dispersion Shifted Fiber (NZ-DSF)), the amount of deterioration of the Q value caused by the linear crosstalk between the sub-carriers may be greater than the amount of deterioration of the Q value caused by the passband characteristics.

As described above, the transmission qualities of the sub-carriers making up a super channel may differ from one another. To keep the transmission qualities that may differ from one another to be greater than or equal to a predetermined value, it is desirable that data be transmitted in the super channel based on the sub-carrier having a low transmission quality. As a result, the transmission performance of the super channel is limited by the sub-carrier having a low transmission quality.

Accordingly, the error correction coding unit according to the exemplary embodiment (for example, the error correction coding units 51-1 and 51-2 (refer to FIG. 6)) is configured so as to add the error correction code having a desired code length to the main signal in accordance with the transmission quality of each of the sub-carriers making up the super channel. In such a configuration, an error correction code having a longer bit length is added for a sub-carrier having lower transmission quality. As a result, the transmission performance of the super channel is improved regardless of the variation of the transmission quality among the sub-carriers making up the super channel.

Each of the error correction code distribution units 52-1 and 52-2 retrieves, from the error correction code added to the main signal on the sub-carrier to be processed, a code portion in excess of a predetermined redundancy level and distributes the code portion to another sub-carrier. In an example illustrated in FIG. 6, the error correction code distribution unit 52-1 retrieves, from the error correction code added to the main signal on the sub-carrier 1 by the error correction coding unit 51-1, a code portion in excess of a predetermined redundancy level and sends, via a bus 10-1, the code portion to the error correction code concatenating unit 53-2 that performs processing for the sub-carrier 2. In addition, the error correction code distribution unit 52-2 retrieves, from the error correction code added to the main signal on the sub-carrier 2, a code portion in excess of a predetermined redundancy level and sends, via a bus 10-2, the code portion to the error correction code concatenating unit 53-1 that performs processing for the sub-carrier 1. The predetermined redundancy level is predetermined for a transmission and reception signal on each of the sub-carriers making up the super channel.

Figure 8:
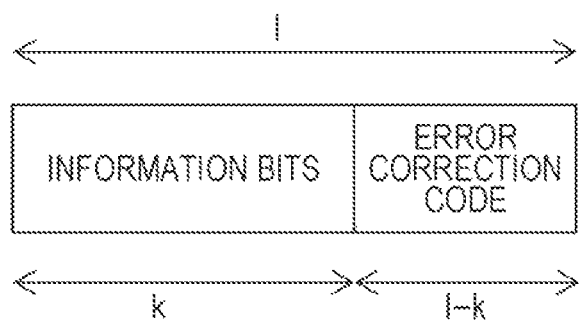
FIG. 8 illustrates the redundancy level of a transmission and reception signal.

FIG. 8 illustrates the redundancy level of a transmission and reception signal. Let k be the bit length of the main signal (the information bits), and let l be the total bit length of a transmission and reception signal having the error correction code added to the main signal. Then, the redundancy level of the transmission signal or the reception signal is expressed by the following equation (3).

$$\text{redundancy level} = \frac{l-k}{k} = \frac{l}{k} - 1 \quad (3)$$

Note that according to the exemplary embodiment, the code rate is given by the following equation (4).

$$\text{code rate} = \frac{k}{l} \quad (4)$$

The reason why the error correction code distribution unit retrieves, from the error correction code added to the main signal on a sub-carrier to be processed, a code portion in excess of a predetermined redundancy level and distributes the code portion to another sub-carrier is described below.

Figure 9:
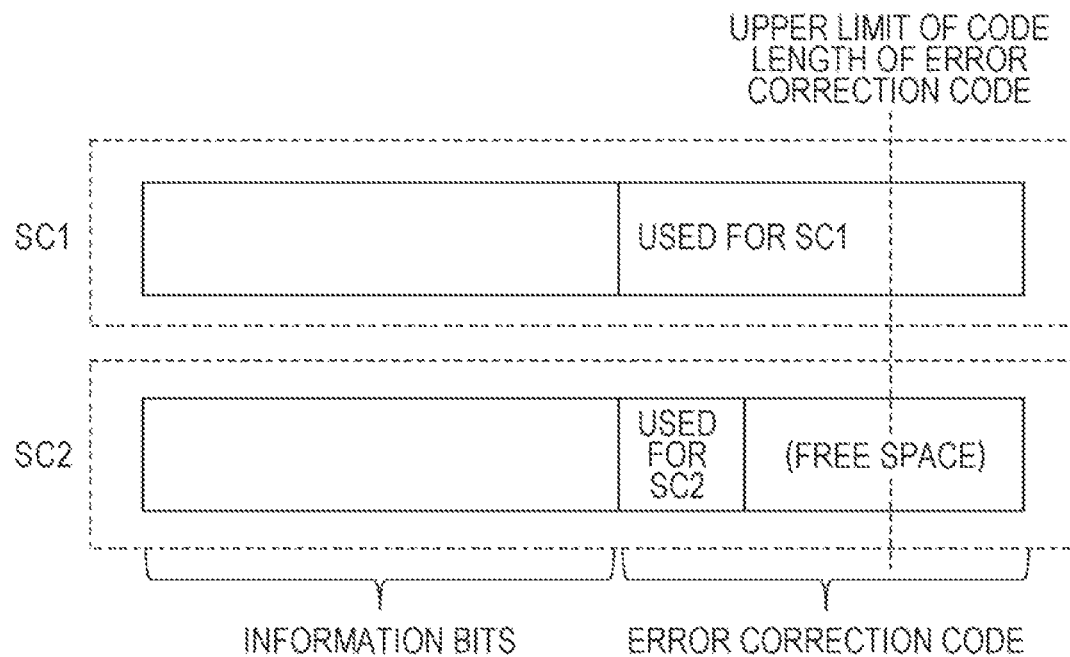
FIG. 9 illustrates a signal on each of sub-carriers when an error correction code is not distributed among the sub-carriers.
Figure 10:
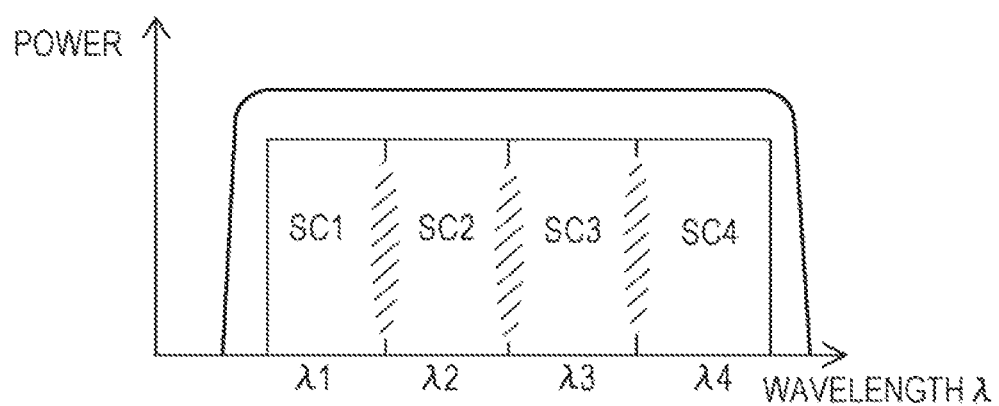
FIG. 10 illustrates a super channel when the error correction code is not distributed among the sub-carriers.

FIG. 9 illustrates a signal on each of the sub-carriers when the error correction code is not distributed among the sub-carriers. As described above, to improve the low transmission quality of a sub-carrier so that the transmission quality is increased to the predetermined transmission quality value or higher, an error correction code having a long code length is used. Accordingly, if the error correction code is not shared among the sub-carriers, an error correction code having a long code length is added to the main signal on the sub-carrier having a low transmission quality. In an example illustrated in FIG. 9, the error correction code having a code length longer than that on the sub-carrier (SC) 2 having a high transmission quality is added to the main signal (the information bits) on the sub-carrier (SC) 1 having a low transmission quality. It is desirable that the length of the information bits, which is a payload, be maintained at a predetermined length (a predetermined number of bits). Accordingly, to increase the code length of the error correction code, it is desirable that the bit rate of the transmission signal and the reception signal on each of the sub-carriers be increased. However, if, as illustrated in FIG. 10, the bit rate is increased, the optical spectrum width of each of the sub-carriers increases and, thus, interference between adjacent sub-carriers occurs (refer to an area with hatching in FIG. 10), resulting in deterioration of the transmission performance of the super channel. FIG. 10 illustrates a super channel when the error correction code is not distributed among the sub-carriers. As described above, in super-channel transmission, to maintain the spacing between the sub-carriers and keep the transmission quality of the super channel at a predetermined level or higher, the upper limit of the allowable bit rate exists. For example, if two sub-carriers are used in a 75-GHz bandwidth, it is desirable that the sub-carrier spacing be 37.5 GHz.

Accordingly, the error correction code distribution unit according to the exemplary embodiment (the error correction code distribution units 52-1 and 52-2 (refer to FIG. 6)) retrieve, from the error correction code added to the main signal on a sub-carrier to be processed, a code portion in excess of a predetermined redundancy level and distributes the code portion to another sub-carrier. Note that as equation (3) indicates, the predetermined redundancy level desirable for a transmission and reception signal to maintain the transmission quality of the super channel may be calculated using the length of the main signal (the information bits) and the total bit length of the transmission signal or the reception signal having the error correction code added to the main signal. The bit length of the main signal may be preset to a predetermined length. The total bit length of the transmission and reception signal may be set so as to correspond to the upper limit of the allowable bit rate to keep the transmission quality of the super channel unchanged.

Figure 11:
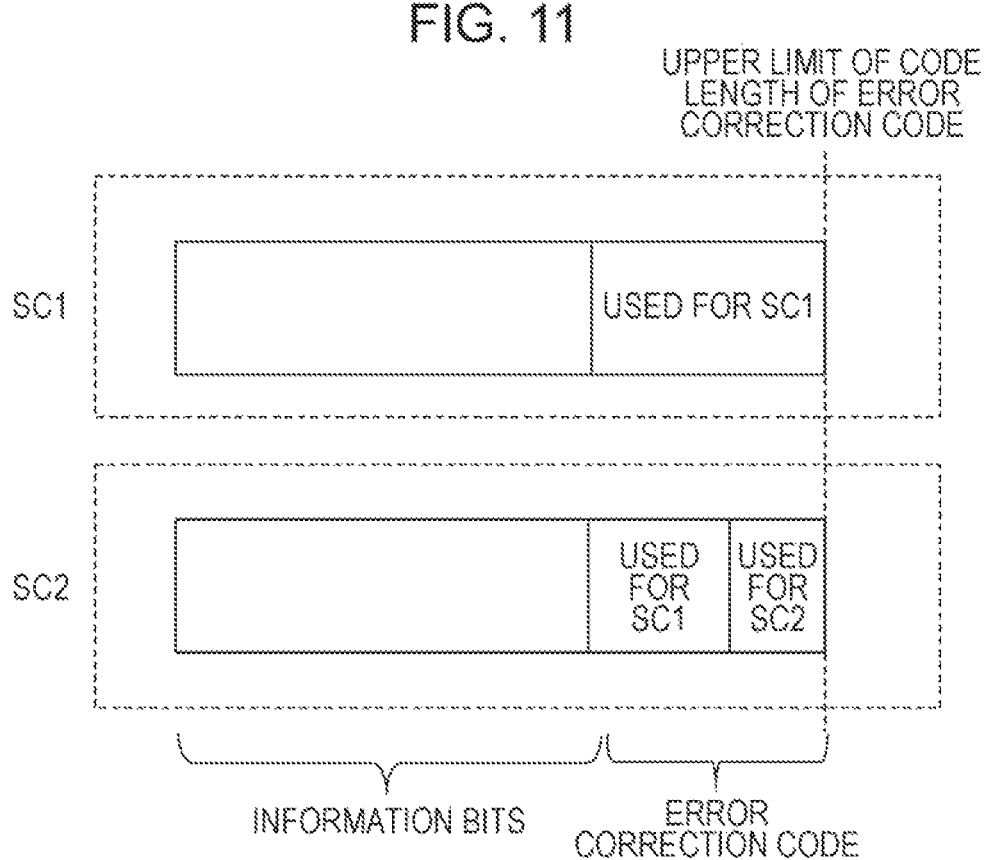
FIG. 11 illustrates a signal on each of the sub-carriers when the error correction code is distributed among the sub-carriers.
Figure 12:
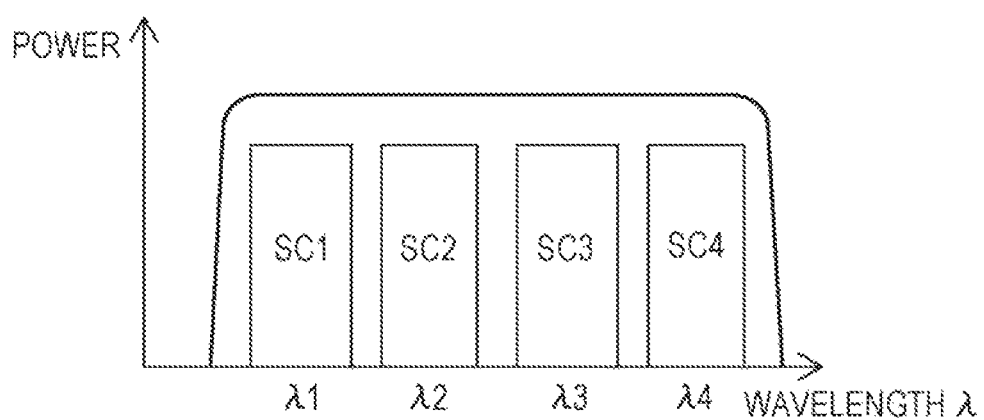
FIG. 12 illustrates the super channel when the error correction code is distributed among the sub-carriers.

FIG. 11 illustrates a signal on each of the sub-carriers when the error correction code is distributed among the sub-carriers. In an example illustrated in FIG. 11, from the error correction code added to a main signal on the sub-carrier (SC) 1, a code portion in excess of a predetermined redundancy level is retrieved and distributed to the sub-carrier (SC) 2. As described above, in the optical transmission apparatus according to the exemplary embodiment, from the error correction code for the sub-carrier having a low transmission quality, a code portion in excess of a predetermined redundancy level is distributed to another sub-carrier having a high transmission quality. Thus, the bit rate of a transmission and reception signal of each of the sub-carriers is within a range of the bit rate allowable for keeping the transmission quality of the super channel at a predetermined level or higher. FIG. 12 illustrates the super channel when the error correction code is distributed among the sub-carriers. Since the bit rate of a transmission and reception signal on each of the sub-carriers is within the allowable range of the bit rate, the optical spectrum width of each of the sub-carrier is within the sub-carrier spacing between adjacent sub-carriers, as illustrated in FIG. 12. Accordingly, no interference occurs between adjacent sub-carrier and, thus, deterioration of the transmission performance of the super channel is reduced. Since the error correction code is distributed among the sub-carriers in this manner, the redundancy level of a transmission and reception signal having an error correction code of a desired length added to the main signal is reduced. Thus, the transmission performance of the super channel is improved.

Each of the error correction code concatenating units 53-1 and 53-2 concatenates the code portion of the error correction code added to a main signal on another sub-carrier, which is in excess of a predetermined redundancy level, to the error correction code added to a main signal on the sub-carrier to be processed. In the example illustrated in FIG. 6, the error correction code concatenating unit 53-1 receives, from the error correction code distribution unit 52-2, the code portion of the code portion of the error correction code added to the main signal on the sub-carrier 2 (the code portion in excess of a predetermined redundancy level). Thereafter, the error correction code concatenating unit 53-1 concatenates the received code portion to the error correction code added to the main signal on the sub-carrier 1 and generates the transmission signal on the sub-carrier 1. Similarly, the error correction code concatenating unit 53-2 receives, from the error correction code distribution unit 52-1, the code portion of the error correction code added to the main signal on the sub-carrier 1 (the code portion in excess of a predetermined redundancy level). Thereafter, the error correction code concatenating unit 53-2 concatenates the received code portion to the error correction code added to the main signal on the sub-carrier 2 and generates the transmission signal on the sub-carrier 2. Since the error correction code is distributed among the sub-carriers in this manner, the redundancy level of a transmission and reception signal having an error correction code of a desired length added to the main signal is reduced. Thus, the transmission performance of the super channel is improved.

Example of Configuration of Error Correction Decoding Circuit of Embodiment

An example of the configuration and the processing operation of the error correction decoding circuit according to the exemplary embodiment is described below with reference to FIG. 13.

Figure 13:
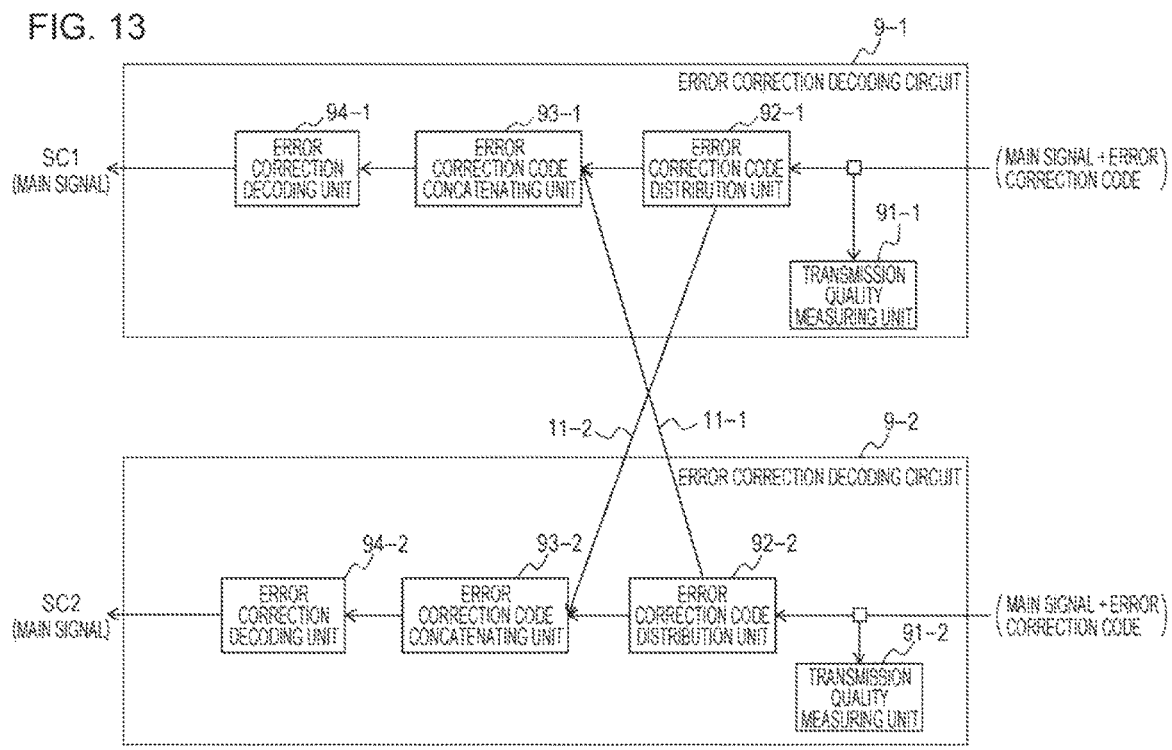
FIG. 13 is an exemplary configuration diagram of an error correction decoding circuit according to the exemplary embodiment.

FIG. 13 is an exemplary configuration diagram of an error correction decoding circuit according to the exemplary embodiment. Each of error correction decoding circuits 9-1 and 9-2 illustrated in FIG. 13 is an example of the error correction decoding circuit 9 included in the reception signal processing circuit 279 (refer to FIG. 5). In addition, the error correction decoding circuit 9-1 corresponds to the error correction decoding circuit in the reception signal processing circuit 279-1 (refer to FIG. 3) that processes a reception signal on the sub-carrier (SC) 1, while the error correction decoding circuit 9-2 corresponds to the error correction decoding circuit in the reception signal processing circuit 279-2 (refer to FIG. 3) that processes a reception signal on the sub-carrier (SC) 2.

In an example illustrated in FIG. 13, the error correction decoding circuit 9-1 includes a transmission quality measuring unit 91-1, an error correction code distribution unit 92-1, an error correction code concatenating unit 93-1, and an error correction decoding unit 94-1. Similarly, the error correction decoding circuit 9-2 includes a transmission quality measuring unit 91-2, an error correction code distribution unit 92-2, an error correction code concatenating unit 93-2, and an error correction decoding unit 94-2.

The transmission quality measuring units 91-1 and 91-2 measure the transmission quality of a reception signal having no error correction code added thereto. That is, the transmission quality measuring unit 91-1 measures the transmission quality (for example, the Q value) of the reception signal on the sub-carrier (SC) 1. The transmission quality measuring unit 91-2 measures the transmission quality (for example, the Q value) of the reception signal on the sub-carrier (SC) 2.

As described below with reference to FIGS. 23 to 30, the transmission quality measured by each of the transmission quality measuring units 91-1 and 91-2 is used to select a desired redundancy level from among a plurality of settable redundancy levels assigned to the sub-carriers in advance. Selection of the redundancy level may be made before the optical transmission system according to the exemplary embodiment starts operating. Alternatively, the selection of the redundancy level may be made in operation of the optical transmission system according to the exemplary embodiment.

One or more settable redundancy levels may be assigned to each of the sub-carriers in advance in accordance with the configuration of the optical transmission system according to the exemplary embodiment. Note that the error correction coding unit (for example, the error correction coding unit 51-1 or 51-2) and the error correction decoding unit (for example, the error correction decoding unit 94-1 or 94-2) are provided for each of the redundancy levels. Accordingly, if an excessive number of redundancy levels are provided, the circuit scale of the optical transmission apparatus increases. In addition, even when a plurality of the error correction codes having different redundancy levels are used, it is difficult to provide improvement of the transmission quality resulted from the error correction code having a redundancy level which is the sum of the redundancy levels. For example, even when an error correction coding unit and an error correction decoding unit corresponding to a redundancy level of 5% and an error correction coding unit and an error correction decoding unit corresponding to a redundancy level of 10% are combined, it is difficult to provide the improvement of the Q value obtained from an error correction coding unit and an error correction decoding unit corresponding to a redundancy level of 15%. Accordingly, if a plurality of selectable redundancy levels are provided in advance, only the redundancy levels that are likely to be set may be provided, and the error correction coding unit and the error correction decoding unit may be configured so as to select a desired redundancy level from among the provided redundancy levels.

Each of the error correction code distribution units 92-1 and 92-2 extracts, from the reception signal on the sub-carrier to be processed, the error correction code distributed to another sub-carrier. The extracted error correction code is the code portion of the error correction code added to a main signal on another sub-carrier, which is in excess of a predetermined redundancy level. In the example illustrated in FIG. 13, the error correction code distribution unit 92-1 extracts the code portion to be added to the main signal on the sub-carrier (SC) 2 and sends, via a bus 11-2, the extracted code portion to the error correction code concatenating unit 93-2 that performs processing for the sub-carrier 2. In addition, the error correction code distribution unit 92-2 extracts the code portion to be added to the main signal on the sub-carrier (SC) 1 and sends, via a bus 11-1, the extracted code portion to the error correction code concatenating unit 93-1 that performs processing for the sub-carrier 1. Since the error correction code is distributed among the sub-carriers in this manner, the redundancy level of a transmission and reception signal having an error correction code of a desired length added to the main signal is reduced. Thus, the transmission performance of the super channel is improved.

The error correction code concatenating units 93-1 and 93-2 concatenates the code portion in excess of a predetermined redundancy level (that is, the code portion of the error correction code added to a main signal on a sub-carrier to be processed) to the error correction code included in the reception signal. In the example illustrated in FIG. 13, the error correction code concatenating unit 93-1 receives, from the error correction code distribution unit 92-2, the code portion in excess of a predetermined redundancy level (that is, the code portion of the error correction code added to the main signal on the sub-carrier 1). Thereafter, the error correction code concatenating unit 93-1 concatenates the received code portion to the error correction code included in the reception signal and generates a reception signal on the sub-carrier 1. Similarly, the error correction code concatenating unit 93-2 receives, from the error correction code distribution unit 92-1, the code portion in excess of a predetermined redundancy level (that is, the code portion of the error correction code added to a main signal on the sub-carrier 2). Thereafter, the error correction code concatenating unit 93-2 concatenates the received code portion to the error correction code included in the reception signal and generates a reception signal on the sub-carrier 2. Each of the error correction codes concatenated by the error correction code concatenating units 93-1 and 93-2 has a code length in accordance with the transmission quality of each of the sub-carriers making up the super channel. Accordingly, the transmission performance of the super channel is improved regardless of a variation of the transmission quality among the sub-carriers making up the super channel.

Each of the error correction decoding units 94-1 and 94-2 decodes the main signal in the reception signal on the corresponding sub-carrier by using the concatenated error correction code.

Examples of the configurations of the error correction coding circuit and the error correction decoding circuit according to the exemplary embodiment are described in more detail with reference to FIGS. 14 to 22B.

First Example of Configurations of Error Correction Coding Circuit and Error Correction Decoding Circuit of Exemplary Embodiment As a first example of the configurations, the configuration of a circuit capable of improving the transmission quality of a particular sub-channel of the super channel that combines a plurality of sub-channels is described first with reference to FIGS. 14 to 18.

Figure 14:
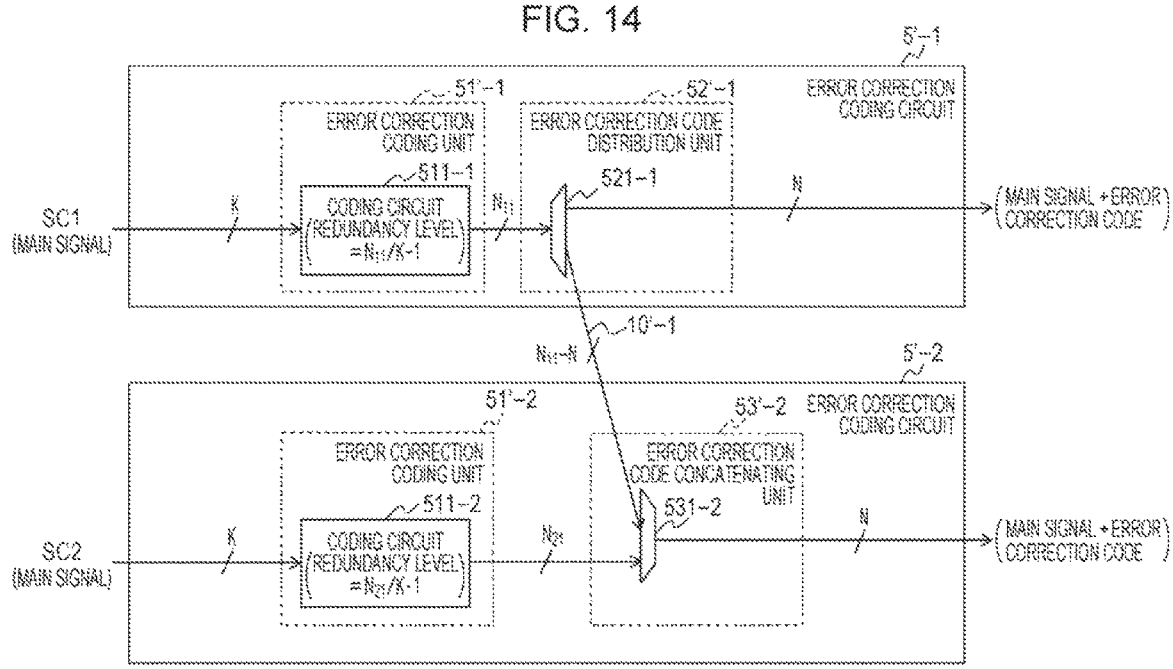
FIG. 14 is a first example of the configuration of the error correction coding circuit according to the exemplary embodiment.

FIG. 14 is a first example of the configuration of the error correction coding circuit according to the exemplary embodiment. In FIG. 14, the first example of the error correction coding circuit for a super channel that combines the sub-carrier (SC) 1 and the sub-carrier (SC) 2 is illustrated. An error correction coding circuit 5'-1 is a circuit that adds an error correction code to a main signal corresponding to the sub-carrier 1. An error correction coding circuit 5'-2 is a circuit that adds an error correction code to a main signal corresponding to the sub-carrier 2. In the first example of the configuration, the error correction coding circuit 5'-1 and 5'-2 are configured so that a portion of the error correction code added to the sub-carrier 1 in excess of a predetermined redundancy level is distributed to the sub-carrier 2.

Figure 15:
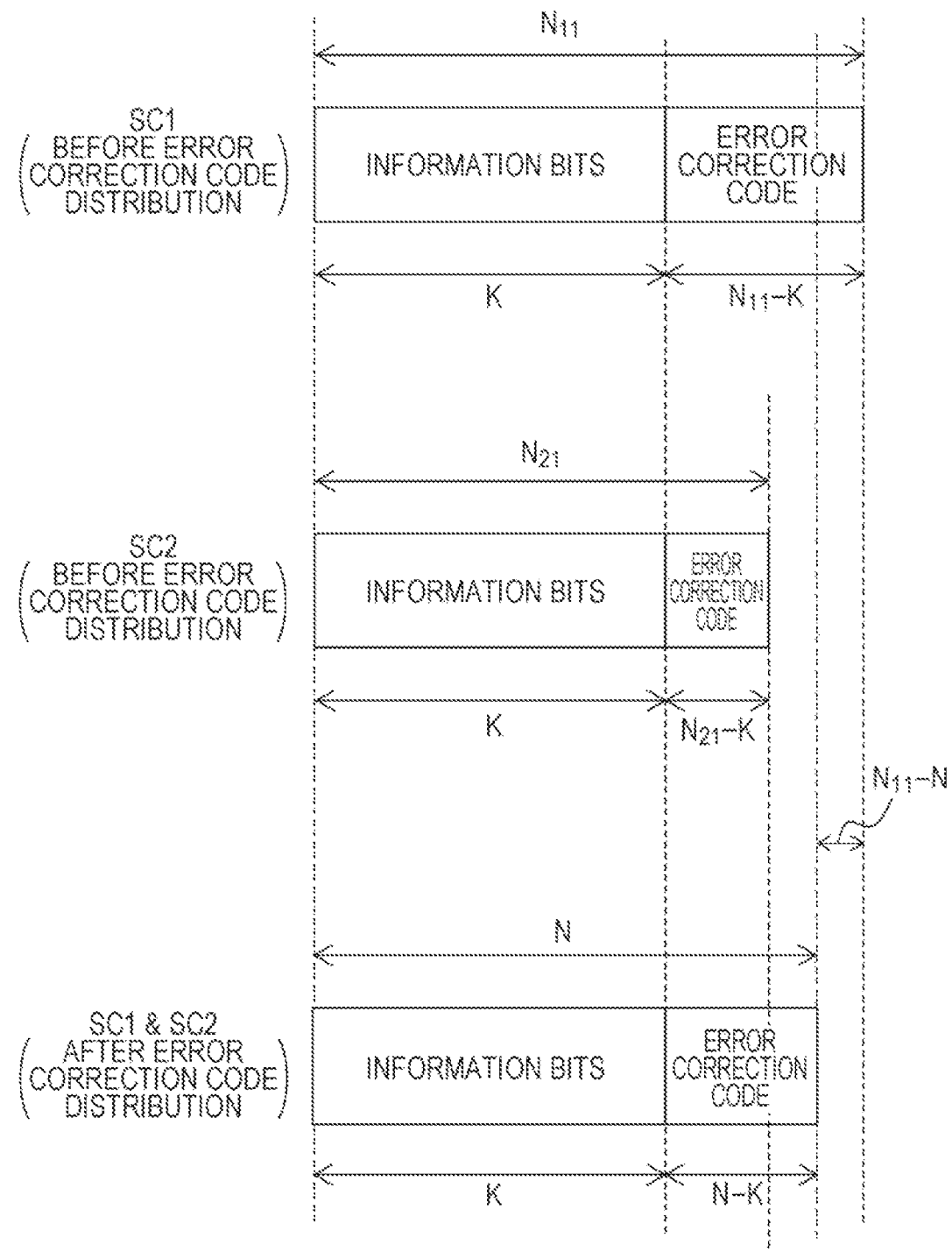
FIG. 15 illustrates redundancy level distribution among the sub-carriers in a first example of the configuration.

FIG. 15 illustrates redundancy level distribution among the sub-carriers in the first example of the configuration. In FIG. 15, each of $N_{11}$ and $N_{21}$ represents the total bit length of a transmission signal having an error correction code of a desired code length added to information bits (a main signal). As used herein, the term "error correction code of a desired code length" refers to an error correction code of a length capable of providing the transmission quality of an optical signal on a corresponding sub-carrier.

More specifically, an ($N_{11}$–K)-bit error correction code is added to K-bit information bits (a main signal) so that a signal on the sub-carrier 1 has predetermined transmission quality. That is, in the error correction coding circuit 5'-1, a coding circuit 511-1 adds, to the K-bit information bits (the main signal), an error correction code that makes the redundancy level of a transmission signal equal to ($N_{11}$/K–1). The coding circuit 511-1 is a particular example of the configuration of an error correction coding unit 51'-1.

In addition, ($N_{21}$–K)-bit error correction code is added to K-bit information bits (a main signal) so that an optical signal on the sub-carrier 2 has predetermined transmission quality. That is, in the error correction coding circuit 5'-2, a coding circuit 511-2 adds, to the K-bit information bits (the main signal), an error correction code that makes the redundancy level of a transmission signal equal to ($N_{21}$/K–1). The coding circuit 511-2 is a particular example of the configuration of an error correction coding unit 51'-2.

In FIG. 15, N represents a predetermined bit length of a transmission and reception signal on each of the sub-carriers. For example, N is set to a length that is desirable to keep the transmission quality of the super channel to be greater than or equal to a predetermined level in accordance with an increase in the bit rate. In an example illustrated in FIG. 15, N is defined by the following equation (5).

$$N = \frac{N_{11} + N_{21}}{2} \quad (5)$$

In the example illustrated in FIG. 15, the total bit length $N_{11}$ of the transmission signal on the sub-carrier 1 is longer than a total bit length N that is desirable for a transmission and reception signal on each of the sub-carriers. In contrast, the total bit length $N_{21}$ of the transmission signal on the sub-carrier 2 is shorter than the total bit length N that is desirable for a transmission and reception signal on each of the sub-carriers. Accordingly, in the first example of the configuration, out of the ($N_{11}$–K)-bit error correction code added for the sub-carrier 1, a portion in excess of the predetermined redundancy level (N/K–1) that is desirable for a transmission and reception signal on each of the sub-carriers is retrieved and distributed to the sub-carrier 2.

More specifically, in the error correction coding circuit 5'-1, a distributor 521-1 retrieves, from ($N_{11}$–K)-bit error correction code, a portion ($N_{11}$–N) in excess of the predetermined redundancy level (N/K–1) and distributes the retrieved portion to the error correction coding circuit 5'-2 via a bus 10'-1. The distributor 521-1 is a particular example of an error correction code distribution unit 52'-1.

In addition, in the error correction coding circuit 5'-2, a concatenator 531-2 concatenates the portion ($N_{11}$–N) distributed by the distributor 521-1, which is a portion of the error correction code added for the sub-carrier 1, to the error correction code added for the sub-carrier 2. The concatenator 531-2 is a particular example of an error correction code concatenating unit 53'-2.

By distributing the error correction code as described above, the code length of the error correction code added to a main signal on each of the sub-carrier 1 and the sub-carrier 2 is set to (N–K). As a result, even when the error correction code having a desired length is added to the main signal, the redundancy level of a transmission and reception signal in each of the sub-carriers is reduced and, thus, the transmission performance of the super channel is improved.

Note that in the example of the configuration illustrated in FIG. 14, the bit width of the bus 10'-1 is allocated in accordance with the distributed number of bits ($N_{11}$–N). By allocating the bit width in this manner, it is allowed to remove clock transfer of the operating clock caused by different desired code lengths of the error correction codes on the sub-carriers making up the super channel.

Figure 16:
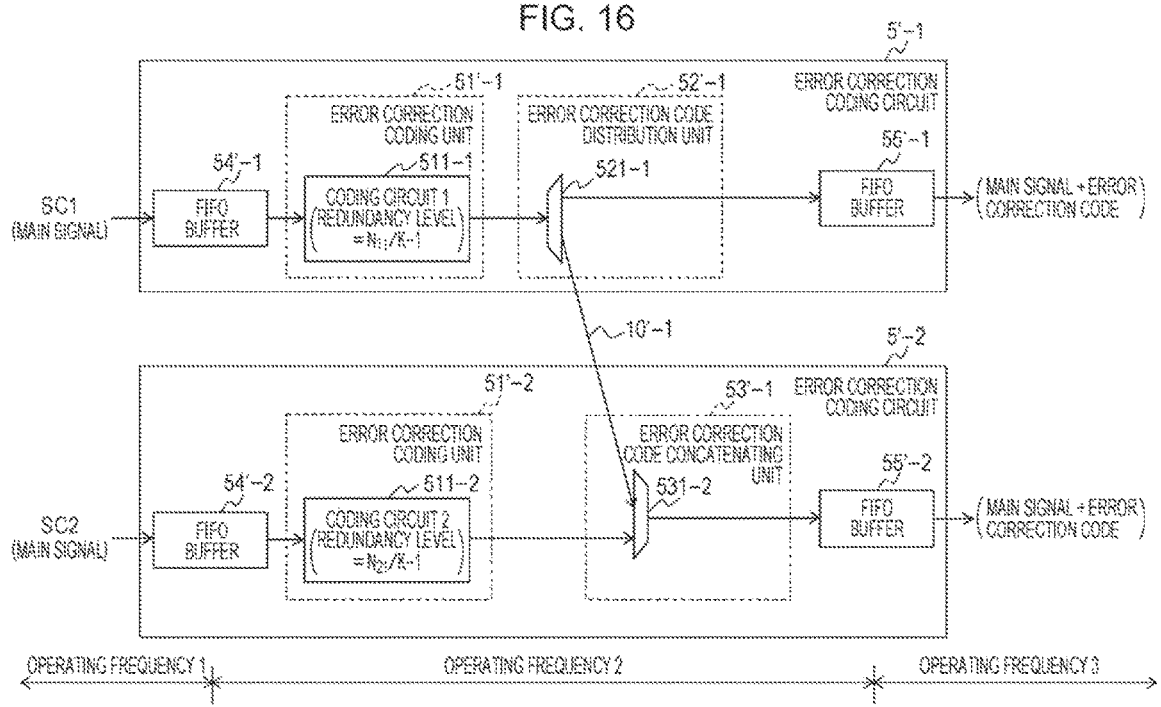
FIG. 16 is an example of the configuration of the error correction coding circuit that performs clock transfer of the operating clock.

Alternatively, the clock transfer of the operating clock may be performed using, for example, a first-in first-out (FIFO) buffer depending on a particular configuration of the reception signal processing circuit according to the exemplary embodiment. FIG. 16 is an example of the configuration of the error correction coding circuit that performs clock transfer of the operating clock. In the example of the configuration illustrated in FIG. 16, the error correction coding circuits 5'-1 and 5'-2 include first FIFO buffers 54'-1 and 54'-2 and second FIFO buffers 55'-1 and 55'-2, respectively. Each of the first FIFO buffers 54'-1 and 54'-2 is a circuit that changes a main signal (K-bit information bits) processed at an operating frequency 1 to a transmission signal having the error correction code of a desired code length added thereto (an $N_{11}$ or $N_{21}$-bit transmission signal) that is generated and output at an operating frequency 2. Each of the second FIFO buffers 55'-1 and 55'-2 is a circuit that changes the transmission signal processed at the operating frequency 2 to a transmission signal (an N-bit transmission signal) that has the distributed portion of the error correction code (the portion in excess of a predetermined redundancy level) and that is generated and output at an operating frequency 3. In an example illustrated in FIG. 16, the operating frequency 1, the operating frequency 2, and the operating frequency 3 have the following relationship given by the following expression (6).

operating frequency 1:operating frequency 2:operating frequency 3=K:value greater than or equal to max($N_{11}$, $N_{21}$):N  (6)

According to the configuration illustrated in FIG. 16, allocation of the bit width of the bus 10'-1 in accordance with the number of bits distributed among the sub-carriers may be removed.

Figure 17:
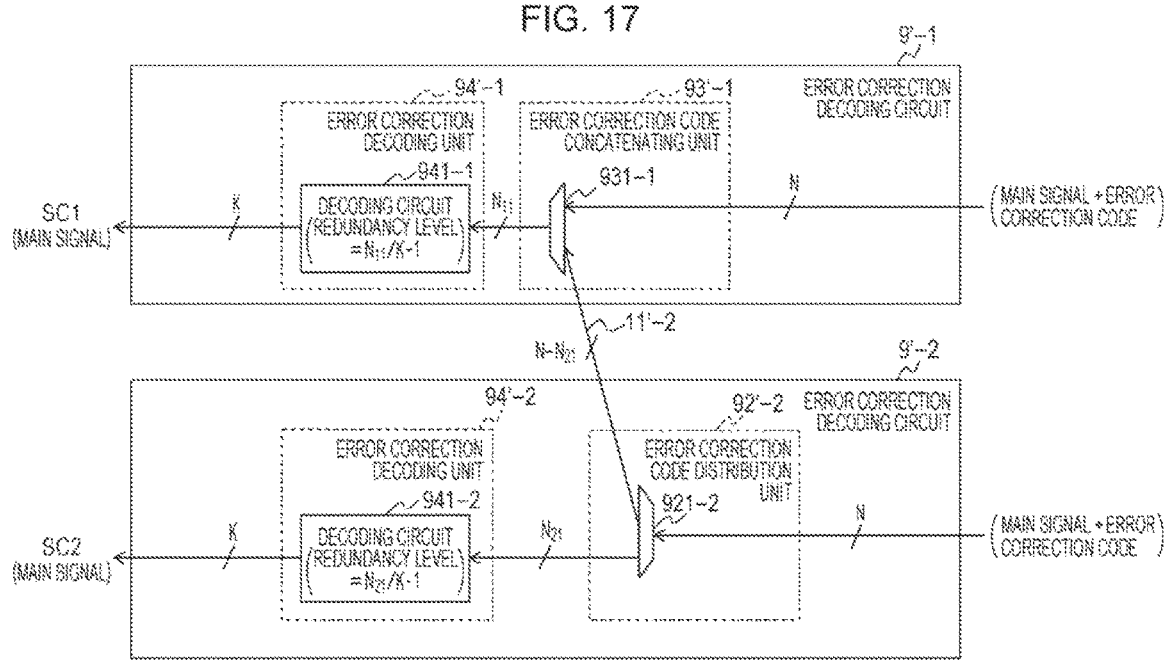
FIG. 17 illustrates a first example of the configuration of the error correction decoding circuit according to the exemplary embodiment.

FIG. 17 illustrates the first example of the configuration of the error correction decoding circuit according to the exemplary embodiment. Error correction decoding circuits 9'-1 and 9'-2 illustrated in FIG. 17 are the counter circuits of the error correction coding circuits 5'-1 and 5'-2, respectively. That is, each of the error correction decoding circuits 9'-1 and 9'-2 decodes the main signal from the reception signal (the N-bit reception signal), where the portion ($N_{11}$–N) of the error correction code of a desired length added for the sub-carrier 1 (the portion in excess of the predetermined redundancy level) is distributed to the sub-carrier 2.

More specifically, in the error correction decoding circuit 9'-2, the distributor 921-2 retrieves, from the N-bit reception signal, a portion (N–$N_{21}$) of the error correction code in excess of a code length $N_{21}$ of a signal on the sub-carrier 2 to be processed and distributes the portion to the error correction decoding circuit 9'-1 via a bus 11'-2. The distributor 921-2 is a particular example of the configuration of an error correction code distributing unit 92'-2. As FIG. 15 and equation (5) indicate, the portion (N–$N_{21}$) of the error correction code distributed by the distributor 921-2 is the same as the portion ($N_{11}$–N) of the error correction code distributed by the distributor 521-1 (refer to FIG. 14). A decoding circuit 941-2 decodes the K-bit main signal using the $(N_{21}-k)$ bit-error correction code included in $N_{21}$-bit reception signal output from the distributor 921-2. The decoding circuit 941-2 is a particular example of the configuration of an error correction decoding unit 94'-2.

In addition, by concatenating the portion $(N-N_{21})$ of the error correction code distributed from the error correction decoding circuit 9'-2 to the N-bit reception signal, a concatenator 931-1 in the error correction decoding circuit 9'-1 generates an $N_{11}$-bit reception signal. The concatenator 931-1 is a particular example of the configuration of an error correction code concatenating unit 93'-1. A decoding circuit 941-1 decodes the K-bit main signal using the $(N_{11}-K)$-bit error correction code included in the $N_{11}$-bit signal output from the concatenator 931-1. A decoding circuit 941-1 is an example of the configuration of an error correction decoding unit 94'-1.

By distributing the error correction code in the above-described manner, the total bit length of the transmission signal on each of the sub-carriers is reduced so that the transmission quality of the super channel is higher than or equal to a predetermined value while keeping the transmission quality of each of the sub-channels to be higher than or equal to a predetermined value.

Note that in the example of the configuration illustrated in FIG. 17, the bit width of the bus 11'-2 is allocated in accordance with the number of distributed bits $(N-N_{21})$. By using such allocation of the bit width, it is allowed to remove clock transfer of the operating clock occurring due to different desired code lengths of the error correction codes on the sub-carriers making up the super channel.

Figure 18:
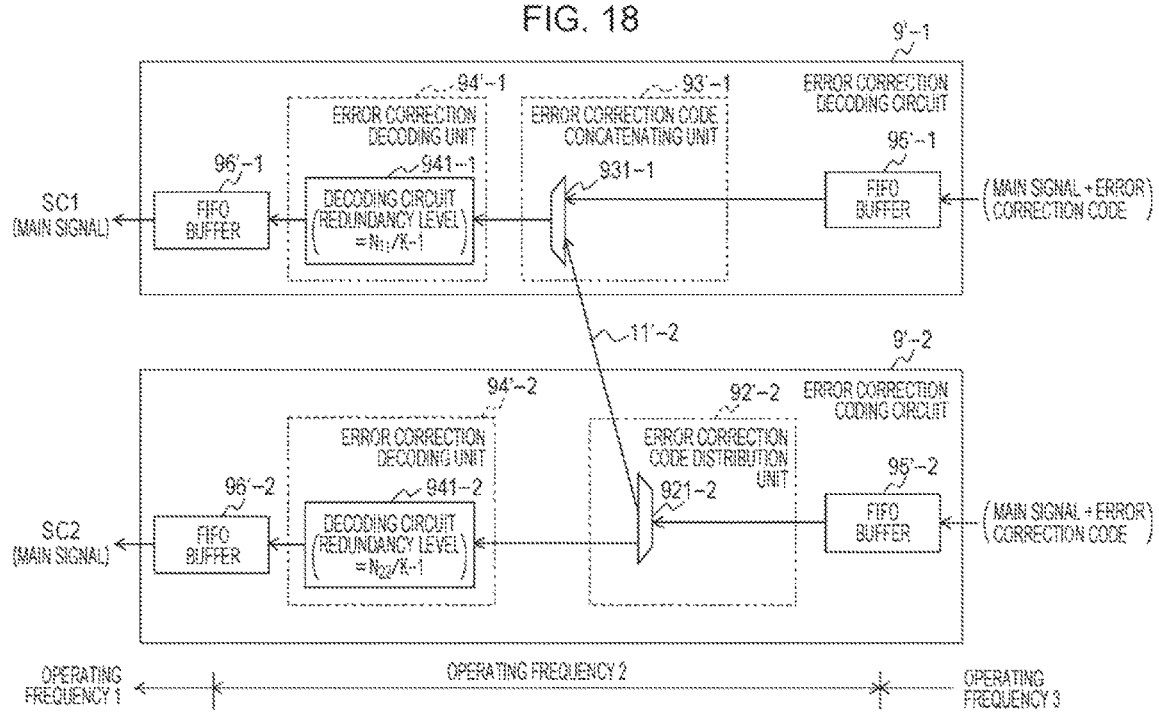
FIG. 18 is an example of the configuration of the error correction decoding circuit that performs clock transfer of the operating clock.

Alternatively, the clock transfer of the operating clock may be performed using, for example, a FIFO buffer depending on a particular configuration of the error correction decoding circuit according to the exemplary embodiment. FIG. 18 is an example of the configuration of the error correction decoding circuit that performs clock transfer of the operating clock. In the example of the configuration illustrated in FIG. 18, the error correction decoding circuits 9'-1 and 9'-2 include third FIFO buffers 95'-1 and 95'-2 and fourth FIFO buffers 96'-1 and 96'-2, respectively. Each of the third FIFO buffers 95'-1 and 95'-2 is a circuit that changes a reception signal (an N-bit reception signal) processed at an operating frequency 3 to a transmission signal having the error correction code of a desired code length added thereto (an $N_{11}$ or $N_{21}$-bit transmission signal) that is generated and output at an operating frequency 2. Each of the fourth FIFO buffers 96'-1 and 96'-2 is a circuit that changes the reception signal processed at an operating frequency 2 to a main signal (K-bit information bits) that is decoded and output at an operating frequency 3. The operating frequency 1, the operating frequency 2, and the operating frequency 3 have the above-described relationship given by expression (6). According to the configuration illustrated in FIG. 18, allocation of the bit width of the bus 11'-2 in accordance with the number of bits distributed among the sub-carriers may be removed.

Second Example of Configurations of Error Correction Coding Circuit and Error Correction Decoding Circuit of Exemplary Embodiment As a second example of the configuration, the configuration of a circuit capable of selectively improving the transmission quality of each of sub-channels making up a super channel is described below with reference to FIGS. 19 and 20.

Figure 19:
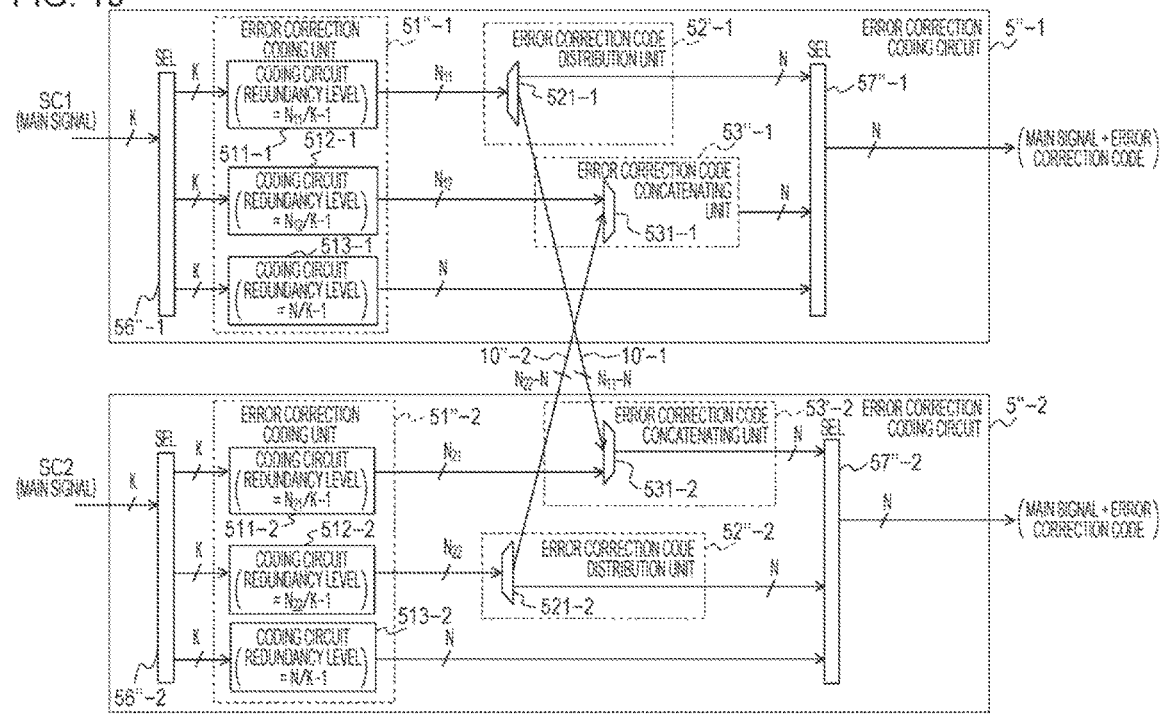
FIG. 19 illustrates a second example of the configuration of the error correction coding circuit according to the exemplary embodiment.

FIG. 19 illustrates the second example of the configuration of the error correction coding circuit according to the exemplary embodiment. Among the constituent elements of error correction coding circuits 5"-1 and 5"-2 illustrated in FIG. 19, the constituent elements that are similar to those of the error correction coding circuits 5'-1 and 5'-2 have the same reference numerals as in FIG. 14.

As described above with reference to FIGS. 14 and 15, in the first example of the configuration, the portion of the error correction code having a desired code length added for the sub-carrier 1 (that is, the portion in excess of a predetermined redundancy level) in order to increase the transmission quality to be higher than or equal to a predetermined value is distributed to the sub-carrier 2. In contrast, in the second example of the configuration, in addition to the processes performed in the first example of the configuration, the portion of the error correction code having a desired code length added for the sub-carrier 2 (the portion in excess of a predetermined redundancy level) in order to increase the transmission quality to be higher than or equal to a predetermined value is distributed to the sub-carrier 1. Furthermore, in the second example of the configuration, the code length of a transmission signal on each of the sub-carrier 1 and the sub-carrier 2 is set to N so that the redundancy levels of the transmission signals are the same. As described above, N is a predetermined bit length of a transmission and reception signal on each of the sub-carriers. For example, N is set to a length that is desirable for keeping the transmission quality of the super channel to be higher than or equal to a predetermined value in accordance with an increase in the bit rate. In the second example of the configuration illustrated in FIG. 19, N is defined by the following equation (7).

$$N = \frac{N_{11} + N_{21}}{2} = \frac{N_{12} + N_{22}}{2} \tag{7}$$

More specifically, the error correction coding circuit 5"-1 includes the constituent elements similar to those of the error correction coding circuit 5'-1 (refer to FIG. 14). In addition, the error correction coding circuit 5"-2 includes the constituent elements similar to those of the error correction coding circuit 5'-2 (refer to FIG. 14). Accordingly, the error correction coding circuits 5"-1 and 5"-2 perform the processing operation in the same manner as the error correction coding circuits 5'-1 and 5'-2, respectively. That is, each of the error correction coding circuits 5"-1 and 5"-2 retrieves, from the error correction code having a desired code length added for the sub-carrier 1, a portion in excess of a predetermined redundancy level and distributes the retrieved portion to the sub-carrier 2. Thus, an N-bit transmission signal is output.

For example, to improve the transmission quality of the sub-carrier 1, the coding circuit 511-1 is configured to add, to the main signal, an error correction code that makes the redundancy level $(N_{11}/K-1)$ of the transmission signal equal to 25.5%. In addition, if the predetermined redundancy level $(N/K-1)$ is 20.5%, the distributor 521-1 and the concatenator 531-2 retrieve, from the error correction code added for the sub-carrier 1, a 5.5% portion in excess of the predetermined redundancy level 20.5% and distribute the portion to the sub-carrier 2. Furthermore, the coding circuit 511-2 adds, to the main signal, the error correction code that makes the redundancy level $(N_{21}/K-1)$ of the transmission signal equal to 15.5% so that the redundancy level of the transmission signal for the sub-carrier 2 after the distributed portion having the redundancy level 5.5% is concatenated is within 20.5%.

In addition, to retrieve, from the error correction code having a desired code length and added for the sub-carrier 2, a portion in excess of the predetermined redundancy level and distribute the portion to the sub-carrier 1, the error correction coding circuit 5"-2 further includes a coding circuit 512-2 and a distributor 521-2. The error correction coding circuit 5"-1 further includes a coding circuit 512-1 and a concatenator 531-1. The coding circuit 512-2 is a particular example of the configuration of an error correction coding unit 51"-2, and the distributor 521-2 is a particular example of the configuration of an error correction code distributing unit 52"-2. The coding circuit 512-1 is a particular example of the configuration of an error correction coding unit 51"-1, and the concatenator 531-1 is a particular example of the configuration of an error correction code concatenating unit 53"-1.

For example, to improve the transmission quality of the sub-carrier 2, the coding circuit 512-2 is configured to add, to the main signal, an error correction code that makes the redundancy level ($N_{22}$/K−1) of the transmission signal equal to 25.5%. In addition, if the predetermined redundancy level (N/K−1) is 20.5%, the distributor 521-2 and the concatenator 531-1 retrieve, from the error correction code added for the sub-carrier 2, a 5.5% portion in excess of the predetermined redundancy level 20.5% and distribute the portion to the sub-carrier 1. Furthermore, the coding circuit 512-1 adds, to the main signal, the error correction code that makes the redundancy level ($N_{12}$/K−1) of the transmission signal equal to 15.5% so that the redundancy level of the transmission signal for the sub-carrier 1 after the distributed portion having the redundancy level 5.5% is concatenated is within 20.5%.

In addition, to make the redundancy levels of the transmission signals on the sub-carrier 1 and the sub-carrier 2 the same, the error correction coding circuit 5"-1 further includes a coding circuit 513-1, and the error correction coding circuit 5"-2 further includes a coding circuit 513-2. The coding circuit 513-1 is a particular example of the configuration of the error correction coding unit 51"-1, and the coding circuit 513-2 is a particular example of the configuration of the error correction coding unit 51"-2.

For example, if the predetermined redundancy level (N/K−1) is 20.5%, the coding circuit 513-1 is configured to add, to the main signal, the error correction code that makes the redundancy level (N/K−1) of the transmission signal equal to 20.5%. In addition, the coding circuit 513-2 is configured to add, to the main signal, the error correction code that makes the redundancy level (N/K−1) of the transmission signal equal to 20.5%. In such a case, the code length of the transmission signal having the error correction code added to the main signal is N. Accordingly, distribution of the error correction code between the sub-carrier 1 and the sub-carrier 2 is not performed.

In addition, to select a particular redundancy level from among the above-described plurality of redundancy levels settable for the sub-carrier 1 and sub-carrier 2, the error correction coding circuit 5"-1 further includes a first selector (SEL) 56"-1 and a second selector (SEL) 57"-1. Furthermore, the error correction coding circuit 5"-2 further includes a first selector (SEL) 56"-2 and a second selector (SEL) 57"-2.

More specifically, to improve the transmission quality of the sub-carrier 1, the first selector 56"-1 selects a signal line through which the main signal is input to the coding circuit 511-1. The second selector 57"-1 selects a signal line through which the output signal of the distributor 521-1 is output to the outside of the error correction coding circuit 5"-1. In addition, the first selector 56"-2 selects a signal line through which the main signal is input to the coding circuit 511-2. The second selector 57"-2 selects a signal line through which the output signal of the concatenator 531-2 is output to the outside of the error correction coding circuit 5'-2.

In addition, to improve the transmission quality of the sub-carrier 2, the first selector 56"-1 selects a signal line through which the main signal is input to the coding circuit 512-1. The second selector 57"-1 selects a signal line through which the output signal of the concatenator 531-1 is output to the outside of the error correction coding circuit 5"-1. In addition, the first selector 56"-2 selects a signal line through which the main signal is input to the coding circuit 512-2. The second selector 57"-2 selects a signal line through which the output signal of the distributor 521-2 is output to the outside of the error correction coding circuit 5"-2.

Still furthermore, to make the redundancy levels of the transmission signals on the sub-carrier 1 and the sub-carrier 2 the same, the first selector 56"-1 selects a signal line through which the main signal is input to the coding circuit 513-1. The second selector 57"-1 selects a signal line through which the output signal of the coding circuit 513-1 is output to the outside of the error correction coding circuit 5'-1. The first selector 56"-2 selects a signal line through which the main signal is input to the coding circuit 513-2. The second selector 57"-2 selects a signal line through which the output signal of the coding circuit 513-2 is output to the outside of the error correction coding circuit 5"-2.

The above-described selection made by the first selectors 56"-1 and 56"-2 and the second selectors 57"-1 and 57"-2 may be performed in accordance with instructions sent from control circuits included in the optical transmission apparatus according to the exemplary embodiment (for example, the control circuits 21 (1) and 21 (2) illustrated in FIGS. 2A and 2B).

According to the error correction coding circuit of the second example of the configuration, the transmission performance of the super channel is kept at a predetermined value or higher while improving the transmission quality of each of the sub-channels making up the super channel. In addition, according to the error correction coding circuit of the second example of the configuration, the redundancy levels for the sub-channels making up the super channel are made to be the same level.

Note that according to the example of the configuration illustrated in FIG. 19, the bit widths of the buses 10'-1 and 10"-2 are allocated in accordance with the distributed numbers of bits ($N_{11}$−N) and ($N_{22}$−N), respectively. However, clock transfer of the operating clock may be performed using, for example, a FIFO buffer depending on a particular configuration of the error correction coding circuit according to the exemplary embodiment. In such a case, it is allowed to remove allocation of the bit widths between the buses 10'-1 and 10"-2 in accordance with the distributed numbers of bits ($N_{11}$−N) and ($N_{22}$−N).

Figure 20:
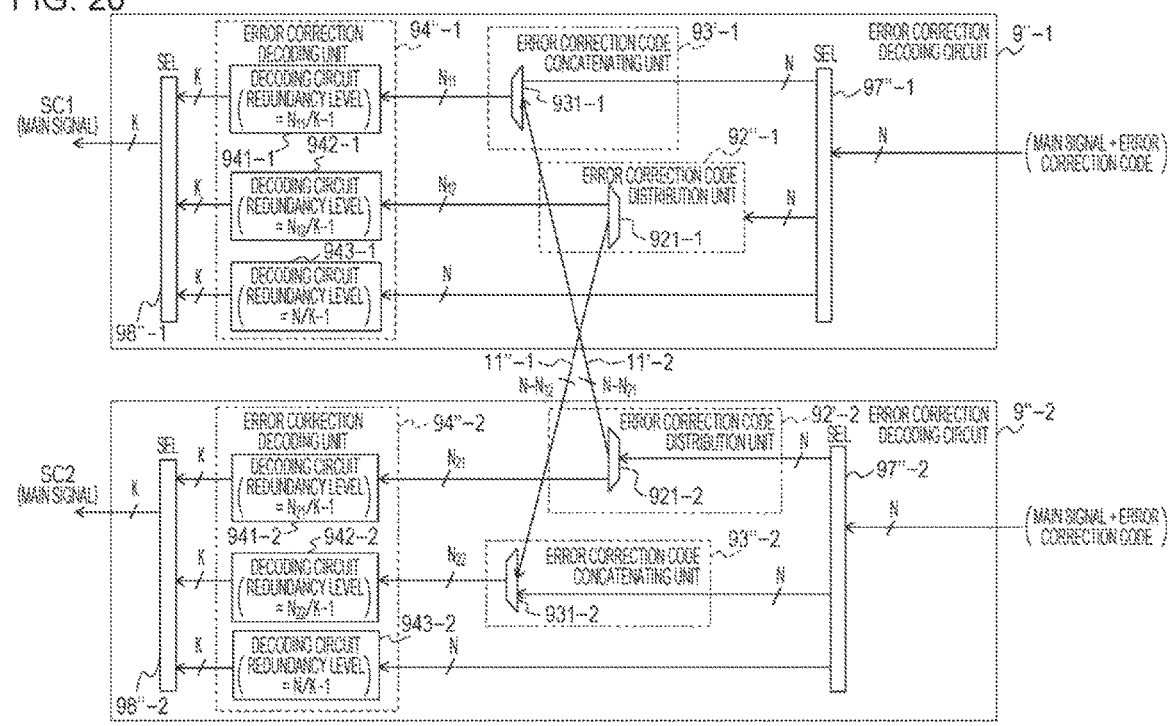
FIG. 20 illustrates a second example of the configuration of the error correction decoding circuit according to the exemplary embodiment.

FIG. 20 illustrates the second example of the configuration of the error correction decoding circuit according to the exemplary embodiment. Among the constituent elements of error correction decoding circuits 9"-1 and 9"-2 illustrated in FIG. 20, the constituent elements that are similar to those of the error correction decoding circuits 9'-1 and 9'-2 have the same reference numerals as in FIG. 17. The error correction decoding circuits 9"-1 and 9"-2 are the counter circuits of the error correction coding circuits 5"-1 and 5"-2 illustrated in FIG. 19.

The error correction decoding circuits 9"-1 and 9"-2 include the constituent elements similar to those of the error correction decoding circuits 9'-1 and 9'-2, respectively. Accordingly, the error correction decoding circuits 9"-1 and 9"-2 perform the processing operation in the same manner as the error correction decoding circuits 9'-1 and 9'-2, respectively. That is, each of the error correction decoding circuits 9"-1 and 9"-2 decodes the main signal from the reception signal (the N-bit reception signal), where the portion ($N_{11}$–N) of the error correction code of a desired length added for the sub-carrier 1 (the portion in excess of the predetermined redundancy level) is distributed to the sub-carrier 2.

In addition, the error correction decoding circuit 9"-1 further includes a distributor 921-1 and a decoding circuit 942-1. The error correction decoding circuit 9"-2 further includes a concatenator 931-2 and a decoding circuit 942-2. The distributor 921-1 is a particular example of the configuration of an error correction code distributing unit 92"-1, and the decoding circuit 942-1 is a particular example of the configuration of an error correction decoding unit 94"-1. The concatenator 931-2 is a particular example of the configuration of an error correction code concatenating unit 93"-2, and the decoding circuit 942-2 is a particular example of the configuration of an error correction decoding unit 94"-2. The distributor 921-1, the decoding circuit 942-1, the concatenator 931-2, and the decoding circuit 942-2 decode the main signal from the reception signal (the N-bit reception signal), where a portion of the error correction code having a desired length and added for the sub-carrier 2 in excess of a predetermined redundancy level is distributed to the reception signal on the sub-carrier 1.

More specifically, the distributor 921-1 retrieves, from the error correction code in the N-bit reception signal, the portion (N–$N_{12}$) in excess of the code length $N_{12}$ of a signal on the sub-carrier 1 to be processed and distributes the portion to the error correction decoding circuit 9"-2 via a bus 11"-1. As equation (7) indicates, the portion (N–$N_{12}$) of the error correction code distributed by the distributor 921-1 is the same as the portion ($N_{22}$–N) of the error correction code distributed by the distributor 521-2 (refer to FIG. 19). The decoding circuit 942-1 decodes the K-bit main signal using an ($N_{12}$–K)-bit error correction code included in an $N_{12}$-bit signal output from the distributor 921-1.

In addition, the concatenator 931-2 concatenates the portion (N–$N_{12}$) of the error correction code distributed by the error correction decoding circuit 9"-1 to the N-bit reception signal and generates an $N_{22}$-bit signal. The decoding circuit 942-1 decodes the K-bit main signal using a ($N_{22}$–K)-bit error correction code included in the $N_{22}$-bit signal output from the concatenator 931-2.

Furthermore, the error correction decoding circuit 9"-1 further includes a decoding circuit 943-1, and the error correction decoding circuit 9"-2 further includes a decoding circuit 943-2. The decoding circuit 943-1 is a particular example of the configuration of the error correction code decoding unit 94"-1, and the decoding circuit 943-2 is a particular example of the configuration of the error correction code decoding unit 94"-2. The corresponding main signal is decoded from the N-bit reception signal by the decoding circuits 943-1 and 943-2.

In addition, to select a particular redundancy level from among the above-described plurality of settable redundancy levels for the sub-carrier 1 and the sub-carrier 2, the error correction decoding circuit 9"-1 includes a third selector (SEL) 97"-1 and a fourth selector (SEL) 98"-1. Furthermore, the error correction decoding circuit 9"-2 includes a third selector (SEL) 97"-2 and a fourth selector (SEL) 98"-2.

More specifically, to improve the transmission quality of the sub-carrier 1, the third selector 97"-1 selects a signal line through which the reception signal is input to the concatenator 931-1. The fourth selector 98"-1 selects a signal line through which the output signal of the decoding circuit 941-1 is output to the outside of the error correction decoding circuit 9"-1. In addition, the third selector 97"-2 selects a signal line through which the reception signal is input to the distributor 921-2. The fourth selector 98"-2 selects a signal line through which the output signal of the decoding circuit 941-2 is output to the outside of the error correction decoding circuit 9"-2.

In addition, to improve the transmission quality of the sub-carrier 2, the third selector 97"-1 selects a signal line through which the reception signal is input to the distributor 921-1. The fourth selector 98"-1 selects a signal line through which the output signal of the decoding circuit 942-1 is output to the outside of the error correction decoding circuit 9"-1. In addition, the third selector 97"-2 selects a signal line through which the reception signal is input to the concatenator 931-2. The fourth selector 98"-2 selects a signal line through which the output signal of the decoding circuit 942-2 is output to the outside of the error correction decoding circuit 9"-2.

Still furthermore, to make the redundancy levels of the transmission signals on the sub-carrier 1 and the sub-carrier 2 the same, the third selector 97"-1 selects a signal line through which the reception signal is input to the decoding circuit 943-1. The fourth selector 98"-1 selects a signal line through which the output signal of the decoding circuit 943-1 is output to the outside of the error correction decoding circuit 9"-1. In addition, the third selector 97"-2 selects a signal line through which the reception signal is input to the decoding circuit 943-2. The fourth selector 98"-1 selects a signal line through which the output signal of the decoding circuit 943-2 is output to the outside of the error correction decoding circuit 9"-2.

The above-described selection made by the third selectors 97"-1 and 97"-2 and the fourth selectors 98"-1 and 98"-2 may be performed in accordance with instructions sent from control circuits included in the optical transmission apparatus according to the exemplary embodiment (for example, the control circuits 21 (1) and 21 (2) illustrated in FIGS. 2A and 2B).

According to the error correction decoding circuit of the second example of the configuration, the transmission performance of the super channel is kept at a predetermined value or higher while improving the transmission quality of each of the sub-channels making up the super channel. In addition, according to the error correction decoding circuit of the second example of the configuration, the redundancy levels for the sub-channels making up the super channel are made to be the same level.

Note that according to the example of the configuration illustrated in FIG. 20, the bit widths of the buses 11'-2 and 11"-1 are allocated in accordance with the distributed numbers of bits (N–$N_{21}$) and (N–$N_{12}$), respectively. As equation (7) indicates, the number of bits (N–$N_{21}$) is the same as the number of bits ($N_{11}$–N). The number of bits (N–$N_{12}$) is the same as the number of bits ($N_{22}$–N).

However, clock transfer of the operating clock may be performed using, for example, a FIFO buffer depending on a particular configuration of the error correction decoding circuit according to the exemplary embodiment. In such a case, allocation between the bit width of each of the buses 11'-2 and 11"-1 in accordance with the distributed numbers of bits (N–$N_{21}$) and (N–$N_{12}$) may be removed.

Third Example of Configurations of Error Correction Coding Circuit and Error Correction Decoding Circuit of Exemplary Embodiment Finally, as a third example of the configuration, the configuration of a circuit capable of selecting, from among a plurality of redundancy levels each corresponding to one of a plurality of the transmission quality levels, the redundancy level corresponding to a desired transmission quality for each of the sub-channels making up the super channel is described below with reference to FIGS. 21A, 21B, 22A, and 22B.

Figure 21A:
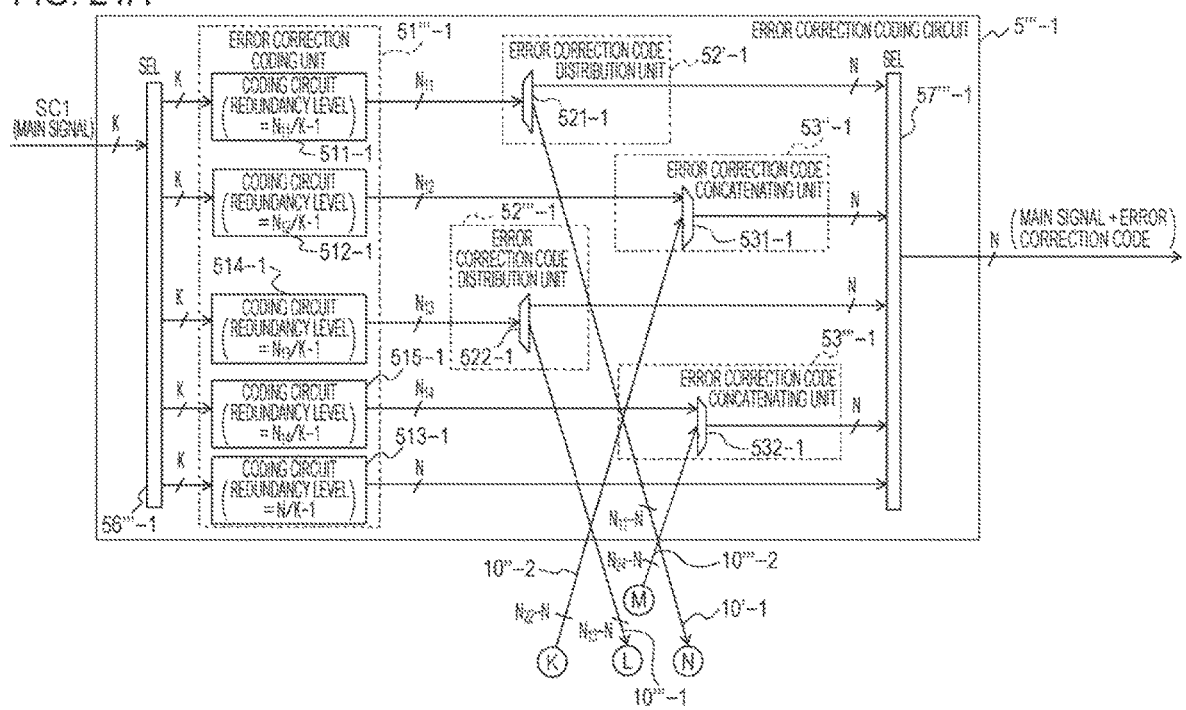
FIG. 21A illustrates a third example of the configuration of the error correction coding circuit according to the exemplary embodiment.
Figure 21B:
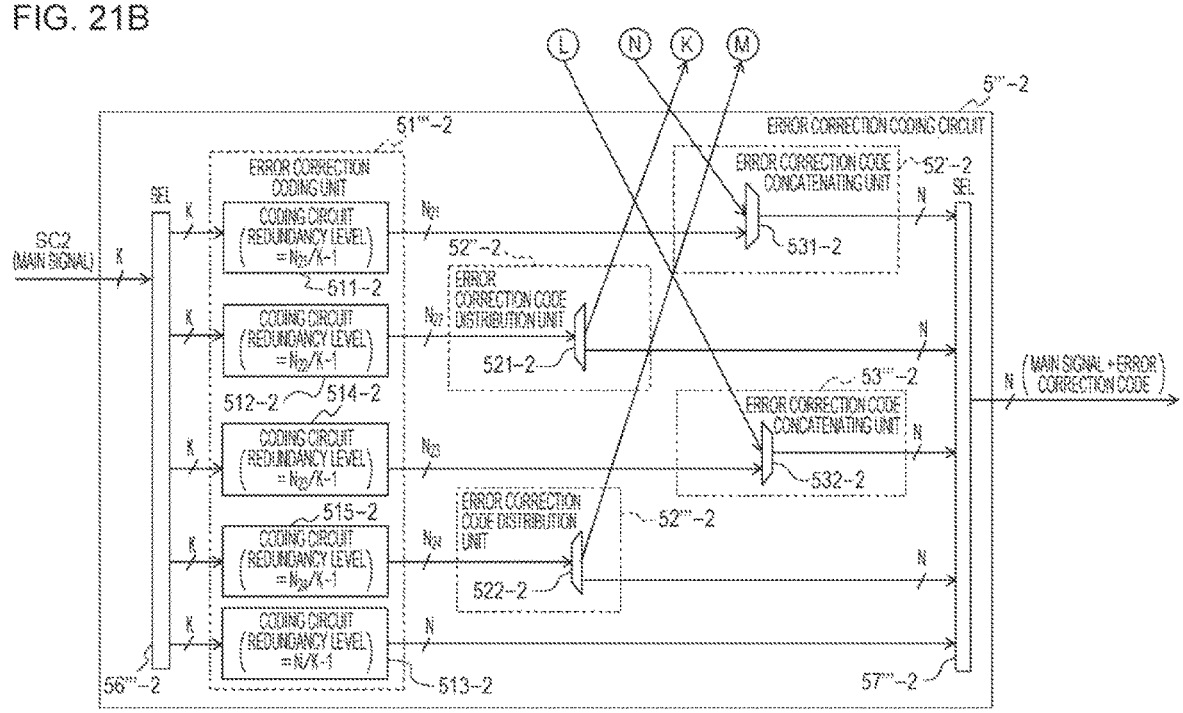
FIG. 21B illustrates the third example of the configuration of the error correction coding circuit according to the exemplary embodiment.

FIGS. 21A and 21B illustrate the third example of the configuration of the error correction coding circuit according to the exemplary embodiment. Among the constituent elements of error correction coding circuits 5'''-1 and 5'''-2 illustrated in FIGS. 21A and 21B, the constituent elements that are similar to those of the error correction coding circuits 5"-1 and 5"-2 have the same reference numerals as in FIG. 19.

As described above with reference to FIG. 19, in the second example of the configuration, a signal line through which the main signal is input to the coding circuit 511-1 having a redundancy level of ($N_{11}$/K−1) is selected to improve the transmission quality for the sub-carrier 1. In addition, a signal line through which the main signal is input to the coding circuit 512-2 having a redundancy level of ($N_{22}$/K−1) is selected to improve the transmission quality for the sub-carrier 2. Thus, in the second example of the configuration, to improve the transmission quality for a given sub-carrier, the number of selectable redundancy levels of an error correction signal is only one. According to the third example of the configuration, error correction coding circuits 5'''-1 and 5'''-2 are configured to select a desired redundancy level from among a plurality of preset redundancy levels in order to improve the transmission quality of a given sub-carrier.

More specifically, to improve the transmission quality for the sub-carrier 1, the error correction coding circuit 5'''-1 includes the coding circuit 511-1 having a redundancy level of ($N_{11}$/K−1) and the distributor 521-1. In addition, the error correction coding circuit 5'''-2 includes the coding circuit 511-2 having a redundancy level of ($N_{21}$/K−1) and the concatenator 531-2. These constituent elements are similar to those of the error correction coding circuits 5"-1 and 5"-2.

In addition, to allow a desired redundancy level to be selected from among a plurality of redundancy levels in order to improve the transmission quality for the sub-carrier 1, the error correction coding circuit 5'''-1 further includes a coding circuit 514-1 having a redundancy level of ($N_{13}$/K−1) and a distributor 522-1. Furthermore, the error correction coding circuit 5'''-2 further includes a coding circuit 514-2 having a redundancy level of ($N_{23}$/K−1) and a concatenator 532-2. The processing operations performed by the coding circuit 514-1, the distributor 522-1, the coding circuit 514-2, and the concatenator 532-2 are the same as the processing operations performed by the coding circuit 511-1, the distributor 521-1, the coding circuit 511-2, and the concatenator 531-2, respectively, except that the redundancy levels differ from one another.

For example, to improve the transmission quality for the sub-carrier 1, the redundancy level ($N_{11}$/K−1) of the coding circuit 511-1 is set to 25.5%, and the redundancy level ($N_{21}$/K−1) of the coding circuit 511-2 is set to 15.5% so as to correspond to 20.5% set for the predetermined redundancy level (N/K−1). In such a case, for example, to improve the transmission quality for the sub-carrier 1, the redundancy level ($N_{13}$/K−1) of the coding circuit 514-1 is set to 35.5%, and the redundancy level ($N_{23}$/K−1) of the coding circuit 514-2 is set to 5.5% so as to correspond to 20.5% set for the predetermined redundancy level (N/K−1).

In contrast, to improve the transmission quality for the sub-carrier 2, the error correction coding circuit 5'''-2 includes the coding circuit 512-2 having a redundancy level of ($N_{22}$/K−1) and the distributor 521-2. In addition, the error correction coding circuit 5'''-1 includes the coding circuit 512-1 having a redundancy level of ($N_{12}$/K−1) and the concatenator 531-1. These constituent elements are similar to those of the error correction coding circuits 5"-1 and 5"-2, respectively.

In addition, to allow a desired redundancy level to be selected from among a plurality of redundancy levels in order to improve the transmission quality of the sub-carrier 2, the error correction coding circuit 5'''-2 further includes a coding circuit 515-2 having a redundancy level of ($N_{24}$/K−1) and a distributor 522-2. Furthermore, the error correction coding circuit 5'''-1 further includes the coding circuit 515-1 having a redundancy level of ($N_{14}$/K−1) and a concatenator 532-1. The processing operations performed by the coding circuit 515-2, the distributor 522-2, the coding circuit 515-1, and the concatenator 532-1 are the same as those performed by the coding circuit 512-2, the distributer 521-1, the coding circuit 512-1, and the concatenator 531-1, respectively, except that the redundancy levels differ from one another.

For example, to improve the transmission quality for the sub-carrier 2, the redundancy level ($N_{22}$/K−1) of the coding circuit 512-2 is set to 25.5%, and the redundancy level ($N_{12}$/K−1) of the coding circuit 512-1 is set to 15.5% so as to correspond to 20.5% set for the predetermined redundancy level (N/K−1). In such a case, for example, to improve the transmission quality for the sub-carrier 2, the redundancy level ($N_{24}$/K−1) of the coding circuit 515-2 is set to 35.5%, and the redundancy level ($N_{14}$/K−1) of the coding circuit 515-1 is set to 5.5% so as to correspond to 20.5% set for the predetermined redundancy level (N/K−1).

In addition, to make the redundancy levels of the transmission signals on the sub-carrier 1 and the sub-carrier 2 the same, the error correction coding circuit 5'''-1 further includes the coding circuit 513-1, and the error correction coding circuit 5'''-2 further includes the coding circuit 513-2. These constituent elements are similar to those in the error correction coding circuits 5"-1 and 5"-2, respectively.

In the third example of the configuration illustrated in FIGS. 21A and 21B, N is defined by the following equation (8).

$$N = \frac{N_{11} + N_{21}}{2} = \frac{N_{12} + N_{22}}{2} \qquad (8)$$
$$= \frac{N_{13} + N_{23}}{2} = \frac{N_{14} + N_{24}}{2}$$

In addition, to select any particular redundancy level from among a plurality of redundancy levels set for the above-described sub-carrier 1 and sub-carrier 2, the error correction coding circuit 5'''-1 further includes a first selector (SEL) 56'''-1 and a second selector (SEL) 57'''-1. Furthermore, the error correction coding circuit 5'''-2 further includes a first selector (SEL) 56'''-2 and a second selector (SEL) 57'''-2. The above-described selection made by the first selectors 56'''-1 and 56'''-2 and the second selectors 57'''-1 and 57'''-2 may be performed in accordance with instructions sent from control circuits included in the optical transmission apparatus according to the exemplary embodiment (for example, the control circuits 21 (1) and 21 (2) illustrated in FIGS. 2A and 2B).

According to the error correction coding circuit of the third example of the configuration, to improve the transmission quality of each of the sub-channels making up the super channel, the redundancy level corresponding to a desired transmission quality level is selected from among a plurality of redundancy levels each corresponding to one of a plurality of the transmission quality levels.

Note that according to the example of the configuration illustrated in FIGS. 21A and 21B, the bit widths of the buses 10'-1, 10''-2, 10'''-1, and 10'''-2 are allocated in accordance with the distributed numbers of bits $(N_{11}-N)$, $(N_{22}-N)$, $(N_{13}-N)$, and $(N_{24}-N)$, respectively. However, transfer of the operating clock may be performed using, for example, a FIFO buffer depending on a particular configuration of the error correction coding circuit according to the exemplary embodiment. In such a case, allocation of the bit widths of the buses 10'-1, 10''-2, 10'''-1, and 10'''-2 in accordance with the distributed numbers of bits $(N_{11}-N)$, $(N_{22}-N)$, $(N_{13}-N)$, and $(N_{24}-N)$ may be removed.

Figure 22A:
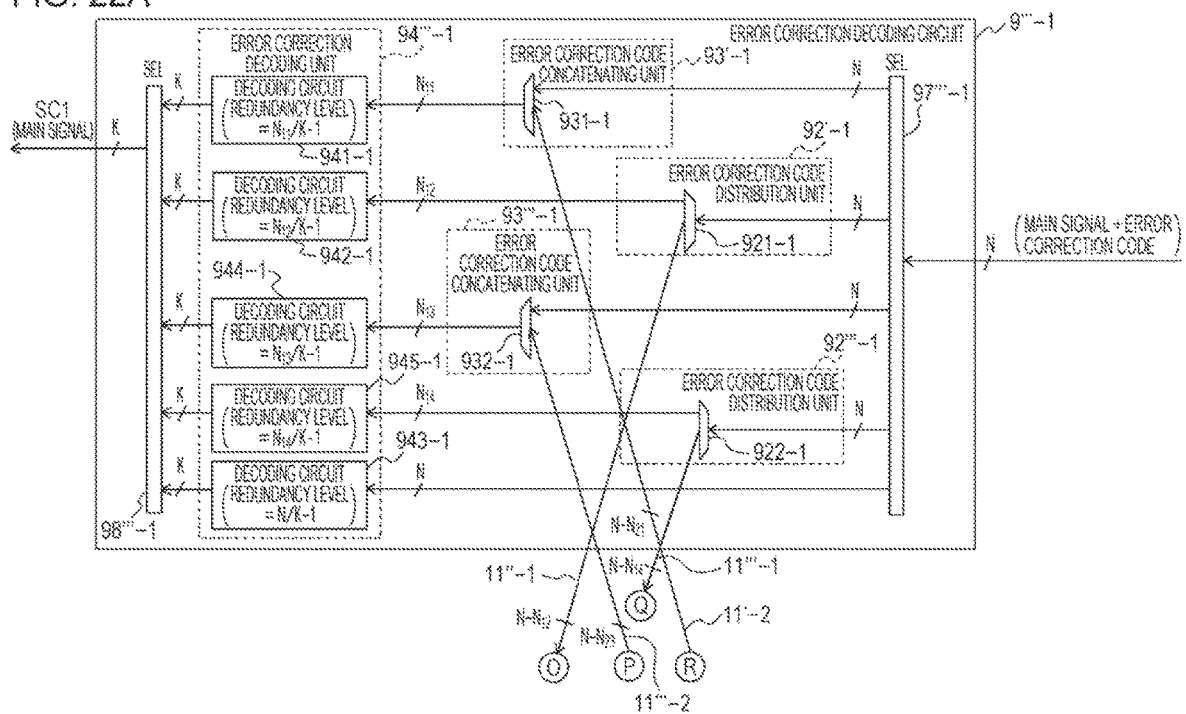
FIG. 22A illustrates a third example of the configuration of the error correction decoding circuit according to the exemplary embodiment.
Figure 22B:
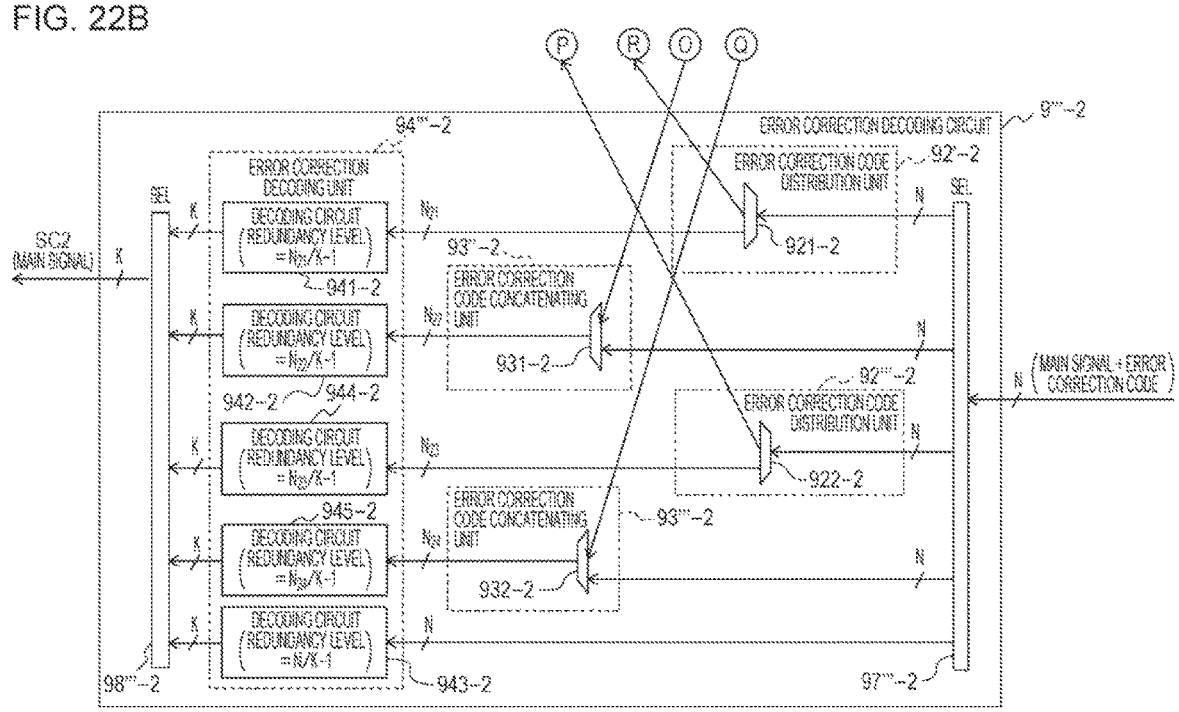
FIG. 22B illustrates the third example of the configuration of the error correction decoding circuit according to the exemplary embodiment.

FIGS. 22A and 22B illustrate the third example of the configuration of the error correction decoding circuit according to the exemplary embodiment. Among the constituent elements of error correction decoding circuits 9'''-1 and 9'''-2 illustrated in FIGS. 22A and 22B, the constituent elements that are similar to those of the error correction decoding circuits 9''-1 and 9''-2 have the same reference numerals as in FIG. 20. The error correction decoding circuits 9'''-1 and 9'''-2 are the counter circuits of the error correction coding circuits 5'''-1 and 5'''-2 illustrated in FIGS. 21A and 21B, respectively.

The error correction decoding circuits 9'''-1 and 9'''-2 include the constituent elements similar to those of the error correction decoding circuits 9''-1 and 9''-2, respectively. Accordingly, the error correction decoding circuits 9'''-1 and 9'''-2 perform the processing operation in the same manner as the error correction decoding circuits 9''-1 and 9''-2, respectively. In addition, according to the third example of the configuration, each of the error correction decoding circuits 9'-1 and 9''-2 decodes the main signal from a reception signal on each of the sub-carriers having a desired redundancy level selected from among a plurality of redundancy levels each corresponding to one of a plurality of the transmission quality levels.

More specifically, to reproduce a reception signal on the sub-carrier 1 having a redundancy level of $(N_{11}/K-1)$ set therefor and decode the main signal from the reproduced reception signal, the error correction decoding circuit 9''-1 includes the concatenator 931-1 and the decoding circuit 941-1. In addition, to reproduce a reception signal on the sub-carrier 2 having a redundancy level of $(N_{21}/K-1)$ set therefor and decode the main signal from the reproduced reception signal, the error correction decoding circuit 9'''-2 includes the distributor 921-1 and the decoding circuit 941-2. These constituent elements are similar to those of the error correction coding circuits 9''-1 and 9''-2.

Furthermore, to reproduce a reception signal on the sub-carrier 1 having a redundancy level of $(N_{13}/K-1)$ set therefor and decode the main signal from the reproduced reception signal, the error correction decoding circuit 9'''-1 includes a concatenator 932-1 and a decoding circuit 944-1. Still furthermore, to reproduce a reception signal on the sub-carrier 2 having a redundancy level of $(N_{23}/K-1)$ set therefor and decode the main signal from the reproduced reception signal, the error correction decoding circuit 9'''-2 includes a distributor 922-2 and a decoding circuit 944-2.

In contrast, to reproduce a reception signal on the sub-carrier 2 having a redundancy level of $(N_{22}/K-1)$ set therefor and decode the main signal from the reproduced reception signal, the error correction decoding circuit 9'''-2 includes the concatenator 931-2 and the decoding circuit 942-2. In addition, to reproduce a reception signal on the sub-carrier 1 having a redundancy level of $(N_{12}/K-1)$ set therefor and decode the main signal from the reproduced reception signal, the error correction decoding circuit 9'''-1 includes a distributor 921-1 and a decoding circuit 942-1. These constituent elements are similar to those of the error correction coding circuits 9''-1 and 9''-2.

Furthermore, to reproduce a reception signal on the sub-carrier 2 having a redundancy level of $(N_{24}/K-1)$ set therefor and decode the main signal from the reproduced reception signal, the error correction decoding circuit 9'''-2 includes the concatenator 932-2 and the decoding circuit 945-2. In addition, to reproduce a reception signal on the sub-carrier 1 having a redundancy level of $(N_{14}/K-1)$ set therefor and decode the main signal from the reproduced reception signal, the error correction decoding circuit 9'''-1 includes a distributor 922-1 and the decoding circuit 945-2.

Furthermore, to decode the main signal from a reception signal having the same redundancy levels set for the sub-carrier 1 and the sub-carrier 2, the error correction decoding circuit 9'''-1 further includes the decoding circuit 943-1. In addition, the error correction decoding circuit 9'''-2 further includes the decoding circuit 943-2. These constituent elements are similar to those of the error correction coding circuits 9''-1 and 9''-2.

In addition, to select any particular redundancy level from among the above-described plurality of redundancy levels set for sub-carrier 1 and sub-carrier 2, the error correction decoding circuit 9'''-1 further includes a third selector (SEL) 97'''-1 and a fourth selector (SEL) 98'''-1. Furthermore, the error correction decoding circuit 9'''-2 further includes a third selector (SEL) 97'''-2 and a fourth selector (SEL) 98'''-2. The above-described selection made by the third selectors 97'''-1 and 97'''-2 and the fourth selectors 98'''-1 and 98'''-2 may be performed in accordance with instructions sent from control circuits included in the optical transmission apparatus according to the exemplary embodiment (for example, the control circuits 21 (1) and 21 (2) illustrated in FIGS. 2A and 2B).

According to the error correction decoding circuit of the third example of the configuration, to improve the transmission quality of each of the sub-channels making up the super channel, the redundancy level corresponding to a desired transmission quality level is selected from among a plurality of redundancy levels each corresponding to one of a plurality of the transmission quality levels.

Note that according to the example of the configuration illustrated in FIGS. 22A and 22B, the bit widths of the buses 11'-1, 11''-2, 11'''-1, and 11'''-2 are allocated in accordance with the distributed numbers of bits $(N-N_{21})$, $(N-N_{12})$, $(N-N_{14})$, and $(N-N_{23})$, respectively. As equation (8) indicates, the number of bits $(N-N_{21})$ is the same as the number of bits $(N_{11}-N)$. The number of bits $(N-N_{12})$ is the same as the number of bits $(N_{22}-N)$. The number of bits $(N-N_{14})$ is the same as the number of bits $(N_{24}-N)$. The number of bits $(N-N_{23})$ is the same as the number of bits $(N_{13}-N)$.

However, clock transfer of the operating clock may be performed using, for example, a FIFO buffer depending on a particular configuration of the error correction decoding circuit according to the exemplary embodiment. In such a case, the allocation of bit widths of the buses 11'-2, 11"-1, 11'"-1, and 11'"-2 in accordance with the distributed numbers of bits $(N-N_{21})$, $(N-N_{12})$, $(N-N_{14})$, and $(N-N_{23})$ may be removed.

Example of Transmission Method Used in Optical Transmission Apparatus of Exemplary Embodiment An example of the transmission method used in the optical transmission apparatus according to the exemplary embodiment is described below. As an example, in the optical transmission system 1 illustrated in FIG. 1, the case in which an optical signal in the super channel is transmitted from the OADM node 2-1 to the OADM node 2-2 is described below. That is, the OADM node 2-1 represents a sender-side optical transmission apparatus 2 (refer to FIGS. 2A and 2B), and the OADM node 2-2 represents a receiver-side optical transmission apparatus 2. Then, an example of the transmission method is described. In FIG. 1, a transmission direction in which a signal is transmitted from the OADM node 2-1 to the OADM node 2-2 corresponds to the first transmission direction described above in relation to FIGS. 2A and 2B. In addition, a transmission direction in which a signal is transmitted from the OADM node 2-2 to the OADM node 2-1 corresponds to the second transmission direction described above in relation to FIGS. 2A and 2B.

As described above for the second and third examples of the configurations of the error correction coding circuit and the error correction decoding circuit according to the exemplary embodiment, in the optical transmission apparatus according to the exemplary embodiment, the redundancy level of a signal on each of the sub-carriers may be selected from among a plurality of preset redundancy levels. The selection of the redundancy level may be performed before the optical transmission system according to the exemplary embodiment starts operating or during the operation of the optical transmission system.

Example of Optical Transmission Method Performed Before Start of Operation of Optical Transmission System As an example of the optical transmission method performed before start of the operation of the optical transmission system, a redundancy level setting process performed by the optical transmission apparatus according to the exemplary embodiment is described below with reference to FIGS. 23 to 27.

FIG. 23 is a flowchart of a first example of the redundancy level setting process performed before start of the operation. In the first example of the redundancy level setting process, the entire redundancy level setting process is controlled by the control circuit 21 (1) of the receiver-side optical transmission apparatus 2 (the OADM node 2-2).

If the redundancy level setting process starts (operation S1001), the control circuit 21 (1) of the receiver-side optical transmission apparatus 2 transmits a control signal to the control circuit 21 (1) of the sender-side optical transmission apparatus 2 (operation S1002). The control signal includes the following instruction. That is, the control circuit 21 (1) of the receiver-side optical transmission apparatus 2 sends, to the control circuit 21 (1) of the sender-side optical transmission apparatus 2, a control signal including an instruction to send an optical signal in the super channel by using a known signal as a main signal on each of the sub-carriers (SCs) via the first control signal transceiver 32 (1) and the second control signal transceiver 33 (2).

The control circuit 21 (1) of the sender-side optical transmission apparatus 2 receives the control signal sent from the control circuit 21 (1) of the receiver-side optical transmission apparatus 2 via the optical attenuator 22 (2), the first control signal transceiver 32 (2) and the second control signal transceiver 33 (1). The control circuit 21 (1) instructs the transponders 27(A)-1-1 to 27(A)-n-m to send a sub-carrier signal using a known signal. Each of the transponders 27(A)-1-1 to 27(A)-n-m transmits the known signal. The known signals sent from the transponders 27(A)-1-1 to 27(A)-n-m pass through the optical couplers 28 (1)-1 to 28 (1)-n, the optical amplifiers 29 (1)-1 to 29 (1)-n, and the optical add switch 30 (1), respectively, and are sent in the form of optical signals in the super channel.

The known signals on the sub-carriers sent from the sender-side optical transmission apparatus 2 pass through the optical attenuator 22 (1), the pre-amplifier 23 (1), the optical drop switch 24 (1), the optical amplifiers 25 (1)-1 to 25 (1)-n, and the optical couplers 26 (1)-1 to 26 (1)-n and are received by the transponders 27(B)-1-1 to 27(B)-n-m, respectively. Each of the transponders 27(B)-1-1 to 27(B)-n-m includes the transmission quality measuring unit (refer to FIG. 13) in the error correction decoding circuit 9 of the reception signal processing circuit 279 (refer to FIG. 5). The transmission quality measuring unit in each of the transponders 27(B)-1-1 to 27(B)-n-m measures the Q value of the known signal on the corresponding sub-carrier (operation S1003). The Q value is an example of the transmission quality. Note that the Q value measured by the transmission quality measuring unit is the Q value of the known signal before the error correction code is added. The Q values measured by the transmission quality measuring units of the transponders 27(B)-1-1 to 27(B)-n-m are sent to the control circuit 21 (1).

The control circuit 21 (1) of the receiver-side optical transmission apparatus 2 receives the Q values measured by the transmission quality measuring units of the transponders 27(B)-1-1 to 27(B)-n-m. The control circuit 21 (1) determines allocation of the redundancy levels among the sub-carriers using the received Q values (operation S1004). An example of a redundancy allocation process performed in operation S1004 is described below with reference to FIG. 24.

Figure 24:
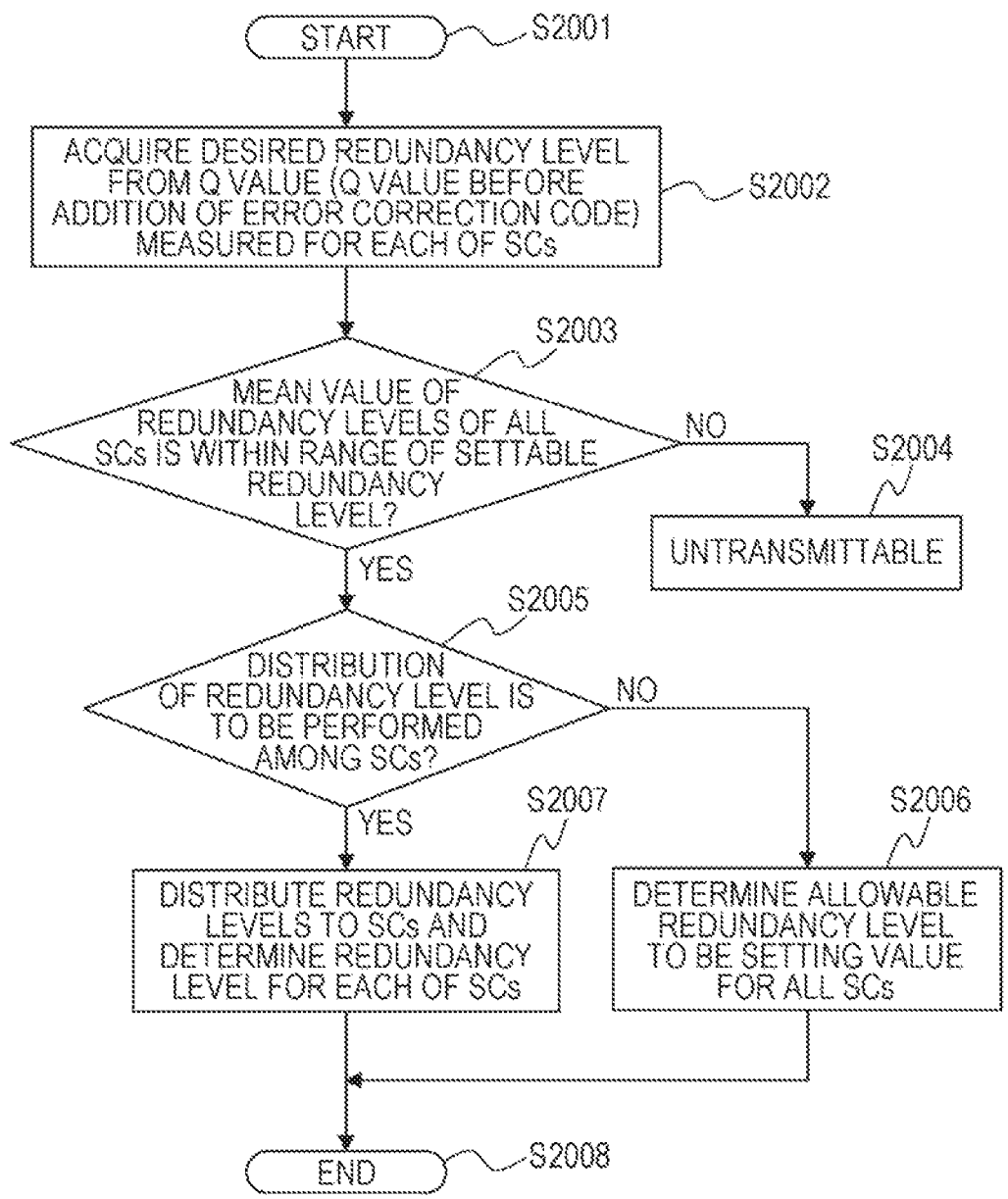
FIG. 24 is a flowchart of an exemplary redundancy allocation process according to the exemplary embodiment.

FIG. 24 is a flowchart of an exemplary redundancy allocation process according to the exemplary embodiment. When the redundancy allocation process is started (operation S2001), the control circuit 21 (1) acquires a desired redundancy level for a signal on each of the sub-carriers from the Q value measured for the sub-carrier making up the super channel (operation S2002).

For example, the control circuit 21 (1) prestores a redundancy level-transmission quality table 211 illustrated in FIG. 25. FIG. 25 illustrates an example of the redundancy level-transmission quality table according to the exemplary embodiment. In a redundancy level-transmission quality table 211, a correspondence between the redundancy level given to signals on a sub-carrier and the Q-value threshold value is recorded for each of the redundancy levels. The Q-value threshold value indicates a minimum Q value for correctly decoding a signal on the sub-carrier having the redundancy level given thereto. The control circuit 21 (1) compares the Q value of the measured known signal on the sub-carrier with the Q-value threshold value recorded in the redundancy level-transmission quality table 211 using the following expression (9). Thereafter, the control circuit 21 (1) obtains, from the redundancy level-transmission quality table 211, the redundancy level corresponding to the largest Q-value threshold value among the Q-value threshold values that satisfy the expression (9).

$$\text{measured } Q \text{ value} \geq Q\text{-value threshold value} + \alpha \qquad (9)$$

In expression (9), α represents a transmission margin including the aged deterioration and the optical level adjustment error. For example, α is 2.0 dB.

The control circuit 21 (1) calculates the mean value of the redundancy levels obtained for all the sub-carriers. Thereafter, the control circuit 21 (1) determines whether the calculated mean value is a redundancy level settable for each of the sub-carriers or less (operation S2003). The redundancy level settable for each of the sub-carriers is the above-described predetermined redundancy level (N/K−1). For example, the redundancy level settable for each of the sub-carriers is determined in accordance with the upper limit of the bit rate allowable for keeping the transmission quality of the super channel at a predetermined value or higher.

For example, in a case 1, the number of the sub-carriers making up the super channel is 4 (m=4). The redundancy level settable for each of the sub-carriers is 20.5%. The redundancy levels obtained for the sub-carriers 1 to 4 are 25.5%, 7%, 7%, and 25.5%, respectively. In such a case 1, the mean value of the obtained redundancy levels is 16.25%. Accordingly, it is determined that the mean value is less than or equal to 20.5%, which is a value settable for each of the sub-carriers. In contrast, in a case 2, the redundancy level settable for each of the sub-carriers is 20.5%. The redundancy levels obtained for the sub-carriers 1 to 4 are 25.5%, 20.5%, 20.5%, and 25.5%, respectively. In such a case 2, the mean value of the obtained redundancy levels is 23%. Accordingly, it is determined that the mean value is greater than 20.5%, which is a value settable for each of the sub-carriers.

As in the above-described case 2, if it is determined that the mean value of the redundancy levels obtained for the sub-carriers is greater than the redundancy level settable for each of the sub-carriers ("NO" in operation S2003), it is determined that the signal is untransmittable (operation S2004). That is, it is determined that it is difficult for a signal on each of the sub-carriers to be transmitted with a desired transmission quality while the transmission quality of the super channel is kept at a predetermined value or higher. This is because even when the redundancy level is distributed among the sub-carriers using the redundancy distribution method according to the exemplary embodiment, it is difficult to set the redundancy level for each of the sub-carriers to a value less than or equal to a redundancy level settable for the sub-carrier. If it is determined that a signal is untransmittable, the configuration of the optical transmission system 1 may be updated or modified.

In contrast, as in the above-described case 1, if it is determined that the mean value of the redundancy levels obtained for the sub-carriers is less than or equal to the redundancy level settable for each of the sub-carriers ("YES" in operation S2003), the redundancy allocation process proceeds to operation S2005. In operation S2005, the control circuit 21 (1) determines whether the redundancy level is to be distributed among the sub-carriers. More specifically, the control circuit 21 (1) determines whether among the redundancy levels obtained for the sub-carriers, the redundancy level that exceeds the redundancy level settable for each of the sub-carriers is present. For example, in the above-described case 1, among the redundancy levels obtained for the sub-carriers 1 to 4, the redundancy level 25.5% obtained for the sub-carriers 1 and 4 exceeds 20.5%, which is the redundancy level settable for each of the sub-carriers. Accordingly, in the case 1, the control circuit 21 (1) determines that distribution of the redundancy level among the sub-carriers is to be performed.

If distribution of the redundancy level among the sub-carriers is not performed ("NO" in operation S2005), the redundancy allocation process proceeds to operation S2006. In operation S2006, the control circuit 21 (1) determines the redundancy level set for each of the sub-carriers to be the redundancy level settable for the sub-carriers (for example, in the above-described example, 20.5%) (operation S2006). After the redundancy levels set for the sub-carriers are determined, the redundancy allocation process is completed (operation S2008).

However, if distribution of the redundancy level among the sub-carriers is to be performed ("YES" in operation S2005), the redundancy allocation process proceeds to operation S2007. In operation S2007, the control circuit 21 (1) distributes the redundancy levels among the sub-carriers such that the redundancy level set for each of the sub-carriers is less than or equal to the redundancy level settable for the sub-carrier. In this manner, the control circuit 21 (1) determines the redundancy level set for each of the sub-carriers.

For example, in the above-described case 1, the control circuit 21 (1) determines the redundancy level set for the sub-carrier 1 to be 20.5%, which is settable for each of the sub-carriers. Thereafter, the control circuit 21 (1) retrieves, from the redundancy level 25.5% obtained for the sub-carrier 1, a 5% portion in excess of the redundancy level 20.5% obtained for the sub-carrier 1 and distributes the portion to the sub-carrier 2. The control circuit 21 (1) sums the redundancy level 20.5% obtained for the sub-carrier 2 and the redundancy level 5% distributed from the sub-carrier 1 and determines that the redundancy level to be set for the sub-carrier 2 is 25.5%. Similarly, the control circuit 21 (1) determines that the redundancy level set for the sub-carrier 4 to be 20.5%, which is settable for each of the sub-carriers. Thereafter, the control circuit 21 (1) distributes, to the sub-carrier 3, a 5% portion of the redundancy level 25.5% obtained for the sub-carrier 4 (that is, the portion in excess of the redundancy level 20.5% set for the sub-carrier 4). The control circuit 21 (1) sums the redundancy level 20.5% obtained for the sub-carrier 3 and the redundancy level 5% distributed from the sub-carrier 4 and determines that the redundancy level to be set for the sub-carrier 3 is 25.5%.

After the redundancy levels to be set for all the sub-carriers are determined, the redundancy allocation process is completed (operation S2008).

In operation S1005, the control circuit 21 (1) of the receiver-side optical transmission apparatus 2 feeds back the redundancy levels determined for all the sub-carriers to the sender-side optical transmission apparatus 2 and instructs the parameter setting of the error correction coding circuit 5 (refer to FIG. 4) in the sender-side optical transmission apparatus 2. More specifically, the control circuit 21 (1) sends a control signal including the redundancy levels determined for the sub-carriers and an instruction to set the error correction coding circuit via the first control signal transceiver 32 (1) and the second control signal transceiver 33 (2). The control signal sent from the receiver-side optical transmission apparatus 2 is received by the control circuit 21 (1) of the sender-side optical transmission apparatus 2 via the optical attenuator 22 (2), the first control signal transceiver 32 (2), and the second control signal transceiver 33 (1).

The control circuit 21 (1) of the sender-side optical transmission apparatus 2 controls the error correction coding circuit 5 in accordance with the received control signal. More specifically, the control circuit 21 (1) controls the selector so that among the error correction coding units included in the error correction coding circuit 5, the error correction coding units corresponding to the redundancy levels determined for the sub-carriers are selected.

For example, in the above-described second example of the configuration (refer to FIG. 19), the control circuit 21 (1) controls the selectors 56"-1 and 57"-1 so that from among the coding circuits 511-1 to 513-1, the coding circuit corresponding to the redundancy level determined for the sub-carrier 1 is selected. In addition, the control circuit 21 (1) controls the selectors 56"-2 and 57"-2 so that from among the coding circuits 511-2 to 513-2, the coding circuit corresponding to the redundancy level determined for the sub-carrier 2 is selected.

In addition, in the third example of the configuration (refer to FIGS. 21A and 21B), the control circuit 21 (1) controls the selectors 56'''-1 and 57'''-1 so that from among the coding circuits 511-1 to 515-1, the coding circuit corresponding to the redundancy level determined for the sub-carrier 1 is selected. Furthermore, the control circuit 21 (1) controls the selectors 56'''-2 and 57'''-2 so that from among the coding circuits 511-2 to 515-2, the coding circuit corresponding to the redundancy level determined for the sub-carrier 2 is selected.

In operation S1006, the control circuit 21 (1) of the receiver-side optical transmission apparatus 2 controls the selector so that among the error correction decoding units included in the error correction decoding circuit 9 (refer to FIG. 5), the error correction decoding units corresponding to the redundancy levels determined for the sub-carriers are selected.

For example, in the above-described second example of the configuration (refer to FIG. 20), the control circuit 21 (1) controls the selectors 97"-1 and 98"-1 so that from among the decoding circuits 941-1 to 943-1, the decoding circuit corresponding to the redundancy level determined for the sub-carrier 1 is selected. In addition, the control circuit 21 (1) controls the selectors 97"-2 and 98"-2 so that from among the decoding circuits 941-2 to 943-2, the decoding circuit corresponding to the redundancy level determined for the sub-carrier 2 is selected.

In addition, in the third example of the configuration (refer to FIGS. 22A and 22B), the control circuit 21 (1) controls the selectors 97'''-1 and 98'''-1 so that from among the decoding circuits 941-1 to 945-1, the decoding circuit corresponding to the redundancy level determined for the sub-carrier 1 is selected. Furthermore, the control circuit 21 (1) controls the selectors 97''''-2 and 98''''-2 so that from among the decoding circuits 941-2 to 945-2, the decoding circuit corresponding to the redundancy level determined for the sub-carrier 2 is selected.

After the error correction decoding circuit is set up, the control circuit 21 (1) of the receiver-side optical transmission apparatus 2 sends a control signal including an error correction decoding circuit setting completion message to the sender-side optical transmission apparatus 2. The control circuit 21 (1) of the sender-side optical transmission apparatus 2 receives the control signal sent from the receiver-side optical transmission apparatus 2. Thereafter, transmission of an optical signal from the sender-side optical transmission apparatus 2 to the receiver-side optical transmission apparatus is started (operation S1007). Thus, the redundancy level setting process is completed (operation S1008).

As described above, according to the transmission method of the exemplary embodiment, a greater number of bits of error correction code are added for a sub-carrier having lower transmission quality. Accordingly, the transmission performance of the super channel is improved regardless of a subcarrier-to-subcarrier variation in transmission quality of the sub-carriers making up the super channel. In addition, according to the transmission method of the exemplary embodiment, the error correction code in excess of a pre-determined redundancy level is allocated among the sub-carriers. Accordingly, the redundancy level of a transmission and reception signal on each of the sub-carriers is reduced and, thus, the transmission performance of the super channel is improved.

Note that in the above description, transmission of the known signal on each of the sub-carriers is started by the sender-side optical transmission apparatus 2 in accordance with an instruction sent from the receiver-side optical transmission apparatus 2 (operation S1002). However, depending on an embodiment, the sender-side optical transmission apparatus 2 may send the known signal used for each of the sub-carriers at predetermined intervals after the sender-side optical transmission apparatus 2 is set.

In addition, in the first example, the transmission quality of each of the sub-carrier signals before addition of the error correction code is acquired by receiving the known signal used for the sub-carrier from the sender-side optical transmission apparatus 2 using the receiver-side optical transmission apparatus 2 and measuring the known signal (operations S1002 and S1003). However, as in the second example illustrated in FIG. 26, instead of the processing performed in operations S1002 and S1003, the processing in operation S3002 may be performed.

Figure 26:
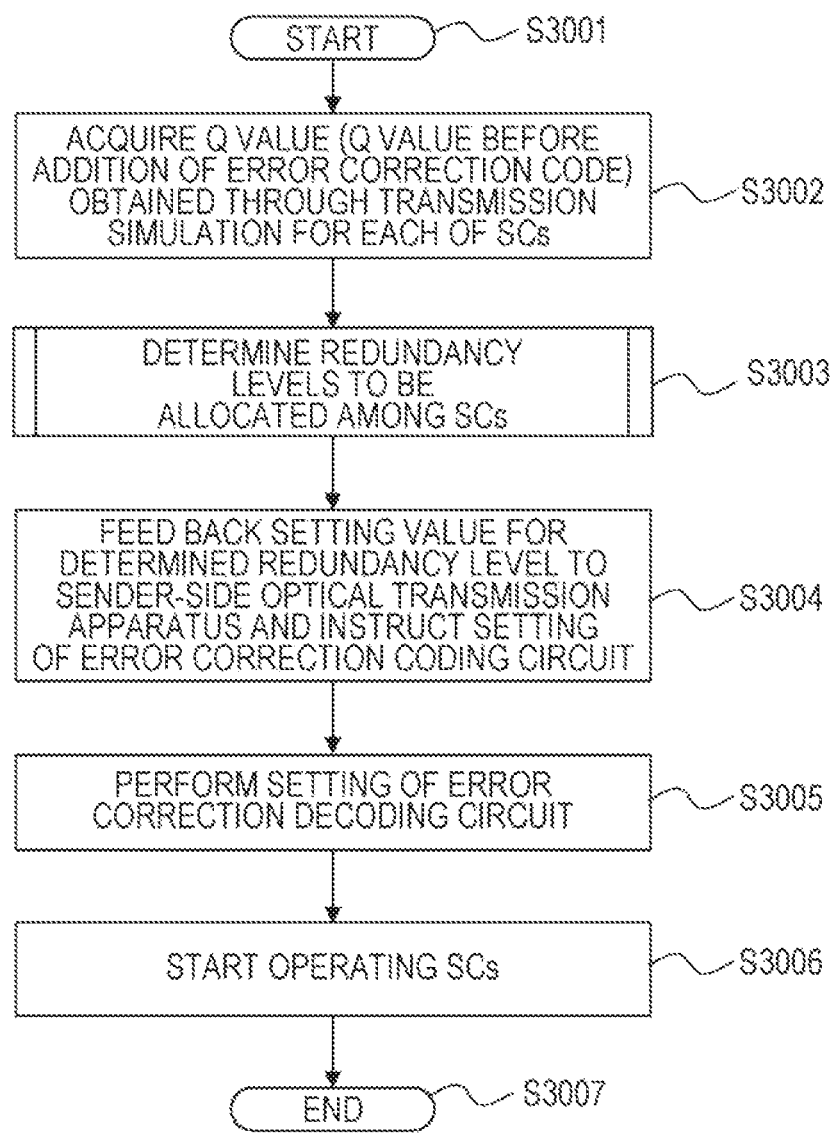
FIG. 26 is a flowchart of a second example of the redundancy level setting process performed before the operation is started.

FIG. 26 is a flowchart of the second example of the redundancy level setting process performed before the operation is started. In the second example of the redundancy level setting process, the transmission quality of a reception signal on each of the sub-carriers before addition of the error correction code is calculated using any type of a computer, and the calculated transmission quality is pre-acquired by the control circuit 21 (1) in operation S3002.

For example, the network information used in calculation using simulation software, such as VPI Transmission Maker, is input to the computer, and the transmission quality of the reception signal on each of the sub-carrier before addition of the error correction code is calculated by the computer. Examples of the input network information include the transmission distance, the optical loss, and the type of optical fiber in each of the transmission lines. Examples of the input network information further include the noise figure (NF) characteristics and the output levels of amplifiers and the number of OADM stages in the stations, such as the OADM nodes 2-1 and 2-2.

Note that depending on an embodiment, a plurality of patterns of the transmission quality in accordance with a variety of conditions may be pre-calculated, and the plurality of calculated patterns of the transmission quality may be stored in the form of a database. Thereafter, the control circuit 21 (1) may pre-acquire the transmission quality that matches a desired condition from among the plurality of patterns of the transmission quality provided in the form of a database.

In FIG. 26, the processing in operations S3003 to S3006 may be the same as the processing in operations S1004 to S1007, respectively.

According to the second example of the redundancy level setting process, an optical signal may not be transmitted and received between the optical transmission apparatuses 2 before the operation of the optical transmission system 1 starts.

Note that in the first and second examples, all the control in the redundancy setting process flow is performed by the control circuit 21 (1) of the receiver-side optical transmission apparatus 2 (the OADM node 2-2). However, as in a third example illustrated in FIG. 27, the control in the entire redundancy level setting process may be performed by the control circuit 21 (1) of the sender-side optical transmission apparatus 2 (the OADM node 2-1).

Figure 27:
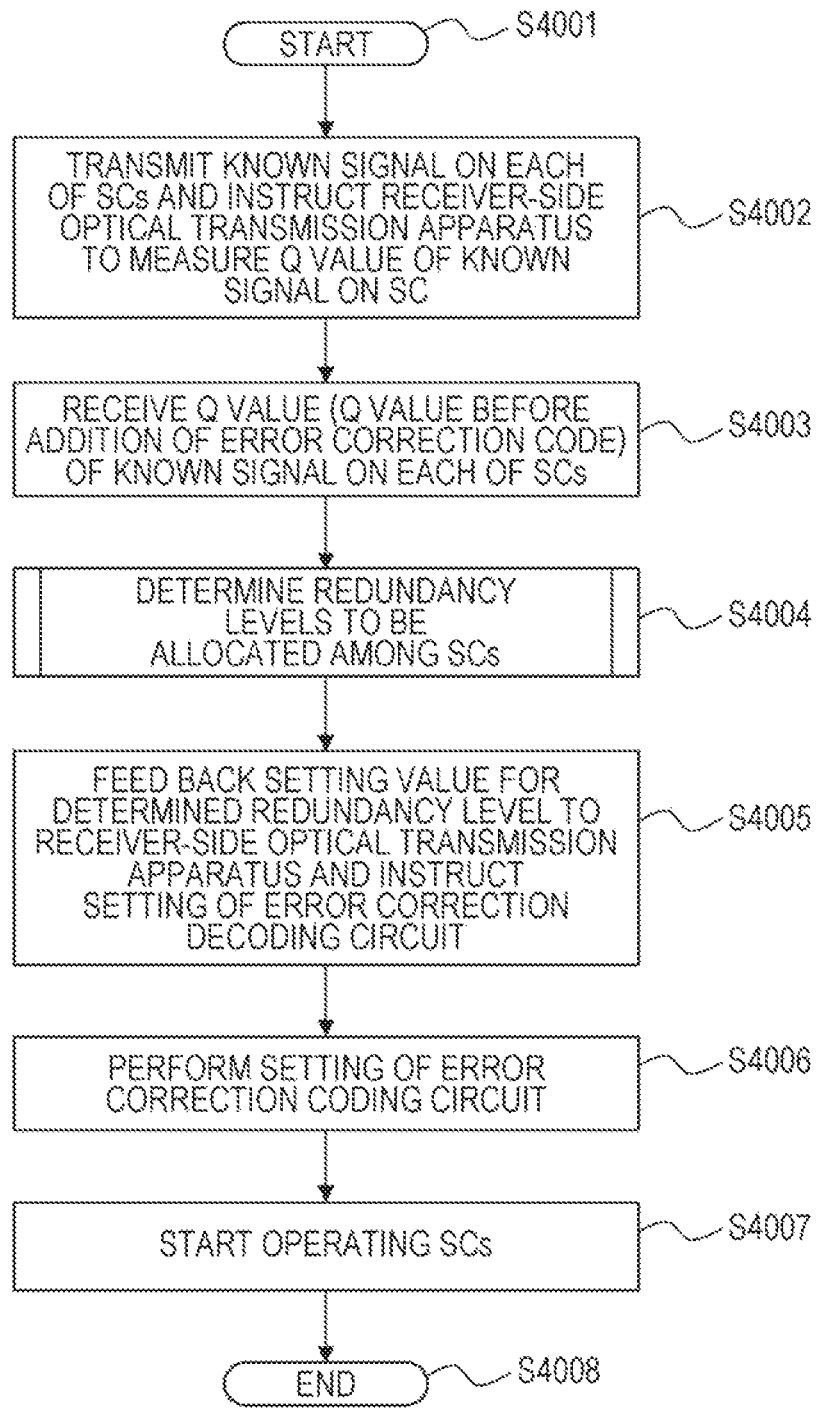
FIG. 27 is a flowchart of a third example of the redundancy level setting process performed before start of the operation.

FIG. 27 is a flowchart of the third example of the redundancy level setting process performed before the operation is started. If the redundancy level setting process is started (operation S4001), the control circuit 21 (1) of the sender-side optical transmission apparatus 2 transmits, to the receiver-side optical transmission apparatus 2, optical signals each having a known signal as the main signal on the sub-carriers (SCs) in the super channel (operation S4002). In addition, the control circuit 21 (1) sends a control signal including an instruction to measure the transmission quality of the transmitted known signal to the receiver-side optical transmission apparatus 2 via the second control signal transceiver 33 (1).

The known signals transmitted on the sub-carriers from the sender-side optical transmission apparatus 2 are received by the transponders 27(B)-1-1 to 27(B)-n-m of the receiver-side optical transmission apparatus 2. In addition, the control signal transmitted from the sender-side optical transmission apparatus 2 is received by the control circuit 21 (1) via the optical attenuator 22 (1) and the first control signal transceivers 32 (1). The control circuit 21 (1) causes the transponders 27(B)-1-1 to 27(B)-n-m to measure the Q values of the received known signals on the sub-carriers.

Each of the transmission quality measuring units in the transponders 27(B)-1-1 to 27(B)-n-m (refer to FIG. 13) measures the Q values of the known signal on a corresponding sub-carrier. The Q value is an example of the transmission quality. The Q value measured by the transmission quality measuring unit of each of the transponders 27(B)-1-1 to 27(B)-n-m is sent to the control circuit 21 (1). The control circuit 21 (1) transmits a control signal including the received Q values via the first control signal transceiver 32 (1) and the second control signal transceiver 33 (2).

In operation S4003, the control circuit 21 (1) of the receiver-side optical transmission apparatus 2 receives the control signal transmitted from the receiver-side optical transmission apparatus 2 via the optical attenuator 22 (2), the first control signal transceiver 32 (2), and the second control signal transceiver 33 (1). The control circuit 21 (1) determines allocation of the redundancy levels among the sub-carriers using the Q values of the known signals on the sub-carriers included in the received control signal (operation S4004). The redundancy allocation process performed in operation S4004 may be the same as the process described above with reference to FIG. 24.

In operation S4005, the control circuit 21 (1) of the sender-side optical transmission apparatus 2 feeds back the redundancy levels determined for the sub-carriers to the receiver-side optical transmission apparatus 2 and instruct the setting of the error correction decoding circuit 9 (refer to FIG. 5) in the receiver-side optical transmission apparatus 2. More specifically, the control circuit 21 (1) transmits, via the second control signal transceiver 33 (1), a control signal including the redundancy levels determined for the sub-carriers and an instruction to set up the error correction coding circuit.

The control signal transmitted from the sender-side optical transmission apparatus 2 is received by the control circuit 21 (1) of the receiver-side optical transmission apparatus 2 via the optical attenuator 22 (1) and the first control signal transceiver 32 (1). The control circuit 21 (1) of the receiver-side optical transmission apparatus 2 controls the error correction decoding circuit 9 in accordance with the received control signal. More specifically, the control circuit 21 (1) controls the selector so that among the error correction decoding units included in the error correction decoding circuit 9, the error correction decoding units corresponding to the redundancy levels determined for the sub-carriers are selected. If the error correction decoding circuits are set up, the control circuit 21 (1) transmits a control signal including an error correction decoding circuit setting completion message to the sender-side optical transmission apparatus 2.

In operation S4006, the control circuit 21 (1) of the sender-side optical transmission apparatus 2 controls the selector so that among the error correction coding units included in the error correction coding circuit 5 (refer to FIG. 4), the error correction coding units corresponding to the redundancy levels determined for the sub-carriers are selected.

The control circuit 21 (1) of the sender-side optical transmission apparatus 2 receives the control signal transmitted form the receiver-side optical transmission apparatus 2 in operation S4005. Thereafter, transmission of an optical signal from the sender-side optical transmission apparatus 2 to the receiver-side optical transmission apparatus is started (operation S4007). Thus, the redundancy level setting process is completed (operation S4008).

As described above, according to the third example of the redundancy level setting process, a greater number of bits of error correction code are added for a sub-carrier having lower transmission quality. Accordingly, the transmission performance of the super channel is improved regardless of a subcarrier-to-subcarrier variation in transmission quality of the sub-carriers making up the super channel. In addition, according to the third example of the redundancy level setting process, the error correction code in excess of a predetermined redundancy level is allocated among the sub-carriers. Accordingly, the redundancy level of the transmission and reception signal on each of the sub-carriers is reduced and, thus, the transmission performance of the super channel is improved.

Note that in the above-described description, the receiver-side optical transmission apparatus 2 measures the Q values of the received known signals in accordance with the instruction sent from the sender-side optical transmission apparatus 2. However, depending on an embodiment, the receiver-side optical transmission apparatus 2 may measure the Q values received at a given timing after the receiver-side optical transmission apparatus 2 is set and transmit the measured Q values to the sender-side optical transmission apparatus 2.

In addition, according to the third example, the transmission quality of each of the sub-carrier signals before addition of the error correction code is acquired by receiving the known signal used for the sub-carrier from the sender-side optical transmission apparatus 2 using the receiver-side optical transmission apparatus 2 and measuring the known signal (operations S4002 and S4003). However, as in the second example illustrated in FIG. 26, instead of the processing performed in operations S4002 and S4003, the processing in operation S3002 may be performed. That is, the transmission quality of each of the sub-carrier signals before addition of the error correction code may be calculated using any type of a computer, and the calculated transmission quality may be pre-acquired by the control circuit 21 (1) of the sender-side optical transmission apparatus 2. According to such a configuration, it is allowed to remove transmission and reception of an optical signal between the optical transmission apparatuses 2 before the operation of the optical transmission system 1 starts.

Example of Transmission Method Performed During Operation of Optical Transmission System As an example of the transmission method performed during the operation of the optical transmission system, a redundancy level setting process performed by the optical transmission apparatus according to the exemplary embodiment is described below with reference to FIGS. 28 to 30.

Figure 28:
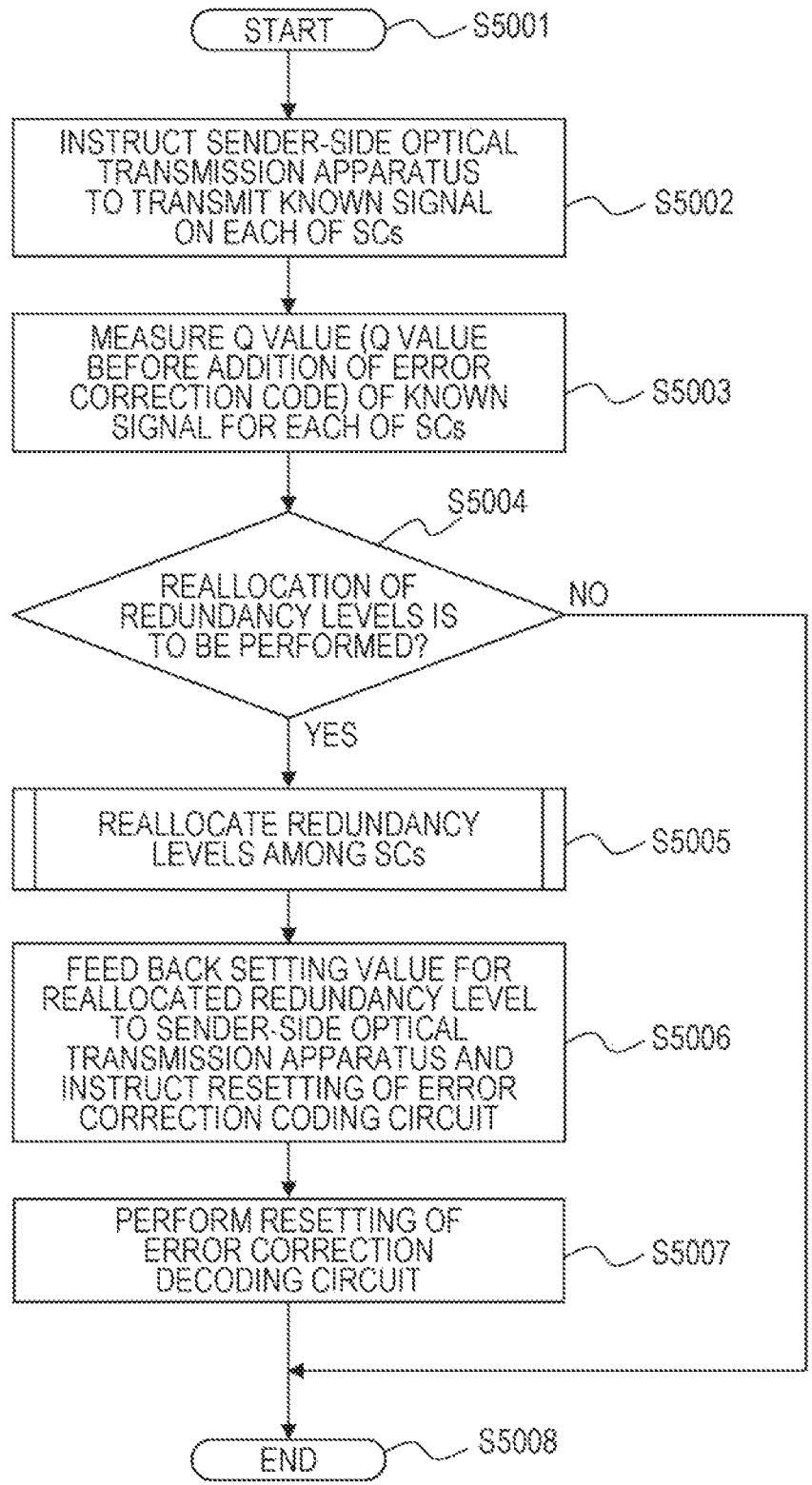
FIG. 28 is a flowchart of a first example of the redundancy level setting process performed under operation.

FIG. 28 is a flowchart of a first example of the redundancy level setting process performed in operation. In the first example of the redundancy level setting process, all the control in the redundancy setting process is performed by the control circuit 21 (1) of the receiver-side optical transmission apparatus 2 (the OADM node 2-2). The first example of the redundancy level setting process illustrated in FIG. 28 may be performed at predetermined time intervals during the operation of the optical transmission system or may be performed based on an instruction received from an operator of the optical transmission system 1.

If the redundancy level setting process is started (operation S5001), the control circuit 21 (1) of the receiver-side optical transmission apparatus 2 performs a process that is the same as in operations S1002 and S1003 (refer to FIG. 23) in operations S5002 and S5003. By performing the processing in operations S5002 and S5003, the control circuit 21 (1) acquires the Q value before addition of the error correction code for the known signal on each of the sub-carriers.

In operation S5004, the control circuit 21 (1) of the receiver-side optical transmission apparatus determines whether reallocation of the redundancy levels among the sub-carriers is to be performed.

The reception Q value of a signal on each of the sub-carriers making up the super channel varies during the operation of the optical transmission system 1 due to various factors. Examples of the factor to deteriorate the reception Q value include aged deterioration of the optical amplifier and optical components included in the optical transmission apparatus 2 and waveform deterioration caused by a change in the state of a transmission line (for example, polarization fluctuation occurring when a worker touches the fiber in a station under operation). Accordingly, if a sub-carrier having a deteriorated transmission quality is found during the operation, the optical transmission apparatus 2 performs reallocation of the redundancy levels among the sub-carriers in order to keep the good transmission quality of each of the sub-carriers. If the reception Q value is improved in operation due to some factor, the code length of the error correction code added to the main signal of the sub-carrier may be short, and the redundancy level of the transmission and reception signal may be low. Accordingly, if the reception Q value is improved in operation due to some factor, the optical transmission apparatus 2 performs the reallocation of the redundancy levels among the sub-carriers to reduce the power consumption when an optical signal is transmitted or received.

For example, the control circuit 21 (1) of the receiver-side optical transmission apparatus compares the obtained Q value of the known signal on the sub-carrier with the Q-value threshold value recorded in the redundancy level-transmission quality table 211 using expression (9). Thereafter, the control circuit 21 (1) obtains, from the redundancy level-transmission quality table 211, the redundancy level corresponding to the largest Q-value threshold value among the Q-value threshold values that satisfy the expression (9). For each of the sub-carriers, the control circuit 21 (1) compares the Q value obtained based on the known signal on the sub-carrier with the Q value corresponding to the redundancy level currently set for the sub-carrier.

If the Q value obtained based on the known signal on the sub-carrier is lower than the Q value corresponding to the redundancy level currently set for the sub-carrier, it is desirable that the redundancy level of the sub-carrier be increased to the redundancy level corresponding to the Q value obtained based on the known signal on the sub-carrier. Accordingly, the control circuit 21 (1) determines that the reallocation of the redundancy levels among the sub-carriers is to be performed ("YES" in operation S5004), and the processing proceeds to operation S5005.

However, if the Q value obtained based on the known signal on the sub-carrier is higher than the Q value corresponding to the redundancy level currently set for the sub-carrier, it is desirable that the redundancy level of the sub-carrier be reduced to the redundancy level corresponding to the Q value obtained based on the known signal on the sub-carrier. Accordingly, the control circuit 21 (1) determines that the reallocation of the redundancy levels among the sub-carriers is to be performed ("YES" in operation S5004), and the processing proceeds to operation S5005.

If the Q value corresponding to the currently set redundancy level is the same as the Q value obtained based on the known signal for all the sub-carriers, it is desirable that the redundancy levels for all the sub-carriers remain unchanged. Accordingly, the control circuit 21 (1) determines that the reallocation of the redundancy levels among the sub-carriers is not to be performed ("NO" in operation S5004), and the redundancy level setting process is completed (operation S5008).

In operation S5005, the control circuit 21 (1) of the receiver-side optical transmission apparatus 2 performs reallocation of the redundancy levels among the sub-carriers. An example of the process performed in operation S5005 is described below with reference to FIG. 29.

Figure 29:
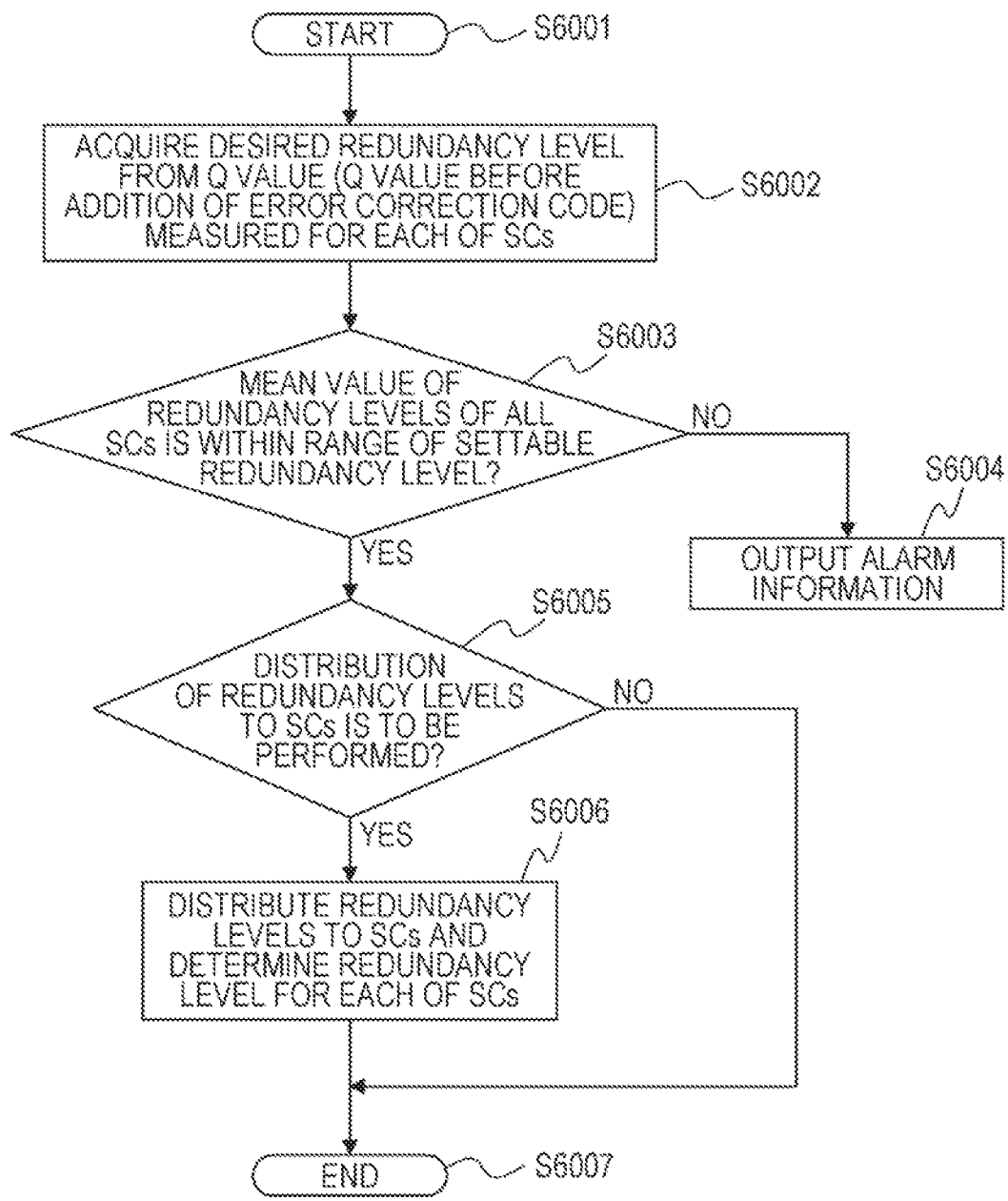
FIG. 29 is a flowchart of an exemplary redundancy level reallocation process according to the exemplary embodiment.

FIG. 29 is a flowchart of an exemplary redundancy level reallocation process according to the exemplary embodiment. When the redundancy level reallocation process is started (operation S6001), the control circuit 21 (1) performs a process in operation S6002. That is, the control circuit 21 (1) retrieves a desired redundancy level corresponding to the Q value obtained based on the known signal from the redundancy level-transmission quality table 211 for each of the sub-carriers (operation S6002). The method for obtaining the redundancy level in operation S6002 may be the same as the method for obtaining a redundancy level in operation S2002.

The control circuit 21 (1) calculates the mean value of the redundancy levels obtained for all the sub-carriers. Thereafter, the control circuit 21 (1) determines whether the calculated mean value is less than or equal to a redundancy level settable for each of the sub-carriers (operation S6003). The determination method used in operation S6003 may be the same as the determination method used in operation S2003.

If it is determined that the mean value of the redundancy levels obtained for all the sub-carriers is greater than the redundancy level settable for each of the sub-carriers ("NO" in operation S6003), it is determined that a signal is untransmittable (operation S6004). That is, an error in a signal on the sub-carrier is likely to occur due to the deterioration of the signal quality during the operation of the optical transmission system 1. Accordingly, it is determined that a signal is untransmittable. In such a case, the control circuit 21 (1) may send the alarm information using, for example, a control signal.

However, if it is determined that the mean value of the redundancy levels obtained for all the sub-carriers is less than or equal to the redundancy level settable for each of the sub-carriers ("YES" in operation S6003), the redundancy level reallocation process proceeds to operation S6005. In operation S6005, the control circuit 21 (1) determines whether allocation of the redundancy levels among the sub-carriers is to be performed. More specifically, the control circuit 21 (1) determines whether the redundancy level that exceeds the redundancy level settable for each of the sub-carriers is present among the redundancy levels obtained for all the sub-carriers. The determination method used in operation S6005 may be the same as the determination method used in operation S2005.

If it is determined that the allocation of the redundancy levels among the sub-carriers is not to be performed ("NO" in operation S6005), the control circuit 21 (1) determines that the redundancy level to be set for each of the sub-carriers is the redundancy level obtained in operation S6002. Thus, the redundancy level reallocation process is completed (operation S6007).

However, if it is determined that the allocation of the redundancy levels among the sub-carriers is to be performed ("YES" in operation S6005), the redundancy level reallocation process proceeds to operation S6006. In operation S6006, the control circuit 21 (1) performs distribution of the redundancy levels among the sub-carriers such that the redundancy level set for each of the sub-carriers is lower than or equal to the redundancy level settable for each of the sub-carriers and determines the redundancy levels set for all the sub-carriers. The determination method used in operation S6006 may be the same as the determination method used in operation S2007.

If the redundancy levels set for all the sub-carriers are determined, the redundancy level reallocation process is completed (operation S6007).

In operation S5006, the control circuit 21 (1) of the receiver-side optical transmission apparatus 2 feeds back the redundancy levels determined for the sub-carriers to the sender-side optical transmission apparatus 2 and instructs the setting of the error correction coding circuit 5 (refer to FIG. 4) in the sender-side optical transmission apparatus 2. The details of the process performed in operation S5006 may be the same as those in operation S1005.

In operation S5007, the control circuit 21 (1) of the receiver-side optical transmission apparatus 2 controls the selector so that among the error correction decoding units included in the error correction decoding circuit 9 (refer to FIG. 5), the error correction decoding units corresponding to the redundancy levels determined for the sub-carriers are selected. The details of the process performed in operation S5007 may be the same as those in operation S1006.

After the error correction decoding circuit is set up, the control circuit 21 (1) of the receiver-side optical transmission apparatus 2 sends a control signal including an error correction decoding circuit setting completion message to the sender-side optical transmission apparatus 2. The control circuit 21 (1) of the sender-side optical transmission apparatus 2 receives the control signal sent from the receiver-side optical transmission apparatus 2. Thereafter, transmission of an optical signal from the sender-side optical transmission apparatus 2 to the receiver-side optical transmission apparatus 2 is started with the reallocated redundancy levels. Thus, the redundancy level setting process is completed (operation S5008).

As described above, according to the transmission method of the exemplary embodiment, a greater number of bits of error correction code are added for a sub-carrier having lower transmission quality. Accordingly, the transmission performance of the super channel is improved regardless of a subcarrier-to-subcarrier variation in transmission quality of the sub-carriers making up the super channel. In addition, according to the transmission method of the exemplary embodiment, the error correction code in excess of a predetermined redundancy level is allocated among the sub-carriers even when the transmission quality of a signal on each of the sub-carriers making up the super channel varies during the operation. Accordingly, the redundancy level of the transmission and reception signal on each of the sub-carriers is reduced and, thus, the transmission performance of the super channel is improved.

Note that in the above description, transmission of the known signal on each of the sub-carriers is started by the sender-side optical transmission apparatus 2 in accordance with an instruction sent from the receiver-side optical transmission apparatus 2 (operation S5002). However, depending on an embodiment, the sender-side optical transmission apparatus 2 may send the known signal used for each of the sub-carriers at predetermined time intervals.

In addition, in the first example, all the control in the redundancy setting process flow is performed by the control circuit 21 (1) of the receiver-side optical transmission apparatus 2 (the OADM node 2-2). However, as in a second example illustrated in FIG. 30, the control in the entire redundancy level setting process may be performed by the control circuit 21 (1) of the sender-side optical transmission apparatus 2 (the OADM node 2-1).

FIG. 30 is a flowchart of the second example of the redundancy level setting process performed under operation. The second example of the redundancy level setting process illustrated in FIG. 30 may be performed at predetermined time intervals in the operation of the optical transmission system or may be performed based on an instruction received from an operator of the optical transmission system 1.

If the redundancy level setting process is started (operation S7001), the control circuit 21 (1) of the sender-side optical transmission apparatus 2 performs processing that is the same as in operations S4002 and S4003 (refer to FIG. 27) in operations S7002 and S7003. By performing the processing in operations S7002 and S7003, the control circuit 21 (1) acquires the Q value of the known signal on each of the sub-carriers before addition of the error correction code.

In operation S7004, the control circuit 21 (1) of the sender-side optical transmission apparatus determines whether reallocation of the redundancy levels among the sub-carriers is to be performed. The determination method used in operation S7004 may be the same as the determination method used in operation S5004 (refer to FIG. 28).

If it is determined that the reallocation of the redundancy levels among the sub-carriers is not to be performed ("NO" in operation S7004), the control circuit 21 (1) completes the redundancy level setting process (operation S7008). However, if it is determined that the reallocation of the redundancy levels among the sub-carriers is to be performed ("YES" in operation S7004), the processing performed by the control circuit 21 (1) proceeds to the redundancy level setting process in operation S7005. The redundancy level setting process performed in operation S7005 may be the same as the process described above with reference to FIG. 29.

In operation S7006, the control circuit 21 (1) of the sender-side optical transmission apparatus 2 feeds back the redundancy levels determined for the sub-carriers to the receiver-side optical transmission apparatus 2 and instructs the setting of the error correction decoding circuit 9 (refer to FIG. 5) in the receiver-side optical transmission apparatus 2. The details of the process performed in operation S7006 may be the same as those in operation S4005 (refer to FIG. 27).

In operation S7007, the control circuit 21 (1) of the sender-side optical transmission apparatus 2 controls the selector so that among the error correction coding units included in the error correction coding circuit 5 (refer to FIG. 4), the error correction coding units corresponding to the redundancy levels determined for the sub-carriers are selected.

The control circuit 21 (1) of the sender-side optical transmission apparatus 2 receives the control signal transmission form the receiver-side optical transmission apparatus 2 in operation S7006. Thereafter, transmission of optical signals from the sender-side optical transmission apparatus 2 to the receiver-side optical transmission apparatus is resumed with the reallocated redundancy levels. Thus, the redundancy level setting process is completed (operation S7008).

As described above, according to even the transmission method of the second example, a greater number of bits of error correction code are added for a sub-carrier having lower transmission quality. Accordingly, the transmission performance of the super channel is improved regardless of a subcarrier-to-subcarrier variation in transmission quality of the sub-carriers making up the super channel. In addition, according to the transmission method of the second example, the error correction code in excess of a predetermined redundancy level is allocated among the sub-carriers even when the transmission quality of a signal on each of the sub-carriers making up the super channel varies during the operation. Accordingly, the redundancy level of a transmission and reception signal on each of the sub-carriers is reduced and, thus, the transmission performance of the super channel is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission system for transmitting and receiving an optical signal in a super channel, the optical transmission system comprising:
    a first optical transmission apparatus configured to
        add a plurality of error correction codes to a main signal, each of the plurality of error correction codes having a code length in accordance with transmission quality of a respective one of a plurality of sub-carriers that form a super channel,
        retrieve, from a first error correction code that is added to the main signal and that corresponds to a first sub-carrier among the plurality of sub-carriers, a first code portion in excess of a predetermined redundancy level,
        distribute the first code portion to a second sub-carrier among the plurality of sub-carriers,
        concatenate a second code portion, which is retrieved from a second error correction code that is added to the main signal and that corresponds to a sub-carrier other than the first sub-carrier among the plurality of sub-carriers, into the first error correction code, and
        transmit, through the super channel formed by the plurality of sub-carriers, the optical signal, the optical signal including the main signal multiplexed with the first error correction code that has been concatenated with the second code portion; and
    a second optical transmission apparatus configured to
        receive the optical signal transmitted from the first optical transmission apparatus,
        extract, from the optical signal, the second code portion,
        concatenate the first code portion, which is distributed from a sub-carrier other than the first sub-carrier among the plurality of sub-carriers, into the first error correction code included in the optical signal, and
        decode the main signal in the optical signal by using the first error correction code that has been concatenated with the second code portion with the first code portion.

2. The optical transmission system according to claim 1, wherein the second optical transmission apparatus
    measures transmission quality before the respective error correction code is added for each of the plurality of sub-carriers,
    determines a redundancy level for each of the plurality of sub-carriers in accordance with the measured transmission quality, and
    sends the redundancy level determined for each of the sub-carriers to the first optical transmission apparatus, and
wherein the first optical transmission apparatus determines the predetermined redundancy level for each of the sub-carriers in accordance with the redundancy levels received from the second optical transmission apparatus.

3. The optical transmission system according to claim 2, wherein the redundancy level for each of the plurality of sub-carriers is calculated by using network information regarding the optical transmission system, and
wherein the first optical transmission apparatus and the second optical transmission apparatus acquire redundancy level for each of the plurality of sub-carriers in advance.

4. The optical transmission system according to claim 2, wherein the first optical transmission apparatus distributes the first code portion to sub-carriers among the plurality of sub-carriers of a number corresponding to a difference value between the redundancy level for the first sub-carrier and the predetermined redundancy level, and
wherein the second optical transmission apparatus concatenates the first code portion distributed from sub-carriers among the plurality of sub-carriers of the number corresponding to the difference value.

5. The optical transmission system according to claim 3, wherein the first optical transmission apparatus and the second optical transmission apparatus select the redundancy level for each of the plurality of sub-carriers from a plurality of redundancy levels that are stored in advance and that correspond to a plurality of transmission quality levels.

6. An optical transmission apparatus comprising:
a memory;
one or more circuits coupled to the memory, the one or more circuits being configured to:
add a plurality of error correction codes to a main signal, each of the plurality of error correction codes having a code length in accordance with transmission quality of a respective one of a plurality of sub-carriers that form a super channel;
retrieve, from a first error correction code that is added to the main signal and that corresponds to a first sub-carrier among the plurality of sub-carriers, a first code portion in excess of a predetermined redundancy level, and distribute the first code portion to a second sub-carrier among the plurality of sub-carriers; and
concatenate a second code portion, which is retrieved from a second error correction code that is added to the main signal and that corresponds to a sub-carrier other than the first sub-carrier among the plurality of sub-carriers, into the first error correction code; and
a transmitter configured to transmit, through the super channel formed by the plurality of sub-carriers, the optical signal, the optical signal including the main signal multiplexed with the first error correction code that has been concatenated with the second code portion.

7. The optical transmission apparatus according to claim 6, further comprising:
a control circuit configured to control a distribution of the first code portion to another sub-carrier among the plurality of sub-carriers, based on a desired redundancy level for each of the plurality of sub-carriers in accordance with transmission quality before the respective error correction code is added for each of the plurality of sub-carriers.

8. The optical transmission apparatus according to claim 7,
wherein the control circuit controls the distribution of the first code portion to another sub-carrier among the plurality of sub-carriers, based on the desired redundancy level for each of the plurality sub-carriers acquired in advance by a calculation using network information regarding an optical transmission system including the optical transmission apparatus.

9. The optical transmission apparatus according to claim 7,
wherein the control circuit controls the distribution of the first code portion to another sub-carrier among the plurality of sub-carriers, based on a difference value between the desired redundancy level and the predetermined redundancy level.

10. The optical transmission apparatus according to claim 8,
wherein the control circuit selects the desired redundancy level from a plurality of redundancy levels that are stored in advance to a plurality of transmission quality levels.

11. A transmission method comprising:
adding a plurality of error correction codes to a main signal, each of the plurality of error correction codes having a code length in accordance with transmission quality of a respective one of a plurality of sub-carriers that form a super channel;
retrieving, from a first error correction code that is added to the main signal and that corresponds to a first sub-carrier among the plurality of sub-carriers, a first code portion in excess of a predetermined redundancy level;
the first code portion to a second sub-carrier among the plurality of sub-carriers;
concatenating a second code portion, which is retrieved from a second error correction code that is added to the main signal and that corresponds to a sub-carrier other than the first sub-carrier among the plurality of sub-carriers, into the first error correction code; and
transmitting, through the super channel formed by the plurality of sub-carriers, the optical signal, the optical signal including the main signal multiplexed with the first error correction code that has been concatenated with the second code portion.

12. The transmission method according to claim 11, further comprising:
determining a desired redundancy level for each of the plurality of sub-carriers in accordance with transmission quality before the respective error correction code is added for each of the plurality of sub-carriers,
wherein the distributing of the first code portion to another sub-carrier among the plurality of sub-carriers is performed in accordance with the desired redundancy level determined for each of the plurality of sub-carriers.

13. The transmission method according to claim 12,
wherein the desired redundancy level calculated by using network information regarding an optical transmission system is acquired for each of the plurality of sub-carriers in advance, and
wherein the distributing of the first code portion to another sub-carrier among the plurality of sub-carriers is performed in accordance with the desired redundancy levels.

14. The transmission method according to claim 12,
wherein the distributing of the first code portion to another sub-carrier among the plurality of sub-carriers is performed, based on a difference value between the desired redundancy level and the predetermined redundancy level.

15. The transmission method according to claim 13,
wherein the desired redundancy level is selected from a plurality of redundancy levels stored that are stored in advance and that correspond to a plurality of transmission quality levels.

* * * * *